United States Patent [19]

Yamagiwa et al.

[11] 4,220,964

[45] Sep. 2, 1980

[54] SECAM RECORDING AND REPRODUCING SYSTEM

[75] Inventors: Kazuo Yamagiwa, Tokyo; Toshihiko Numakura, Kamakura, both of Japan

[73] Assignee: Sony Corporation, Tokyo, Japan

[21] Appl. No.: 960,839

[22] Filed: Nov. 15, 1978

[30] Foreign Application Priority Data

Nov. 21, 1977 [JP] Japan ................................ 52-139623
Dec. 12, 1977 [JP] Japan ................................ 52-149008
Mar. 30, 1978 [JP] Japan ................................ 53-37118

[51] Int. Cl.[2] ................................................ H04N 5/79
[52] U.S. Cl. ............................................ 358/8; 358/4
[58] Field of Search .................................. 358/4, 8, 12

[56] References Cited

U.S. PATENT DOCUMENTS

| | | | |
|---|---|---|---|
| 3,852,520 | 12/1974 | Bruch | 358/4 X |
| 3,939,485 | 2/1976 | Amari et al. | 358/4 |
| 4,007,482 | 2/1977 | Amari | 358/4 |
| 4,007,484 | 2/1977 | Amari | 358/8 |
| 4,012,771 | 3/1977 | Ishigake et al. | 358/4 |
| 4,134,126 | 1/1979 | Hirai | 358/4 |

*Primary Examiner*—James W. Moffitt
*Assistant Examiner*—Donald McElheny, Jr.
*Attorney, Agent, or Firm*—Lewis H. Eslinger; Alvin Sinderbrand

[57] ABSTRACT

Apparatus for recording and/or reproducing a SECAM composite color television signal in parallel tracks on a record medium. The luminance and chrominance components of the SECAM television signal are separated from each other, and then the luminance component is modulated to a higher frequency range while the chrominance component is frequency-converted to a lower frequency range. These frequency-modified components are recombined and recorded. In frequency-converting the chrominance component, first and second frequency-converting carrier signals are generated, and the phases of these frequency-converting signals are synchronized, or locked, to the incoming SECAM television signal so as to exhibit corresponding phase changes. When these frequency-converting signals are used to frequency-convert the chrominance component of the SECAM television signal, the resultant frequency-converted chrominance components are recorded in at least one track with a substantially constant phase and in the next adjacent track with a frequency-converted sub-carrier which differs from that of the said one track. The recorded frequency-converted sub-carrier frequencies in adjacent tracks are in frequency interleaved relation with respect to each other. In one embodiment of the recording apparatus, the frequencies of the frequency-converting signals differ from each other by n/4fh, wherein n is an integer (preferably 1) and fh is the horizontal line frequency of the SECAM television signal. In this embodiment, the phase of the recorded chrominance subcarrier is constant for all tracks.

65 Claims, 71 Drawing Figures

L.P.F.
Ampl.
Clamp
Pre-em.
Clip
F.M. Mod
H.P.F.
B.P.F.
Reverse Bell
A.C.C.
F. Con.
Limiter
F.M. Demod
De-em.
Comb Filter
Bell Filter
Phase Comp.
V.C.O.
H. Sync Sep.
Slice
V. Sync Sep.
Sawtooth Gen.
Wave Form
Detect
Sawtooth Wave Gene
Phase Mod.
Gate
OSC
T.F.F.
F.F.
1/8
1/351
1/353
1/2

Figures 2B, 2C, 2D, 2E, 2F, 2G, 2J:
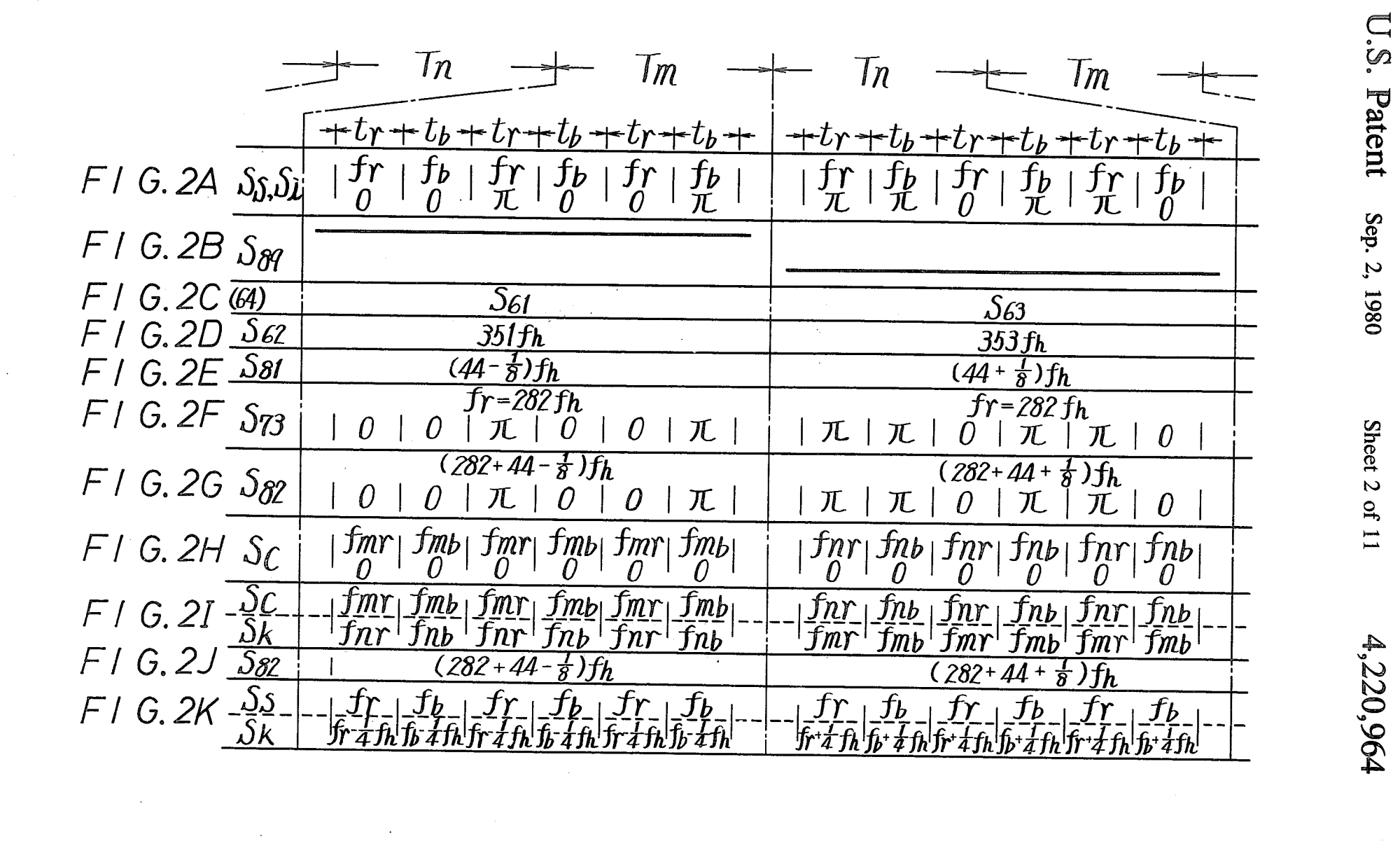

| | | $T_n$ | | | $T_m$ | | | $T_n$ | | | $T_m$ | | |
|---|---|---|---|---|---|---|---|---|---|---|---|---|---|
| | | $t_r$ | $t_b$ | $t_r$ | $t_b$ | $t_r$ | $t_b$ | $t_r$ | $t_b$ | $t_r$ | $t_b$ | $t_r$ | $t_b$ |
| FIG. 2A | $S_S, S_i$ | $f_r$ 0 | $f_b$ 0 | $f_r$ $\pi$ | $f_b$ 0 | $f_r$ 0 | $f_b$ $\pi$ | $f_r$ $\pi$ | $f_b$ $\pi$ | $f_r$ 0 | $f_b$ $\pi$ | $f_r$ $\pi$ | $f_b$ 0 |
| FIG. 2B | $S_{89}$ | | | | | | | | | | | | |
| FIG. 2C | (64) | $S_{61}$ | | | | | | $S_{63}$ | | | | | |
| FIG. 2D | $S_{62}$ | $351 f_h$ | | | | | | $353 f_h$ | | | | | |
| FIG. 2E | $S_{81}$ | $(44-\frac{1}{8})f_h$ | | | | | | $(44+\frac{1}{8})f_h$ | | | | | |
| FIG. 2F | $S_{73}$ | $f_r=282 f_h$<br>0 | 0 | $\pi$ | 0 | 0 | $\pi$ | $f_r=282 f_h$<br>$\pi$ | $\pi$ | 0 | $\pi$ | $\pi$ | 0 |
| FIG. 2G | $S_{82}$ | $(282+44-\frac{1}{8})f_h$<br>0 | 0 | $\pi$ | 0 | 0 | $\pi$ | $(282+44+\frac{1}{8})f_h$<br>$\pi$ | $\pi$ | 0 | $\pi$ | $\pi$ | 0 |
| FIG. 2H | $S_C$ | $f_{mr}$ 0 | $f_{mb}$ 0 | $f_{mr}$ 0 | $f_{mb}$ 0 | $f_{mr}$ 0 | $f_{mb}$ 0 | $f_{nr}$ 0 | $f_{nb}$ 0 | $f_{nr}$ 0 | $f_{nb}$ 0 | $f_{nr}$ 0 | $f_{nb}$ 0 |
| FIG. 2I | $\frac{S_C}{S_K}$ | $\frac{f_{mr}}{f_{nr}}$ | $\frac{f_{mb}}{f_{nb}}$ | $\frac{f_{mr}}{f_{nr}}$ | $\frac{f_{mb}}{f_{nb}}$ | $\frac{f_{mr}}{f_{nr}}$ | $\frac{f_{mb}}{f_{nb}}$ | $\frac{f_{nr}}{f_{mr}}$ | $\frac{f_{nb}}{f_{mb}}$ | $\frac{f_{nr}}{f_{mr}}$ | $\frac{f_{nb}}{f_{mb}}$ | $\frac{f_{nr}}{f_{mr}}$ | $\frac{f_{nb}}{f_{mb}}$ |
| FIG. 2J | $S_{82}$ | $(282+44-\frac{1}{8})f_h$ | | | | | | $(282+44+\frac{1}{8})f_h$ | | | | | |
| FIG. 2K | $\frac{S_S}{S_K}$ | $\frac{f_r}{f_r-\frac{1}{4}f_h}$ | $\frac{f_b}{f_b-\frac{1}{4}f_h}$ | $\frac{f_r}{f_r-\frac{1}{4}f_h}$ | $\frac{f_b}{f_b-\frac{1}{4}f_h}$ | $\frac{f_r}{f_r-\frac{1}{4}f_h}$ | $\frac{f_b}{f_b-\frac{1}{4}f_h}$ | $\frac{f_r}{f_r+\frac{1}{4}f_h}$ | $\frac{f_b}{f_b+\frac{1}{4}f_h}$ | $\frac{f_r}{f_r+\frac{1}{4}f_h}$ | $\frac{f_b}{f_b+\frac{1}{4}f_h}$ | $\frac{f_r}{f_r+\frac{1}{4}f_h}$ | $\frac{f_b}{f_b+\frac{1}{4}f_h}$ |

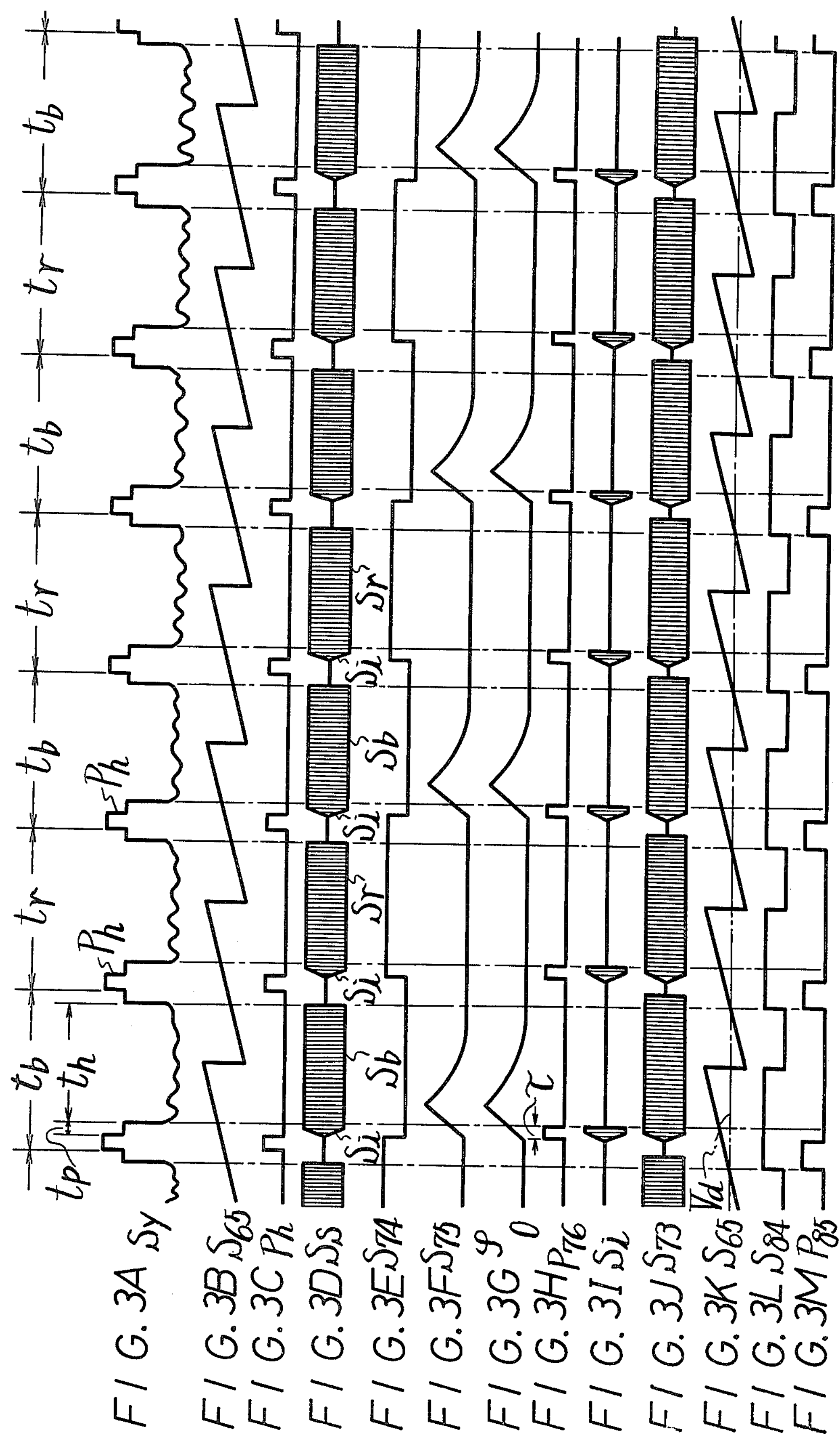

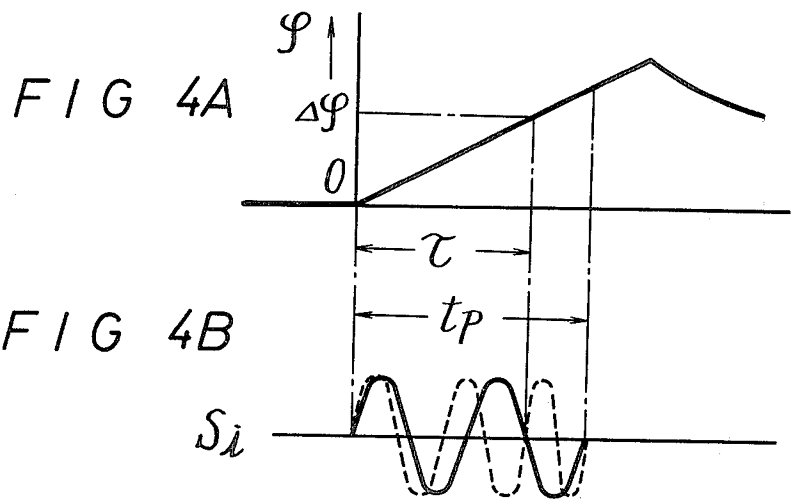
FIG 4A
φ
Δφ
0
τ
FIG 4B
tp
Si
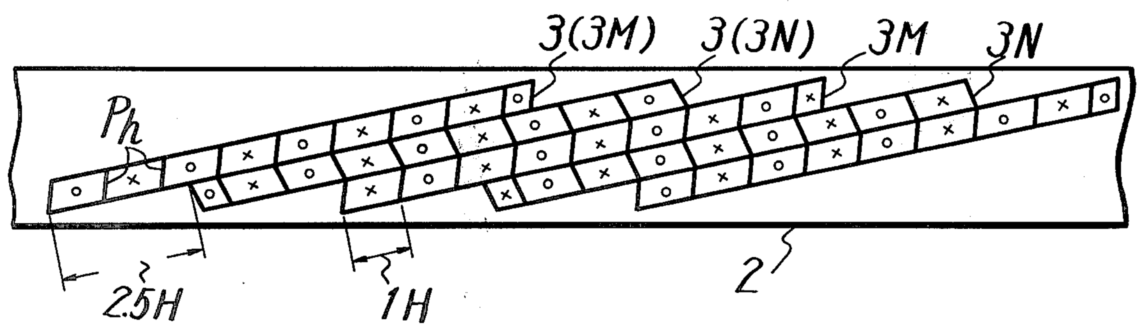
FIG. 5
3(3M)
3(3N)
3M
3N
Ph
2.5H
1H
2
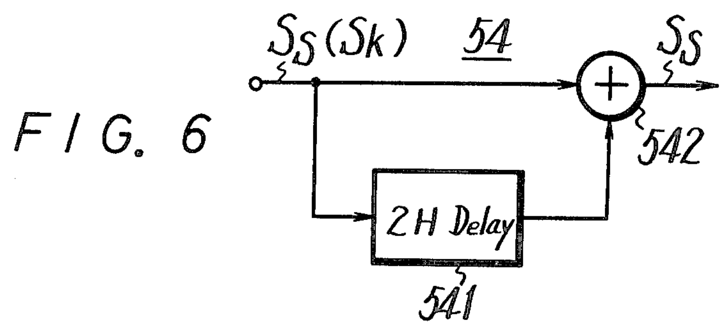
FIG. 6
Ss(Sk)
54
Ss
542
2H Delay
541

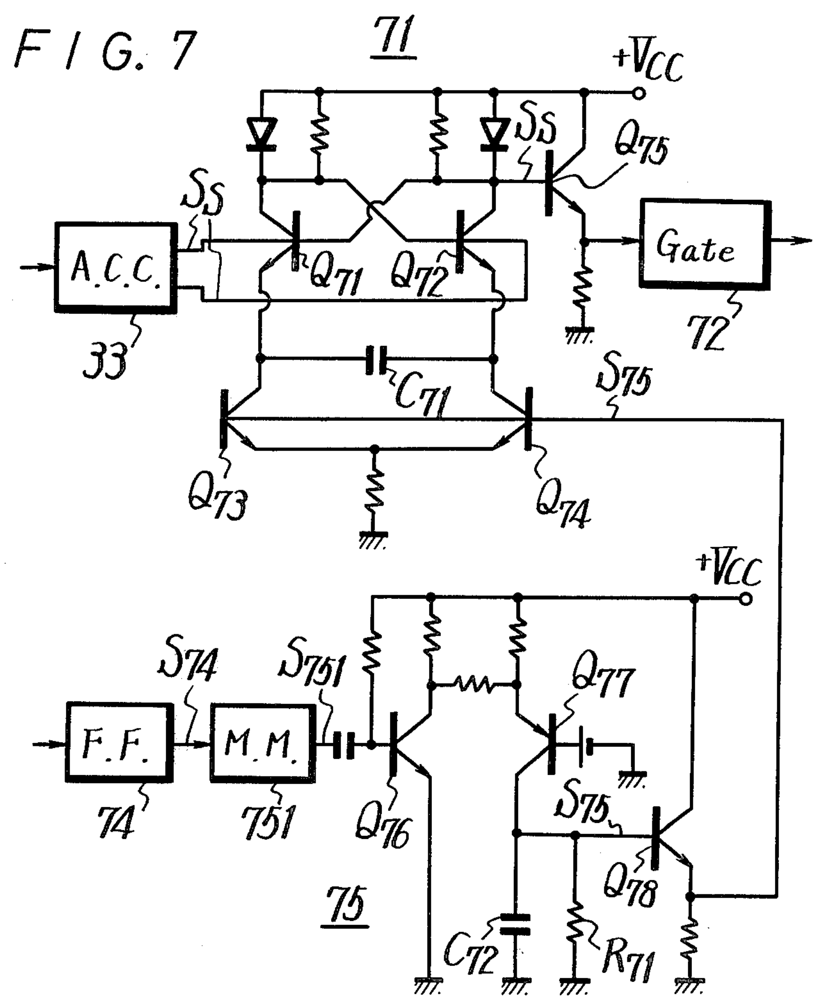
F I G. 7
71
+Vcc
Ss
Q75
Ss
A.C.C.
Q71
Q72
Gate
33
72
C71
S75
Q73
Q74
+Vcc
S74
S751
Q77
F.F.
M.M.
S75
74
751
Q76
Q78
75
C72
R71
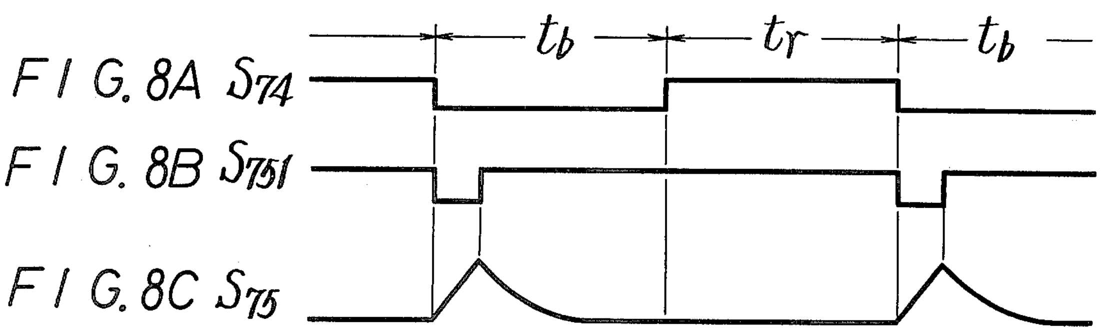
tb
tr
tb
F I G. 8A S74
F I G. 8B S751
F I G. 8C S75

FIG. 15A
FIG. 15B
FIG. 15C
FIG. 15D
FIG. 15E
FIG. 15F
FIG. 15G
FIG. 15H
FIG. 15I

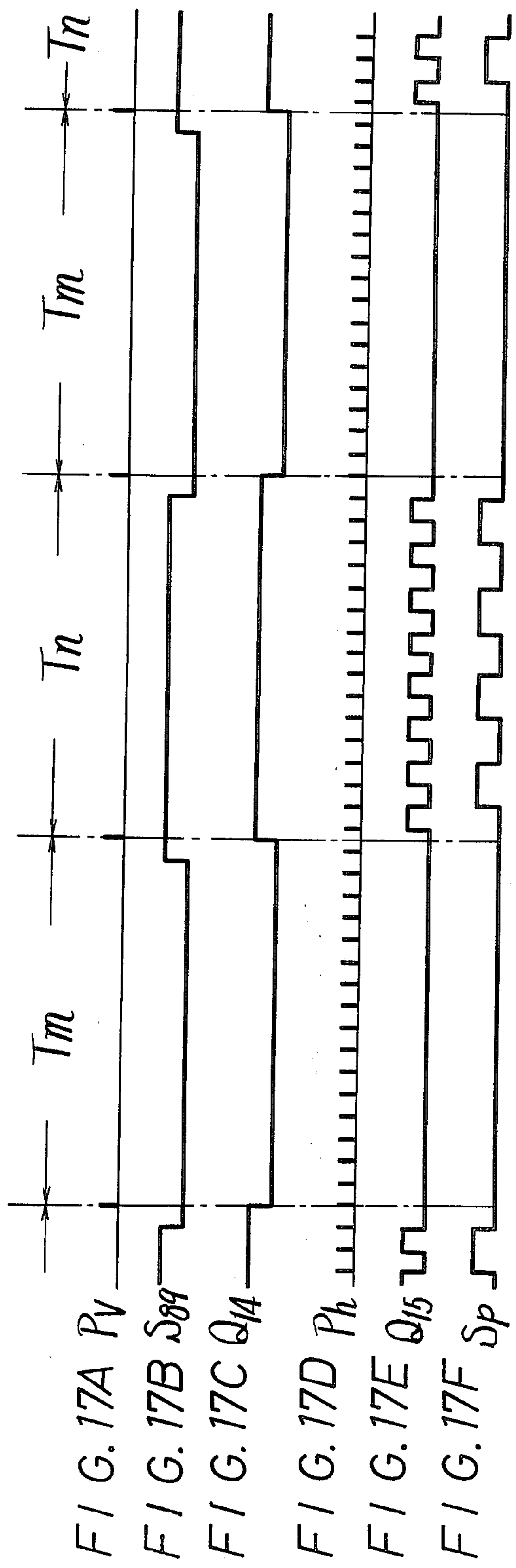
FIG. 17A Pv
FIG. 17B S89
FIG. 17C Q14
FIG. 17D Ph
FIG. 17E Q15
FIG. 17F Sp
Tm
Tn
Tm
Tn
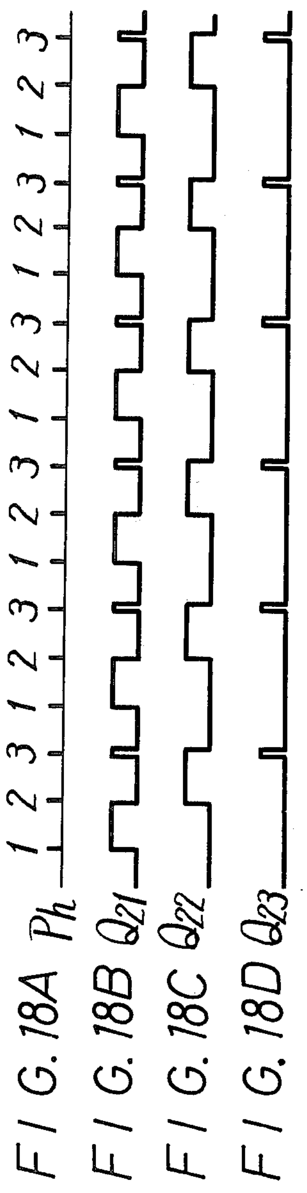
FIG. 18A Ph
FIG. 18B Q21
FIG. 18C Q22
FIG. 18D Q23
1 2 3 1 2 3 1 2 3 1 2 3 1 2 3 1 2 3

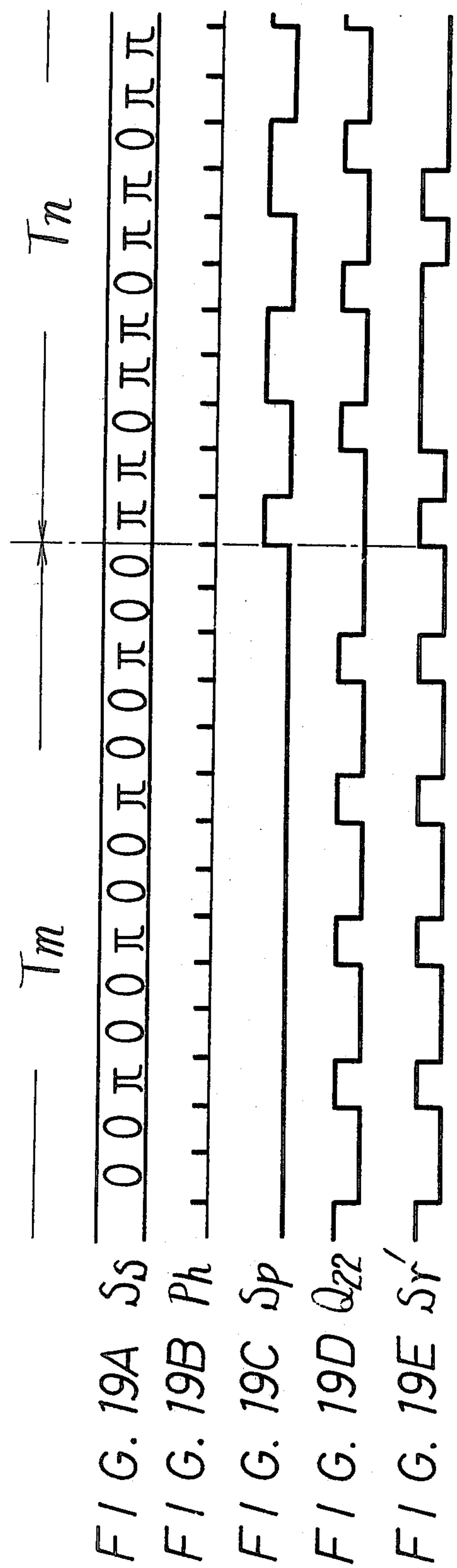
Tm
Tn
FIG. 19A Ss
FIG. 19B Ph
FIG. 19C Sp
FIG. 19D Q22
FIG. 19E Sr'
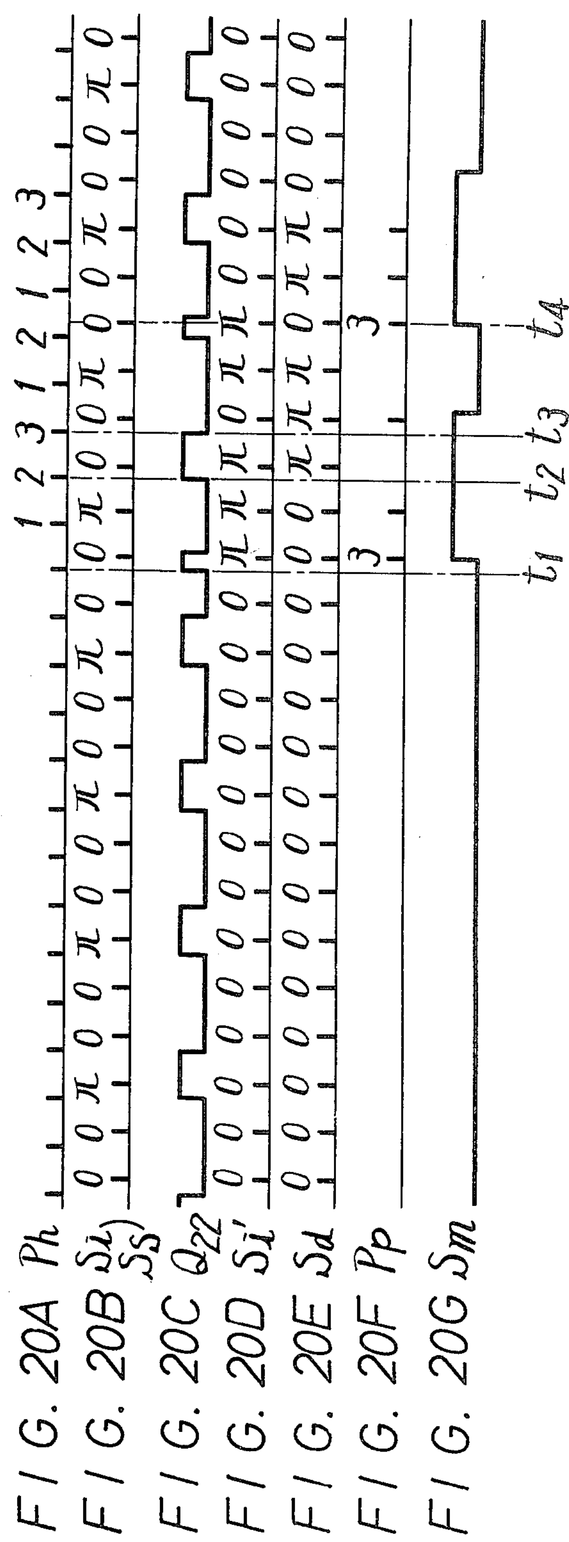
FIG. 20A Ph
FIG. 20B Si (Ss)
FIG. 20C Q22
FIG. 20D Si'
FIG. 20E Sd
FIG. 20F Pp
FIG. 20G Sm
t1
t2
t3
t4

SECAM RECORDING AND REPRODUCING SYSTEM

BACKGROUND OF THE INVENTION

This invention relates generally to SECAM color video signal recording and/or reproducing apparatus and, more particularly, is directed to such apparatus for recording the SECAM signals in successive parallel tracks on a recording medium with high recording density and for reproducing the recorded SECAM signals while effectively eliminating the cross-talk signals which are reproduced from adjacent tracks.

It is well known to record video signals on a magnetic tape or other record medium by scanning successive parallel tracks across the record medium with one or more transducers. In recording such video signals, it has been the usual practice to provide guard bands, or unrecorded gaps between the successive parallel tracks so that when, during reproduction, a transducer scans one of the tracks to reproduce the signals therein, the transducer will not also reproduce cross-talk signals which may be picked up from adjacent tracks. However, the provision of guard bands between successive parallel tracks reduces the recording density, that is, the amount of signal information which can be recorded on a unit area of the record medium, and thus does not permit efficient utilization of the record medium.

In order to minimize cross-talk while permitting an increase in the recording density, two transducers having air gaps with different azimuth angles have been used for recording and reproducing signals in alternate tracks. In video tape recorders (VTR's) using such transducers, the magnetic tape is wrapped helically about a portion of the perimeter of a rotary guide drum and is moved longitudinally while the transducers or heads are rotated. The heads thus alternately scan respective tracks for recording or reproducing signals therein. Each transducer or head, during a recording operation, effects magnetization of magnetic domains in the magnetic coating on the tape in what would appear to be, if such domains were visible, a series of parallel lines or stripes each having a length as great as the width of the track, and each having an orientation that corresponds to the azimuth angle of the gap of the respective transducer or head. During a reproducing or playback operation, each track is scanned by the transducer or head having its gap aligned with the parallel, but fictitious, lines in that track, from which it follows that the gap of the transducer or head scanning a track for reproducing the video signals recorded therein extends at an angle to the fictitious lines in the tracks next adjacent to the track being scanned. By reason of the foregoing, if a transducer or head in scanning a track for reproducing the video signals recorded therein overlaps an adjacent track, or otherwise reproduces signals which are recorded in the latter, the well-known phenomenon of azimuth loss results in attenuation of the cross-talk signals reproduced from the adjacent track.

It is also well known that, in recording video signals as described above, it is advantageous to record at least a portion of the video signals as a frequency modulated signal by frequency-modulating a carrier having a relatively high frequency. Since azimuth loss is generally proportional to the frequency of the signals, such azimuth loss is relatively effective to decrease or eliminate the cross-talk from adjacent tracks in respect to the frequency-modulated portion of the video signals recorded in the tracks because of the relatively high frequency of the modulated carrier. Thus, insofar as the frequency-modulated portion of the recorded video signals is concerned, it is possible to record the video signals in abutting or even partially overlapping successive parallel tracks, that is, without providing guard bands between the adjacent tracks on the record medium.

When recording color video signals which include a luminance component and a chrominance component, it is known to separate such components and then to frequency modulate the luminance component on a carrier having a relatively high frequency, while the chrominance component is frequency-converted so as to have its frequency band shifted below the frequency band of the frequency modulated luminance component, whereupon the frequency modulated luminance component and the frequency-converted chrominance component are combined to provide composite video signals which are recorded in the successive parallel tracks. However, since azimuth loss is generally proportional to the frequency of the signals, interference due to cross-talk of the lower frequency frequency-converted chrominance component is not reduced to the same degree by the use of transducers having different azimuth angles as is cross-talk interference from the higher frequency frequency-modulated luminance component. Thus, when recording color video signals, it has been proposed, for example, as disclosed in detail in U.S. Pat. No. 4,007,482, to reduce or eliminate interference or cross-talk between the lower frequency chrominance signals recorded in adjacent tracks by recording the chrominance component with different first and second carriers, which are in frequency-interleaving relation to each other, in adjacent tracks, respectively. The first and second carriers, modulated by the chrominance component for recording in adjacent tracks, may be distinguished from each other by their respective polarity characteristics so that, when a head scans a particular track for reproducing the video signals recorded therein, the chrominance component of cross-talk signals picked up from the track next adjacent to the scanned track can be conveniently suppressed or eliminated by reason of the different polarity characteristics of the carriers with which the chrominance component was recorded in the scanned track and in the tracks adjacent thereto, respectively.

However, in the SECAM color video signal, the chrominance component is composed of a first chrominance subcarrier frequency-modulated with the red color-difference signal (R-Y) and a second chrominance subcarrier frequency-modulated with the blue color-difference signal (B-Y), which are line-sequentially transmitted and which have different center subcarrier frequencies relative to each other. Further, the phases of the line-sequentially transmitted FM (frequency-modulated) color signals are reversed at every third horizontal interval. This means that it is not possible to record the SECAM chrominance component in interleaving relationship in adjacent tracks merely by changing the frequencies of the chrominance component recorded in such adjacent tracks as in, for example, the NTSC system. As a result, the foregoing technique cannot effectively eliminate the cross-talk signal with respect to the SECAM chrominance component.

OBJECTS OF THE INVENTION

Therefore, it is an object of the present invention to provide improved apparatus for recording and/or reproducing a SECAM composite color television signal with a high recording density, while minimizing cross-talk interference during a reproducing operation.

Another object of this invention is to provide improved apparatus for recording and/or reproducing a SECAM composite color television signal in parallel adjacent tracks on a record medium without providing guard band separation between successive tracks.

A further object of this invention is to provide improved apparatus for recording a SECAM composite color television signal in parallel adjacent record tracks wherein the chrominance component of the SECAM television signal is frequency-converted down to a relatively lower frequency range, and wherein the frequency-converted chrominance component in adjacent tracks exhibits a frequency interleaved relation with each other.

An additional object of this invention is to provide improved apparatus for reproducing a SECAM composite color television signal which had been recorded in adjacent parallel tracks on a record medium, and wherein the chrominance component of the recorded SECAM television signal had been frequency-converted down to a relatively lower frequency range and wherein the frequency-converted chrominance components in adjacent record tracks are in frequency interleaved relation with each other such that, on reproduction, a comb filter having attenuating nodes which coincide with chrominance cross-talk components picked up from adjacent tracks can be used to eliminate such cross-talk components.

Yet another object of this invention is to provide apparatus for recording a SECAM composite color television signal in successive record tracks wherein the chrominance subcarrier frequency in each line interval in one track differs from the chrominance subcarrier frequency in respectively adjacent line intervals in the next adjacent track by an odd multiple of one-fourth the horizontal synchronizing frequency and, preferably, by one-fourth the horizontal synchronizing frequency.

A still further object of this invention is to provide improved apparatus for recording a SECAM composite television signal in successive parallel tracks wherein the phase of the chrominance component which is recorded in one track is constant for all line intervals therein, and wherein the phase of the chrominance component which is recorded in the next adjacent track is inverted after each successive predetermined number of line intervals, preferably, after every other line interval.

Another object of this invention is to provide improved apparatus for reproducing a SECAM composite color television signal whose chrominance component had been recorded in one track with a constant phase throughout that track, and in the next adjacent track with a phase that is inverted after every other line interval by providing a frequency re-converting signal of substantially constant phase during the period that the SECAM television signal recorded in said one track is reproduced, and having a phase that is inverted after every other line interval during the period that the SECAM television signal recorded in said next adjacent track is reproduced.

Various other objects, advantages and features of the present invention will become readily apparent from the ensuing detailed description, and the novel features will be particularly pointed out in the appended claims.

SUMMARY OF THE INVENTION

In accordance with one aspect of this invention, apparatus is provided for recording a SECAM composite color television signal in parallel tracks on a record medium. In this system, the chrominance component is frequency-converted to a relatively lower frequency range while the luminance component is frequency modulated to a higher frequency range. In frequency-converting the chrominance component, a re-converting signal is generated having a substantially constant frequency and a phase which, effectively, is locked to the phase of the chrominance subcarrier of the SECAM television signal. Hence, any changes in the phase of the SECAM chrominance subcarrier, such as the usual phase inversion, or reversal, at every third horizontal line interval, is imparted into the re-converting signal. In addition, the frequency of the re-converting signal for the recording of the SECAM television signal in one track differs from the frequency thereof during the recording of the SECAM television signal in the next adjacent track, this frequency difference being an odd multiple of one-fourth the horizontal line frequency.

Another aspect of the present invention is to provide apparatus for reproducing the SECAM television signal which had been recorded in the aforementioned manner. In such reproducing apparatus, a frequency re-converter is provided for frequency re-converting the chrominance component substantially back to its original frequency range. First and second re-converting signals of substantially constant and equal phase but different frequencies are supplied to the frequency re-converter when the SECAM television signal is reproduced from the aforementioned one and next adjacent tracks, respectively. The frequency difference of the re-converting signals is an odd multiple of one-fourth the horizontal line frequency, such that when the chrominance component is reproduced from one track, a chrominance cross-talk component, which is picked up from an adjacent track, is reproduced with a frequency that differs from the main chrominance component by an odd multiple of one-fourth the horizontal line frequency. A comb filter, connected to the output of the frequency re-converter, functions to eliminate the chrominance cross-talk component in each line interval. In one embodiment, this comb filter includes a delay circuit for delaying the frequency re-converted chrominance component by two horizontal line intervals. The delayed main chrominance component at the output of this delay circuit is, generally, highly correlative with the undelayed chrominance component which then is being reproduced, but the delayed chrominance cross-talk component is substantially out-of-phase with the undelayed chrominance cross-talk component which then is being reproduced. A summing circuit sums the delayed and undelayed components, resulting in effective cancellation of the chrominance cross-talk component.

In accordance with another aspect of this invention, apparatus is provided for recording a SECAM composite color television signal wherein the chrominance component thereof is frequency-converted down to a relatively lower frequency range by frequency-converting the chrominance component with a frequency-converting signal of substantially constant frequency. However, the phase of the frequency-converting signal is controlled during the recording of the SECAM television signal in each track. When the SECAM television signal is recorded in one track, the phase of the frequency-converting signal is made to follow the phase change, or phase inversion, of the chrominance subcarrier of the SECAM television signal in each third horizontal line interval. When the SECAM television signal is recorded in the next adjacent track, the phase of the frequency-converting signal is inverted at the start of one of the third line intervals of the SECAM television signal and is phase-inverted again at the end of the next-following third line interval, the phase of this frequency-converting signal then being inverted at each of the two line intervals between the end of one third line interval and the beginning of the next third line interval. When the phase of the frequency-converting signal is controlled in this manner, the phase of the frequency-converted chrominance subcarrier is made constant during the recording of the SECAM television signal in one track and is inverted after every other line interval during the recording of the SECAM television signal in the next adjacent track.

Another feature of this invention is to provide apparatus for reproducing a SECAM composite television signal which had been recorded in successive tracks and whose chrominance subcarrier had been phase-controlled so as to be constant throughout one track and phase-inverted after every other line interval in the next adjacent track. In this reproducing apparatus, the recorded SECAM television signal is frequency re-converted substantially back to its original frequency range by supplying the chrominance component of the SECAM television signal to a frequency re-converter and by controlling the phase of the constant frequency frequency re-converting signal which also is supplied to the re-converter. The phase of the frequency re-converting signal is constant when the SECAM television signal is reproduced from said one track, and is inverted after every other line interval when the SECAM television signal is reproduced from said next adjacent track. In this manner, the main frequency re-converted chrominance component of the SECAM television signal is the same throughout each track, although the phase of the chrominance component which is reproduced from one track may differ from that which is reproduced from the next adjacent track. However, the phases of the chrominance cross-talk components during every other line interval will be inverted with respect to each other. Hence, a comb filter of the type which includes a delay circuit from imparting a delay equal to two horizontal line intervals can be connected to the output of the frequency re-converter to cancel such chrominance cross-talk components.

BRIEF DESCRIPTION OF THE DRAWINGS

The following detailed description, given by way of example, will best be understood in conjunction with the accompanying drawings in which:

FIGS. 2A–2K are timing diagrams which are useful in understanding the operation of the apparatus shown in FIG. 1;

FIGS. 3A–3M are waveform diagrams which are helpful in understanding the operation of the apparatus shown in FIG. 1;

FIGS. 4A–4B are waveform diagrams which are useful in understanding the operation of a portion of the apparatus shown in FIG. 1;

FIG. 5 is a representation of the manner in which SECAM video signals are recorded on magnetic tape;

FIG. 6 is a block diagram of one embodiment of a comb filter which can be advantageously, used with the present invention;

FIG. 7 is a schematic diagram of a portion of the apparatus shown in FIG. 1;

FIGS. 8A–8C are waveform diagrams which are useful in understanding the operation of the circuitry shown in FIG. 7.

FIGS. 15A–15I are timing diagrams which are useful in understanding the operation of the embodiment shown in FIG. 14, as used with the present invention;

FIGS. 17A–17F are waveform diagrams which are useful in explaining the operation of a portion of the circuitry shown in FIG. 16;

FIGS. 18A–18D are waveform diagrams which are useful in explaining the operation of another portion of the circuitry shown in FIG. 16;

FIGS. 19A–19E are waveform diagrams which are used in discussing the operation of the circuitry shown in FIG. 16; and FIGS. 20A–20G are waveform and timing diagrams which are used in discussing another aspect of the operation of the circuitry shown in FIG. 16.

DETAILED DESCRIPTION OF SOME PREFERRED EMBODIMENTS

Figure 1:
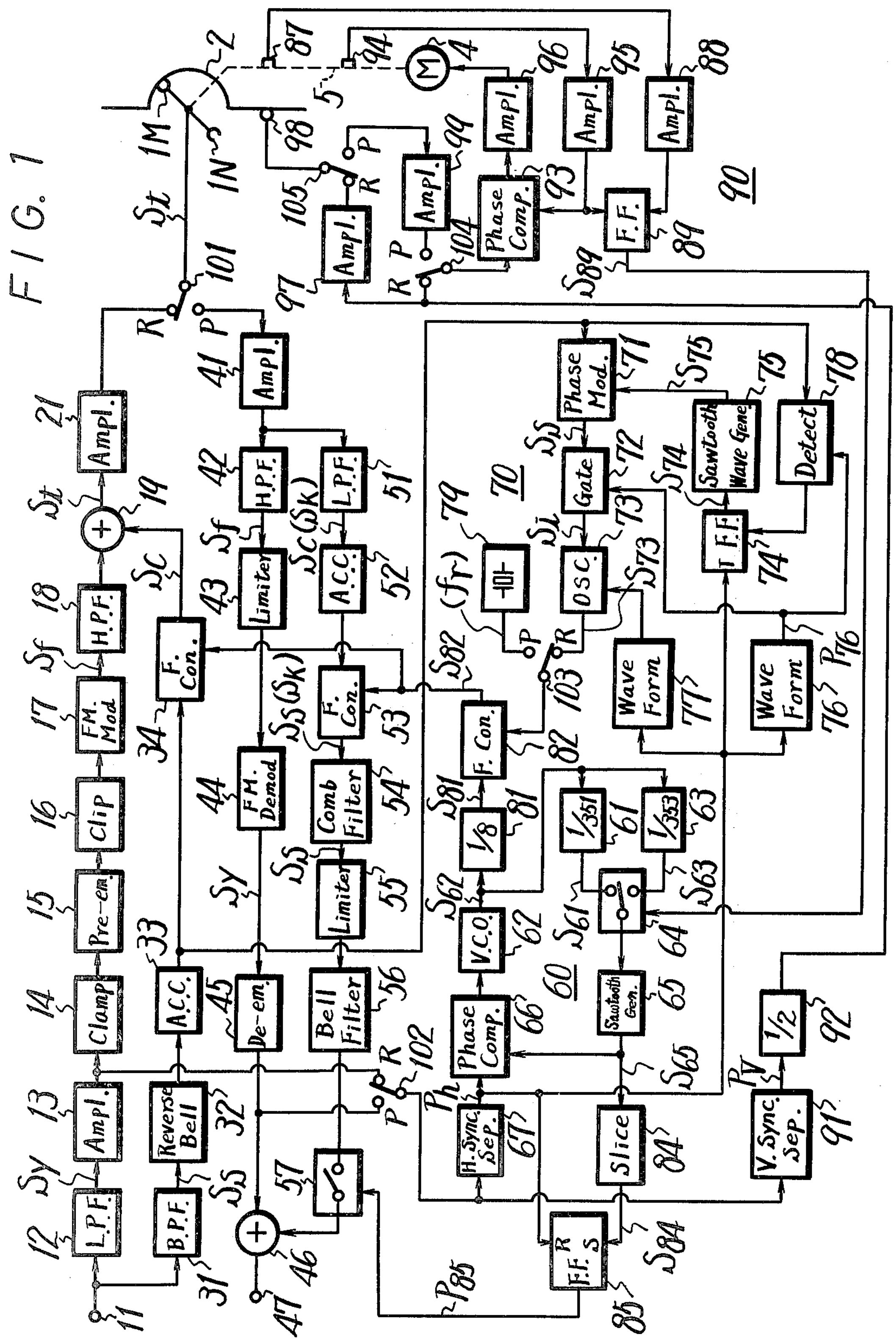
FIG. 1 is a block diagram of one embodiment of apparatus in accordance with the present invention.

The present invention is particularly adapted to record a SECAM composite color television signal in parallel tracks on a record medium with a high recording density. That is, the record tracks are adjacent to each other, and are not separated by guard bands. This improves the efficiency of the usage of the record medium by eliminating the requirement heretofore present in SECAM television signal recording systems that "blank" portions of the record medium must be maintained between adjacent tracks. Further, and as will be appreciated, by using the present invention, the longitudinal margins of adjacent tracks may even overlap with each other during recording. Nevertheless, cross-talk components which may be picked up during a reproducing operation when the reproducing transducer, or head, scans a portion of an adjacent record track, will be eliminated from the ultimately reproduced SECAM television signal. This is particularly true for chrominance cross-talk components which may be reproduced.

In the foregoing description and in the claims, it should be understood that the term SECAM composite color television signal refers to the conventional line-sequential format of the chrominance component of the television signal, such as in the SECAM systems used, for example, in France and the U.S.S.R. In this SECAM format, the chrominance component is formed by frequency-modulating a chrominance subcarrier with a color difference signal. Specifically, during one line interval, a red subcarrier is frequency-modulated with the red color difference signal (R-Y) and during the next following line interval, a blue subcarrier is frequency-modulated with the blue color difference signal (B-Y). The red subcarrier has a frequency of 282fh, and the blue subcarrier has a frequency of 272fh, where fh is the horizontal line frequency of the SECAM television signal, that is, fh=15.625KHz. Thus, in the SECAM system, successive line intervals are provided with the red subcarrier (approximately 4.41 MHz) frequency-modulated by the red color difference signal, followed by the next line interval wherein the blue subcarrier of approximately of 4.25 MHz is frequency-modulated with the blue color difference signal, followed by the next line interval wherein the red subcarrier is frequency-modulated by the red color difference signal, and so on. Thus, the red and blue color difference signals are present during alternate line intervals; and the color information is transmitted line-sequentially. Furthermore, in the SECAM format, the phase of the chrominance subcarrier of each third line interval is inverted with respect to the phases of the chrominance subcarriers in preceding and succeeding line intervals. In one field, the phases of the chrominance subcarriers in the first and second line intervals each may be equal to zero, the phase of the chrominance subcarrier in the third interval is equal to 180°, the phase of the chrominance subcarriers in the fourth and fifth line intervals each are equal to zero, the phase of the chrominance subcarrier in the sixth line interval is equal to 180°, and so on. In the next field, the phases of the chrominance subcarriers in the first two line intervals each are equal to 180°, the phase of the chrominance subcarrier in the third line interval is equal to zero, the phase of the chrominance subcarriers in the fourth and fifth line intervals each is equal to 180°, the phase of the chrominance subcarrier in the sixth line interval is equal to zero, and so on. Thus, in each frame, the phase relation of the chrominance subcarriers in the respective fields are opposite to each other. If the first field interval in each frame is represented as interval $T_m$ and the second field interval in that frame is represented as interval $T_n$, then the phase of each (3m)th line interval in field $T_m$ is equal to 180° (or $\pi$) while the phase in each of the (3m+1)th and (3m+2)th line intervals is equal to zero, wherein m is an integer. During field interval $T_n$, the phase of the (3n)th line interval is equal to zero, and the phase of the (3n+1)th and (3n+2)th line intervals is equal to 180°, wherein n is an integer.

In addition to this particular format, that is, wherein red and blue subcarriers are transmitted sequentially by line and are frequency-modulated with the red and blue color difference signals, respectively, and wherein the phase of the chrominance subcarrier in each third line interval is inverted with respect to the phase of the chrominance subcarriers in adjacent line intervals, the SECAM system also provides an unmodulated chrominance subcarrier during the back porch interval of each horizontal synchronizing interval. This unmodulated chrominance subcarrier, referred to herein as a discriminating signal, is equal in frequency to the frequency-modulated chrominance subcarrier in the remainder of the line interval. Thus, during the line interval that the red subcarrier is frequency-modulated with the red color difference signal, the discriminating signal provided during the back porch interval in that line interval has a frequency and phase equal to the red subcarrier. Similarly, during the line interval that the blue subcarrier is frequency-modulated with the blue color difference signal, the discriminating signal has a frequency and phase equal to the blue subcarrier.

Another convention of the SECAM system is that the frame repetition rate (each frame is, of course, comprised of two field intervals) is equal to 25 Hz. Also, each frame is comprised of 625 line intervals. Furthermore, during a predetermined portion of the vertical synchronizing interval, such as during that portion of the vertical synchronizing interval following the usual equalizing pulses, a color discriminating signal is provided which is used by SECAM television receivers to lock the receiving circuitry to the appropriate chrominance subcarriers which are recorded in the aforementioned line sequential manner.

Referring now to FIG. 1, there is illustrated one embodiment of apparatus for recording a SECAM composite color television signal on a record track, and for reproducing the recorded SECAM composite color television signal. The recording/reproducing apparatus includes a pair of rotary transducers 1M and 1N mechanically coupled to a drive motor M by a drive shaft 5 for scanning successive, parallel record tracks across a record medium 2. In the embodiment described herein, it is assumed that record medium 2 is magnetic tape. Furthermore, transducers 1M and 1N are magnetic heads which are capable of recording and reproducing signals on magnetic tape. These heads are spaced apart from each other by about 180° such that the heads scan alternate record tracks across tape 2. As one example, tape 2 may be helically wrapped about at least 180° of the peripheral portion of a rotary guide drum (not shown), and longitudinally driven by conventional tape-driving apparatus, such as the combination of a capstan and pinch roller.

A record/playback change-over switch 101, which may be manually operative to dispose the illustrated apparatus in either a recording mode or a reproducing mode, electrically connects heads 1M and 1N either to recording circuitry or to playback circuitry. Change-over switch 101 is ganged with other record/playback change-over switches 102, 103, 104 and 105, described in greater detail below. Referring first to the recording circuitry which is connected through switch contact R of change-over switch 101 to heads 1M and 1N, this circuitry includes a luminance channel for processing the luminance component included in a received SECAM composite color television signal, and a chrominance channel for processing the chrominance component of the SECAM television signal. As is conventional, the frequency spectrum of the chrominance component of the SECAM television signal generally is disposed at the higher end, or may be greater than that of the luminance component. Hence, the luminance and chrominance components can be separated from each other and separately processed in the luminance and chrominance channels, respectively.

The luminance channel is comprised of a low pass filter 12, a clamping circuit 14, a pre-emphasis circuit 15, a white-and-dark clipper 16, and a frequency modulator 17. Low pass filter 12 is coupled to an input terminal 11 and is adapted to pass the luminance component included in the SECAM television signal, while substantially attenuating the higher frequencies of the chrominance component. The output of low pass filter 12 is coupled via a luminance amplifier 13, such as an automatic gain control (AGC) amplifier to clamp circuit 14. The clamp circuit is adapted to maintain the proper DC levels of the luminance component referenced to, for example, the pedestal level of the horizontal blanking signal. The output of clamp circuit 14 is supplied through pre-emphasis circuit 15, which may be a conventional pre-emphasis circuit, to a dark-and-white clipper 16. This clipper serves to prevent the dark and white levels of the luminance component from exceeding predetermined values. The luminance signal provided at the output of clipper 16, which is a properly compensated and prepared luminance signal, is supplied to frequency modulator 17 wherein the luminance component frequency-modulates a carrier of relatively higher frequency, resulting in a frequency-modulated (FM) luminance component $S_f$. This higher frequency FM luminance component is supplied through high pass filter 18 to a combining circuit 19, shown herein as a summing circuit. This combining circuit is adapted to combine the chrominance component processed by the chrominance channel with the FM luminance component, and then to supply the combined signal through a recording amplifier 21 and change-over switch 101 to heads 1M and 1N.

In order to exploit the aforementioned phenemenon of azimuth loss for eliminating cross-talk interference due to the higher frequency luminance component which may be picked up from an adjacent record track during the reproducing operation, heads 1M and 1N are provided with air gaps of different azimuth angles. Hence, if the higher frequency FM luminance component which is recorded in a record track by head 1M is, subsequently, reproduced by head 1N, this reproduced FM luminance component will be substantially attenuated because of azimuth loss.

The chrominance channel included in the recording section of the illustrated apparatus includes a band pass filter 31, a reverse bell filter 32, an automatic chrominance control circuit 33 and a frequency converter 34. Band pass filter 31 has its pass band established so as to transmit the chrominance component of the SECAM television signal, while excluding the lower frequency luminance component thereof. The output of this band pass filter is connected to reverse bell filter 32, the latter having a frequency characteristic which resembles the inverse of a bell-shaped curve. Hence, reverse bell filter 32 serves, in part, to provide some frequency compensation to the filtered chrominance component derived from band pass filter 31, it being recognized that the frequency response of this band pass filter resembles a bell-shaped curve. The output of the reverse bell filter is supplied to frequency converter 34 by automatic chrominance control (ACC) circuit 33. The ACC circuit is adapted to control the level of the filtered chrominance component so as to eliminate undesired amplitude fluctuations therein. As an example, ACC circuit 33 may include a gate circuit operative to transmit the discriminating signal which, it is recalled, is present during the back porch portion of the horizontal synchronizing signal. The amplitude of this transmitted discriminating signal is detected and used to adjust the amplitude of the chrominance component accordingly. As an alternative embodiment, since the chrominance component is comprised of frequency-modulated blue and red subcarriers, and since color information is not represented by amplitude fluctuations, ACC circuit 33 may be replaced by a limiter circuit.

Frequency converter 34 is adapted to frequency-convert the chrominance component supplied thereto from ACC circuit 33 to a frequency range which is lower than the band occupied by the FM luminance component. This is achieved by modulating, or heterodyning, the chrominance component with a frequency converting signal to produce upper and lower side bands, and then by selecting the lower side band as the frequency-converted chrominance component. As one example thereof, the frequency-converting signal may have a frequency which is greater than the chrominance subcarrier frequency such that, upon heterodyning, the frequency of the frequency-converted chrominance component is equal to the difference between the frequency of the frequency-converting signal and the frequency of the original chrominance subcarrier. The output of frequency converter 34 is coupled to combining circuit 19.

It is recalled that, although the phenomenon of azimuth loss is effective to eliminate cross-talk interference in the reproduced FM luminance component because of the higher frequencies of this FM luminance component, this phenomenon is not equally effective to eliminate chrominance cross-talk interference. Accordingly, in accordance with one aspect of the present invention now to be described, the frequency-converted chrominance component which is recorded in one track has a chrominance subcarrier frequency which differs from the chrominance subcarrier frequency that is recorded in the next adjacent track. The difference in frequency is such that the cross-talk component can be eliminated by use of a comb filter, while passing the main chrominance component with only minimal attenuation. To this effect, the frequency converted signals supplied to frequency converter 34 are generated by an automatic frequency control (AFC) circuit 60, the phase of the frequency converting signal generated by this AFC circuit being controlled by a phase control circuit 70.

AFC circuit 60 is comprised of a controllable oscillator 62, such as a voltage controlled oscillator (VCO), a pair of frequency dividers 61 and 63, a switching circuit 64, a phase comparator comprised of a sawtooth generator 65 and a comparator circuit 66, and a synchronizing signal separator 67. The purpose of AFC circuit 60 is to control the frequency of the oscillating signal generated by VCO 62 so as to be synchronized with the horizontal synchronizing pulse included in the SECAM television signal. The frequency of the oscillating signal generated by VCO 62 may be controlled so as to be equal to $m_1fh$ or $m_2fh$, depending upon the control voltage supplied thereto by the phase comparator. The output of VCO 62 is connected in common to frequency dividers 61 and 63. Each of these dividers may be of conventional construction, and divider 61 is adapted to divide the frequency of the oscillating signal supplied thereto by a factor of $m_1$, while divider 63 is adapted to divide the frequency of the oscillating signal supplied thereto by the factor $m_2$. The outputs of frequency dividers 61 and 63 are connected to respective inputs of switching circuit 64. This switching circuit is controlled by a sensing circuit 90 (to be described) to pass either the frequency-divided oscillating signal produced by divider 61 or the frequency-divided oscillating signal produced by divider 63. As will be explained, when head 1M scan tape 2, switching circuit 64 is controlled so as to couple frequency divider 61 to its output. Conversely, when head 1N scans tape 2, switching circuit 64 is controlled to couple frequency divider 63 to its output.

Sawtooth generator 65 is coupled to the output of switching circuit 64 and is adapted to generate a sawtooth waveform whose frequency is synchronized with that of the frequency-divided oscillating signal which is passed by the switching circuit. The output of the sawtooth generator is coupled to comparator 66, the latter also receiving the horizontal synchronizing pulses which are separated from the SECAM television signal by synchronizing signal separator 67. As one embodiment thereof, comparator circuit 66 may comprise a sample-and-hold circuit which utilizes the separated horizontal synchronizing pulses to sample the level of the sawtooth waveform generated by sawtooth generator 65. The output of comparator circuit 66, that is, the sampled level of the sawtooth waveform, is supplied as a control voltage, such as a DC control voltage, to VCO 62.

It may be appreciated that, if switching circuit 64 is controlled to couple the output of frequency divider 61 to sawtooth generator 65, the frequency of the oscillating signal generated by VCO 62 is synchronized with the horizontal synchronizing pulse to be equal to $m_1$fh. Alternatively, if switching circuit 64 is controlled so as to couple the output of frequency divider 63 to sawtooth generator 65, the frequency of the oscillating signal generated by VCO 62 is synchronized with the horizontal synchronizing pulses to be equal to $m_2$fh. As a numerical example, $m_1$ may be equal to 351, and $m_2$ may be equal to 353. Preferably, the separated horizontal synchronizing pulses will sample the middle portion of the sawtooth waveform generated by sawtooth waveform generator 65. Any change in the frequency of the oscillating signal generated by VCO 62 will, therefore, appear as a change in the sampled level produced at the output of comparator circuit 66. This output functions to return the frequency of the oscillating signal to its desired level (i.e., either 351fh or 353fh). As will be explained below, the difference between the dividing factors $m_1$ and $m_2$ of frequency dividers 61 and 63 may be expressed generally as 2n, wherein n is an odd integer. In the illustrated embodiment, n=1.

The oscillating signal generated by VCO 62 is further coupled to a frequency divider 81 wherein the frequency of this oscillating signal is divided by a factor $m_3$. In the embodiment illustrated herein, $m_3=8$. Thus, depending upon which of frequency dividers 61 and 63 is coupled to sawtooth generator 65, that is, depending upon whether head 1M or head 1N scans tape 2, the output of frequency divider 81 is equal to $(44-\frac{1}{8})$fh or $(44+\frac{1}{8})$fh. A general expression for frequency dividing factors $m_1$, $m_2$ and $m_3$ is $(m_1-m_2)/m_3=n/4$, wherein n is an odd integer. In the illustrated embodiment, n=1. The output of frequency divider 81 is coupled to a frequency converter 82 whereat it is heterodyned with a phase-controlled oscillating signal of substantially constant frequency for producing a frequency-converting signal whose phase is synchronized with the phase of the chrominance subcarrier of the SECAM television signal.

Phase control circuit 70 is adapted to generate the forementioned phase-controlled oscillating signal of substantially constant frequency. The output of phase control circuit 70 is coupled via the recording contact R of a recording/playback change-over switch 103 to frequency converter 82.

The phase control circuit is comprised of a phase modulator 71, an injection-locked start-stop oscillator 73, a sawtooth waveform generator 75 and a sawtooth control circuit formed of a triggerable flip-flop circuit 74 and a detector circuit 78. Phase modulator 71 is described in greater detail hereinbelow with respect to the schematic diagram therefor illustrated in FIGS. 7 and 9. The phase modulator is connected to the output of ACC circuit 33 to receive the discriminating signal and frequency-modulated chrominance subcarrier included in each horizontal line interval of the SECAM television signal. Phase modulator 71 additionally is connected to the output of sawtooth waveform generator 75 to receive the sawtooth waveform generated therefrom as a phase-modulating signal. This sawtooth waveform generator is illustrated in greater detail in the schematic diagram of FIG. 7. Although this sawtooth waveform generator will be discussed in greater detail below, suffice it to say for the purpose of the present discussion that this generator functions to produce a sawtooth waveform for each alternate horizontal line interval, commencing with the back porch portion of the horizontal synchronizing interval included in that line interval. Furthermore, sawtooth waveform generator 75 includes a control input connected to triggerable flip-flop circuit 74, whereby the generated sawtooth waveform is controlled to be produced only during, for example, those line intervals in which the blue subcarrier is present. To this effect, triggerable flip-flop circuit 74, which may comprise a J-K flip-flop circuit, or other well-known triggerable flip-flop circuits, has its trigger input connected to synchronizing signal separator 67 so as to receive the separated horizontal synchronizing pulse therefrom. Also, detector circuit 78, which is coupled to the output of ACC circuit 33 for detecting when the blue or red subcarriers are present in the received SECAM television signal, is coupled to a so-called forced-set or forced-reset terminal of flip-flop circuit 74 so as to set or reset that flip-flop circuit, respectively, if necessary, in response to the detected blue or red subcarrier. In this regard, detector 78 may comprise a frequency discriminator for detecting the presence of the blue subcarrier of frequency 272fh or red subcarrier of frequency 282fh.

In accordance with the illustrated embodiment, the sawtooth waveform produced by sawtooth waveform generator 75 increases linearly during at least the back porch portion of the horizontal synchronizing interval. Thus, the phase of the discriminating signal and modulated subcarrier supplied to phase modulator 71 likewise changes at a linear rate. It is appreciated that this change with respect to time of the phase of the discriminating signal and modulated subcarrier results in a change in the frequency thereof. In particular, the sawtooth waveform is selected such that, if the discriminating signal supplied to phase modulator 71 is the blue subcarrier, the frequency of this discriminating signal is changed from 272fh to 282fh, that is, to the frequency of the red subcarrier. The output of phase modulator 71 is connected through a gate circuit 72 to injection-locked oscillator 73. Gate circuit 72 includes another input coupled to a waveform generator 76, the latter being connected, in turn, to synchronizing signal separator 67 for supplying a gating signal to gate circuit 72, the gating signal coinciding in time with the back porch portion of the horizontal synchronizing interval.

Figure 10:
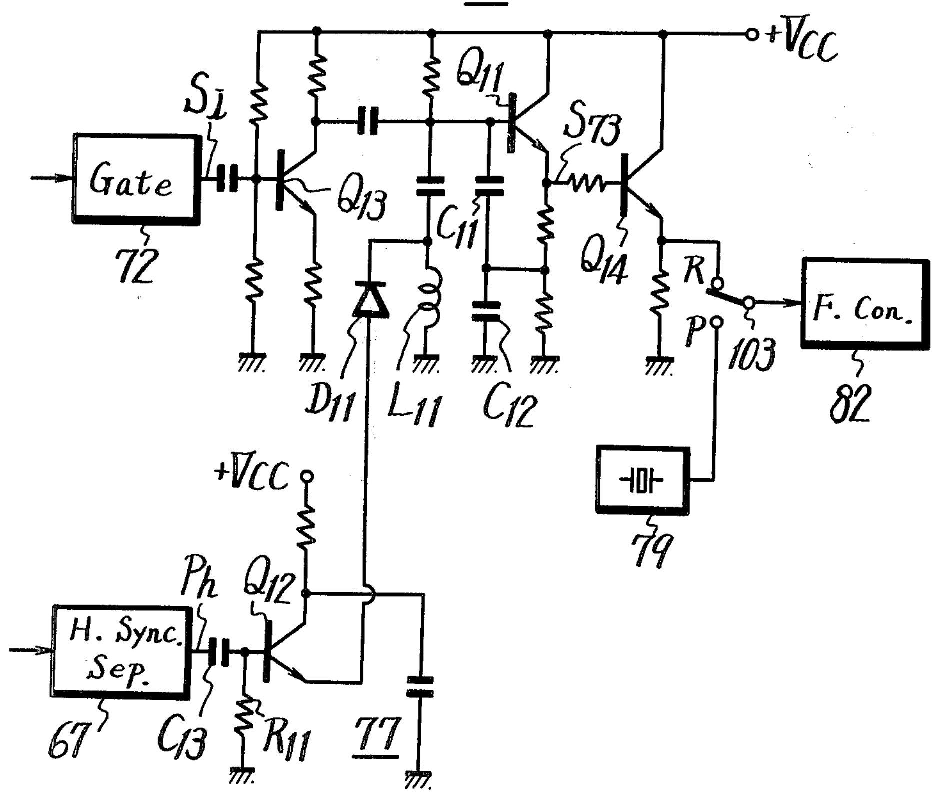
FIG. 10 is a schematic diagram of another portion of the apparatus shown in FIG. 1.

Injection-locked oscillator 73, which is described in greater detail with respect to the schematic illustration thereof in FIG. 10, generates an oscillating signal which, in the absence of an external signal injected thereinto, has a frequency $f_r$, the frequency of the red subcarrier. Oscillator 73 commences its oscillating operation in response to the signal supplied thereto by gate circuit 72, the phase of this oscillating signal being synchronized, or locked, to the phase of this supplied signal. As will be explained below, phase modulator 71 has no effect upon the phase of the red subcarrier which is applied thereto and, with respect to the blue subcarrier, merely shifts the frequency thereof from the blue subcarrier frequency $f_b$ to the red subcarrier frequency $f_r$, but does not modify the phase of that blue subcarrier. Hence, if the red subcarrier supplied to the phase modulator has a phase of 0° to 180°, the output of the phase modulator will have the frequency $f_r$ and a corresponding phase of 0° or 180°, respectively. The frequency of the signal produced at the output of phase modulator 71 in response to a blue subcarrier applied thereto will be equal to $f_r$, and the phase of this output signal will be equal to the phase of the blue subcarrier, that is, either 0° or 180°. Hence, gate circuit 72 supplies injection-locked oscillator 73 with a discriminating signal of frequency $f_r$ and of a phase which is equal to the phase of the discriminating signal then present in the SECAM television signal, that is, a phase of either 0° or 180°. The oscillating signal generated by injection-locked oscillator 73 thus will have a constant frequency $f_r$ and a phase that is equal to the phase of the discriminating signal included in the received SECAM television signal.

Since oscillator 73 is an injection-locked start-stop oscillator, it commences oscillation in response to the discriminating signal applied thereto by gate circuit 72, and it terminates its oscillation in response to a pulse signal applied thereto by waveform shaping circuit 77. This waveform shaping circuit is coupled to synchronizing signal separator 67 to shape the separated horizontal synchronizing pulses for terminating the operation of oscillator 73.

As mentioned previously, sensing circuit 90 is coupled to switching circuit 64 for controlling the operation of this switching circuit. The sensing circuit is adapted to sense when head 1M and head 1N, respectively, scan tape 2. To this effect, drive shaft 5 is provided with magnetic elements positioned thereon in predetermined relation with respect to heads 1M and 1N, respectively. Magnetic pick-up devices 87 and 94 are fixedly disposed to sense the rotation of these respective magnetic elements therepast. Thus, when head 1M moves into initial contact with tape 2, magnetic pick-up device 87 produces an output pulse which is coupled to a set-reset (S-R) flip-flop circuit 89 by an amplifier 88. Hence, the flip-flop circuit is set to one state when head 1M commences its scanning trace across tape 2. When head 1N rotates into initial contact with tape 2, magnetic pick-up device 94 produces an output pulse which is supplied to flip-flop circuit 89 by an amplifier 95. This pulse serves to reset the flip-flop circuit to its second state, thus representing that head 1N has commenced its scanning trace across tape 2. The output of flip-flop circuit 89 is coupled to the control input of switching circuit 64, whereby this switching circuit is operated to couple either frequency divider 61 or frequency divider 63 to sawtooth waveform generator 65 depending upon the set or reset condition of the flip-flop circuit.

The recording section of the illustrated apparatus additionally includes a stationary magnetic head 98 for recording control signals along one edge of magnetic tape 2. These control signals are synchronized with the frame intervals of the SECAM television signal. To this effect, a vertical synchronizing signal separator 91 is coupled to the luminance channel to separate the vertical synchronizing signal from the SECAM television signal. It is appreciated that this vertical synchronizing signal recurs at the field repetition rate. Hence, a frequency divider 92, such as a triggerable flip-flop circuit, is coupled to the output of vertical synchronizing separator 91 to produce a pulse signal which recurs at the frame repetition rate. This pulse signal is supplied through a recording amplifier 97 and through the recording contact R of record/playback change-over switch 105 to head 98. The output of frequency divider 92 also is used in a servo control circuit for rotary drive motor 4. This servo control circuit includes a phase comparator 93 having one input connected through the recording contact R of record/playback change-over switch 104 to the output of frequency divider 92, and another input connected through amplifier 95 to magnetic pick-up device 94. The phase relation between the occurrence of the vertical synchronizing signals included in the received SECAM television signal and the rotary position of heads 1M and 1N is detected by phase comparator 93. If this phase relation is other than a predetermined, desired condition, an error signal is produced by the phase comparator and supplied via amplifier 96 to motor 4 so as to adjust the rotary positioning of heads 1M and 1N.

Operation of the Chrominance Recording Section

It is appreciated that the luminance channel illustrated in FIG. 1 operates in a manner similar to that of the luminance channels included in video tape recording (VTR) apparatus known to the prior art. That is, the separated luminance component, after being suitably clamped, pre-emphasized and clipped, frequency modulates a relatively higher frequency carrier in frequency modulator 17. The resultant FM luminance component $S_f$ is supplied the combining circuit 19 via high pass filter 18, whereat the FM luminance component $S_f$ is combined with the frequency-converted chrominance component $S_c$ to produce the processed, composite SECAM television signal $S_t$. This processed SECAM television signal then is recorded by heads 1M and 1N is successive, parallel record tracks on tape 2.

Let it be assumed that a given frame interval is constituted by successive field intervals $T_m$ and $T_n$. As is conventional, the chrominance component of the SECAM television signal is formed of alternating red and blue subcarriers, provided in alternating horizontal line intervals, these subcarriers being frequency-modulated with the red and blue color difference signals, respectively. Thus, the line intervals during each field interval may be designated $t_r$, $t_b$, $t_r$, . . . and so on. Thus, the red and blue color information is transmitted line sequentially. Let it be assumed that the discriminating signal in each back porch portion of the horizontal synchronizing intervals is represented as $S_i$. It is appreciated that the frequency of this discriminating signal is either the red subcarrier frequency $f_r$ or the blue subcarrier frequency $f_b$ depending upon whether this discriminating signal is present during the red line intervals $t_r$ or the blue line intervals $t_b$. Let it be further assumed that the color information portion of the chrominance component is represented as $S_s$, that is, $S_s$ represents the red or blue subcarrier which is frequency-modulated with the red or blue color difference signal. During each third line interval of field interval $T_m$, the phase of the discriminating signal $S_i$ and the phase of the chrominance component $S_s$ is equal to $\pi$, while the phase of the discriminating and color signals during the remaining line intervals is equal to zero. During each third line interval of field interval $T_n$, the phase of the discriminating and chrominance components $S_i$ and $S_s$, respectively, is equal to zero, while the phase of the discriminating and color signals $S_i$ and $S_s$, respectively, is equal to $\pi$ during the remaining line intervals. This frequency and phase relationship of the discriminating and color signals during each line interval of each field interval is depicted in FIG. 2A.

As heads 1M and 1N are driven to scan successive parallel tracks across tape 2, magnetic pick-up devices 87 and 94 generate pulses which represent the rotary positions of these heads. These pulses, in turn, serve to set and reset flip-flop circuit 89. Consequently, this flip-flop circuit produces a switch control signal $S_{89}$, as illustrated in FIGS. 2B. It is assumed, for the purpose of the present discussion, that when switch control signal $S_{89}$ admits of its relatively higher level, switching circuit 64 is operated to couple the frequency-divided oscillating signal $S_{61}$, produced by frequency divider 61, to sawtooth waveform generator 65. Conversely, when switch control signal $S_{89}$ admits of its relatively lower level, as when field interval $T_n$ is recorded, switching circuit 64 is operated to couple frequency-divided oscillating signal $S_{63}$, produced by frequency divider 63, to sawtooth waveform generator 65. This operation of switching circuit 64 is depicted in FIG. 2C. Thus, when field interval $T_m$ is recorded in a track, the frequency of the oscillating signal $S_{62}$ produced by VCO 62 is equal to 351fh, referred to herein as $m_1$fh. When field interval $T_n$ is recorded, the frequency of the oscillating signal $S_{62}$ produced by VCO 62 is controlled to be equal to 353fh, referred to herein as $m_2$fh. This control over the frequency of oscillating signal $S_{62}$ by AFC circuit 60 is represented in FIG. 2D. It is appreciated that the difference in the frequencies of oscillating signal $S_{62}$ produced during the recording of field intervals $T_m$ and $T_n$ is equal to $|m_1-m_2|$fh. In the present example, this frequency difference is equal to 2fh.

Oscillating signal $S_{62}$ is frequency divided by a factor of eight, referred to herein as $m_3$, by additional frequency divider 81. Hence, during the recording of field interval $T_m$, as by head 1M, the frequency of signal $S_{81}$ is equal to $m_1/m_3$, or $(44-\frac{1}{8})$fh. During the recording of field interval $T_n$ by head 1N, signal $S_{81}$ has a frequency equal to $m_2/m_3$, or $(44+\frac{1}{8})$fh. The frequency of signal $S_{81}$ during the recording of field intervals $T_m$ and $T_n$ is depicted in FIG. 2E. This signal $S_{81}$ is combined in frequency converter 82 with the oscillating signal $S_{73}$, produced by injection-locked oscillator 73, to result in the frequency-converting signal $S_{82}$.

The manner in which phase control circuit 70 operates to produce the oscillating signal $S_{73}$ now will be described with reference to FIGS. 3A and 3C–3J. FIG. 3A represents the luminance component $S_Y$ which is separated from the received composite SECAM color television signal and separately processed by the aforedescribed luminance channel. Each of the successive line intervals $t_b$, $t_r$, $t_b$, . . . commences with a horizontal synchronizing pulse $P_h$. Following this horizontal synchronizing pulse, and included within the horizontal synchronizing interval, is the back porch portion $t_p$ of the horizontal synchronizing interval. Then, the video signal information is transmitted during interval $t_h$, followed by the front porch portion of the next horizontal synchronizing interval. Synchronizing signal separator 67 functions to separate the horizontal synchronizing pulses $P_h$ from the luminance component $S_y$, is conventional fashion. These separated horizontal synchronizing pulses $P_h$ are depicted in FIG. 3C. It is recalled that these horizontal synchronizing pulses are used as sampling pulses in comparator circuit 66 to sample the sawtooth waveform $S_{65}$ (FIG. 3B) produced by sawtooth waveform generator 65, these sampled levels being used to synchronize the frequency of VCO 62 to the horizontal line frequency.

FIG. 3D represents the chrominance component $S_s$ which is provided at the output of ACC circuit 33 and which is supplied to phase modulator 71. This chrominance component $S_s$ includes the discriminating signal $S_i$, transmitted during the back porch portion $t_p$ of each horizontal synchronizing interval, followed by the appropriate chrominance subcarrier which is frequency-modulated with chrominance information. Hence, during line interval $t_b$, the blue subcarrier is modulated with the blue color difference signal, this modulated subcarrier being represented as $S_b$ in FIG. 3D. Similarly, during the red line interval $t_r$, the red subcarrier is modulated with the red color difference signal, as represented by $S_r$. Of course, in accordance with the SECAM system, the frequency of the discriminating signal $S_i$ during the blue line intervals $t_b$ is equal to the blue subcarrier frequency $f_b$, and the frequency of the discriminating signal during the red line intervals $t_r$ is equal to the red subcarrier frequency $f_r$.

The separated horizontal synchronizing pulses $P_h$ (FIG. 3C) are supplied to the trigger input of triggerable flip-flop circuit 74. This flip-flop circuit functions to change its state in response to the trailing edge, or negative transition, of each horizontal synchronizing pulse. Thus, as flip-flop circuit 74 changes its state periodically, the output signal $S_{74}$ produced thereby appears as shown in FIG. 3E. This signal $S_{74}$ is supplied as a control signal to sawtooth waveform generator 75. For the particular sawtooth waveform generator which is used in the apparatus shown in FIG. 1, flip-flop circuit 74 should be reset such that its output signal $S_{74}$ admits of its relatively lower level during each blue line interval $t_b$. To insure that flip-flop circuit 74 is set and reset in proper synchronism with the red and blue line intervals, detector 68 functions to detect whether the red or blue line interval is present in the received SECAM television signal. Typically, detector 78 may comprise a frequency discriminator adapted to detect the frequency of the discriminating signal $S_i$ in each line interval. When the frequency of the discriminating signal is detected as being equal to $f_b$, a forced reset signal is supplied to flip-flop circuit 74. Conversely, if detector 78 detects that the discriminating signal $S_i$ has a red subcarrier frequency $f_r$, it supplies a forced set signal to triggerable flip-flop circuit 74. In either embodiment, flip-flop circuit 74 is suitably controlled such that the level of its output signal $S_{74}$ is changed over in response to each separated horizontal synchronizing pulse $P_h$, and that this level change-over operation occurs in the sequence shown in FIG. 3E, that is, in synchronism with the blue and red color line intervals.

The output signals $S_{74}$ (FIG. 3E) produced by triggerable flip-flop circuit 74 is supplied to sawtooth waveform generator 75 such that a linearly increasing waveform is commenced in response to each negative transition of the signal $S_{74}$. As will be explained in greater detail below, this linear increase in the sawtooth signal $S_{75}$ continues for a predetermined duration, and then the level of this sawtooth signal gradually returns to its initial, zero level. Thus, sawtooth waveform $S_{75}$ appears as shown in FIG. 3F. Since sawtooth waveform generator 75 is triggered to commence its operation only in response to the negative transition of the periodic pulse signal $S_{74}$, it is seen that the sawtooth waveform maintains its zero level throughout the entire red line interval $t_r$. That is, the positive transition in the periodic pulse signal $S_{74}$ has no effect upon sawtooth waveform generator 75.

The sawtooth waveform $S_{75}$ is supplied to phase modulator 71 whereat it modulates the phase of the chrominance signal $S_s$ (FIG. 3D) supplied thereto from ACC circuit 33. It is appreciated that, during each red line interval $t_r$, neither the discriminating signal $S_i$ nor the frequency-modulated red subcarrier $S_r$ is phase modulated. However, during each line interval $t_b$, the discriminating signal $S_i$ is phase-modulated during the back porch portion $t_p$ of the horizontal synchronizing interval, and then the frequency-modulated blue subcarrier $S_b$ also is frequency modulated, by the sawtooth waveform $S_{75}$. Let it be assumed that the initial phase of the chrominance component supplied to phase modulator 71 is equal to $\phi_0$. With specific reference to the blue line interval $t_b$, the phase of the discriminating signal $S_i$ at the start thereof is represented as $\phi_0$. The maximum phase modulation of the chrominance component $S_s$ during the blue line interval $t_b$ occurs at the peak level of the sawtooth waveform $S_{75}$. Then, as the level of this sawtooth changes, a corresponding phase modulation is imparted to the chrominance component $S_s$. FIG. 3G represents the phase modulation imparted to the discriminating signal $S_i$ and to the frequency-modulated blue subcarrier $S_b$ during the blue line interval $t_b$ by the sawtooth waveform $S_{75}$. The maximum phase modulation shown in FIG. 3G is expressed as $\rho$.

As mentioned above, the effect of phase-modulating the discriminating signal $S_i$ and the frequency-modulated blue subcarrier $S_b$ is to shift the frequency thereof. The manner in which this is achieved can best be appreciated by the waveform diagrams illustrated in FIGS. 4A and 4B. FIG. 4A shows a portion of the phase modulation illustrated in FIG. 3G. Hence, at the beginning of the back porch portion $t_p$, the amount of phase modulation produced by phase modulator 71 is equal to zero. However, this phase modulation, or phase shift, linearly increases from zero until, at a time $\tau (\tau \leqq t_p)$, the amount of phase shift produced by phase modulator 71 is equal to $\Delta\rho$. During the back porch portion $t_p$, only the discriminating signal $S_i$ is present. In the absence of any phase modulation thereof, this discriminating signal may appear as shown by the solid waveform of FIG. 4B. However, because of the increasing phase shift imparted to the discriminating signal by phase modulator 71 in response to the sawtooth waveform $S_{75}$, the wavelength of the discriminating signal $S_i$ gradually becomes shorter, as represented by the broken waveform in FIG. 4B. Thus, when sawtooth waveform $S_{75}$ produces a phase modulation, or phase shift, of the type represented in FIG. 4A, the frequency of the discriminating signal $S_i$ is increased.

As is known, frequency is expressed as a change of phase with respect to time. In FIG. 4B, the frequency of the discriminating signal $S_i$ changes by an amount $\Delta f$ in time $\tau$ in response to the phase modulation $\Delta\rho$, shown in FIG. 4A. Thus, the following relation between the phase shift $\Delta\rho$ and the frequency shift $\Delta f$ is obtained:

$$\Delta\rho = 2\pi\Delta f \quad (1)$$

At the beginning of the back porch portion, the frequency of the discriminating signal $S_i$ is equal to the blue subcarrier frequency $f_b$. At this same time, the amount of phase shift imparted by phase modulator 71 is equal to zero ($\Delta\rho = 0$). However, at time $\tau$, because of the phase shift $\Delta\rho$, the discriminating signal $S_i$ will have undergone a frequency shift $\Delta f$. Hence, the frequency of the discriminating signal at time $\tau$ is equal to $f_b + \Delta f$. For the purpose of the present invention, at time $\tau$, the frequency of the discriminating signal $S_i$ should have been shifted so as to be equal to the red subcarrier frequency $f_r$. Hence, the amount of frequency shift $\Delta f$, from which the amount of phase shift $\Delta\rho$ can be determined, may be expressed as:

$$\Delta f = f_r - f_b = 10 f_h \quad (2)$$

If $\tau$ is equal to 2 microseconds, then the amount of phase shift $\Delta\rho$, in terms of degrees, which is needed to shift the frequency of the discriminating signal from the blue subcarrier frequency $f_b$ to the red subcarrier frequency $f_r$ may be calculated as:

$$\Delta\phi = 2\pi \times 15.625 \times 10^4 \times \frac{180}{\pi} \times 2 \times 10^{-6} = 112.5°$$

Thus, if the sawtooth waveform $S_{75}$ is selected so as to provide a phase shift $\Delta\rho$ of 112.5° in a time interval $\tau$ of 2 microseconds, then, during the last portion of the back porch interval $(t_p - \tau)$, the frequency of the discriminating signal $S_i$ will be equal to the red subcarrier frequency $f_r$. Thus, during the back porch portion of each blue line interval, phase modulator 71 functions to shift the frequency of the discriminating signal $S_i$ from the blue subcarrier frequency $f_b$ to the red subcarrier frequency $f_r$.

During the back porch portion of the horizontal synchronizing interval during the red line interval $t_r$, the sawtooth waveform $S_{75}$ remains at its zero level. Hence, no frequency shift is imparted to the discriminating signal $S_i$ included in the red line interval. This means that this discriminating signal maintains its red subcarrier frequency $f_r$.

The phase-modulated chrominance component $S_s$ produced by phase modulator 71 is supplied through gate circuit 72 to injection-locked oscillator 73. If gate circuit 72 is opened only for the duration $\tau$ (FIG. 4A), then while this gate circuit remains open, the frequency of the discriminating signal $S_i$ during each blue line interval will be changed from the blue subcarrier frequency $f_b$ to the red subcarrier frequency $f_r$. Waveform shaping circuit 76, which may comprise a monostable multivibrator, is responsive to the separated horizontal synchronizing pulses $P_h$ to produce gating pulses $P_{76}$ having a duration $\tau$, as shown in FIG. 3H. Thus, gate circuit 72 transmits only the discriminating signal $S_i$ which is received from phase modulator 71. This discriminating signal $S_i$, shown in FIG. 3I, is applied to injection-locked oscillator 73.

It should be recognized that since the sawtooth waveform $S_{75}$ is zero during each red line interval $t_r$, no phase shift is imparted to the discriminating signal $S_i$ during the red line intervals by phase modulator 71. Hence, the phase of the discriminating signal $S_i$ applied to injection-locked oscillator 73 during the back porch portion $t_p$ of each red line interval $t_r$ is coincident in phase with the discriminating signal of the SECAM television signal then being received. That is, if the discriminating signal of the SECAM television signal has a phase of 0°, the phase of the discriminating signal applied to the injection-locked oscillator by gate circuit 72 likewise is 0°. Conversely, if the phase of the discriminating signal included in the SECAM television signal is 180°, the phase of the discriminating signal applied to injection-locked oscillator 73 by gate circuite 72 also is 180°. Furthermore, at the time $\tau$, that is, at the time that gate circuit 72 is about to close, the frequency of the discriminating signal which passes through this gate circuit during each blue line interval $t_b$ will have been frequency-shifted so as to be equal to the red subcarrier frequency $f_r$. However, at that time, the phase of the frequency-shifted discriminating signal will be equal to the phase of that discriminating signal prior to the frequency shift thereof. That is, during each blue line interval, the phase of the discriminating signal $S_i$, having been frequency-shifted from the blue subcarrier frequency $f_b$ to the red subcarrier frequency $f_r$ will be coincident with the phase of the discriminating signal included in the SECAM television signal then being received. That is, if the received discriminating signal during the blue line interval $t_b$ has a phase equal to 0°, then the frequency-shifted discriminating signal applied to injection-locked oscillator 73 by gate circuit 72 likewise will have a phase of 0°. Conversely, if the phase of the discriminating signal included in the blue line interval is equal to 180°, then the frequency-shifted discriminating signal which is applied to the injection-locked oscillator by gate circuit 72 also will have a phase of 180°. In this manner, the frequency of the oscillating signal $S_{73}$ produced by injection-locked oscillator 73 will be of a substantially constant frequency $f_r$, and will have a phase which is coincident with the phase of the chrominance component of the SECAM television signal then being received.

Injection-locked oscillator 73, described in greater detail below with respect to the schematic diagram of FIG. 10, also is a start-stop oscillator. That is, the oscillations thereof are commenced in response to the discriminating signal $S_i$ applied thereto by gate circuit 72, and these oscillations are terminated in response to a stop pulse applied to the oscillator by waveform shaping circuit 77. This waveform shaping circuit is responsive to the separated horizontal synchronizing pulses $P_h$ (FIG. 3C) to supply stop pulses of corresponding duration to oscillator 73. Hence, as shown in FIG. 3J, the oscillating signal $S_{73}$ produced by injection-locked start-stop oscillator 73 commences in response to the discriminating signal $S_i$ (FIG. 3I) and terminates in response to the leading edge of the separated horizontal synchronizing pulses $P_h$. Thus, throughout each line interval, except for the horizontal synchronizing pulse duration, oscillator 73 produces an oscillating signal of substantially constant frequency equal to the red subcarrier frequency $f_r$, and of a phase that is locked to the phase of the chrominance component $S_s$ included in the SECAM television signal.

To summarize, phase control circuit 70 injects the discriminating signal of red subcarrier frequency $f_r$ into injection-locked oscillator 73, without any modifications to the discriminating signal during each red line interval. During each blue line interval, phase modulator 71 shifts only the frequency of the discriminating signal from its blue subcarrier frequency $f_b$ to the red subcarrier frequency $f_r$, and injects this frequency-shifted discriminating signal into injection-locked oscillator 73. Nevertheless, the injected discriminating signal exhibits the same phase as the received discriminating signal. This phase relationship between the received chrominance component $S_s$ (FIG. 2A) and the oscillating signal $S_{73}$ produced by injection-locked oscillator 73 is shown in FIG. 2F. Thus, oscillating signal $S_{73}$ has a constant frequency $f_r$ and a phase that is synchronized with the phase of the received chrominance component.

Oscillating signal $S_{73}$ is supplied to frequency converter 82 via the record contact R of record/playback change-over switch 103. This frequency converter produces frequency-converting signals $S_{82}$ by heterodyning the oscillating signal $S_{73}$ and the frequency-divided oscillating signal $S_{81}$. The upper side band of these heterodyned signals is selected, such that the frequency of frequency-converting signal $S_{82}$ is equal to the sum of the frequencies of oscillating signals $S_{73}$ and $S_{81}$, and the phase of frequency-converting signal $S_{82}$ is equal to the sum of the phases of the heterodyned oscillating signals. It had been assumed that oscillating signal $S_{81}$ has a phase equal to the reference phase of 0°. Thus, and as shown in FIG. 2G, during the recording of field interval $T_m$, frequency-converting signal $S_{82}$ has a frequency equal to $(282+44-\frac{1}{8})$fh and a phase which is synchronized with the phase of the received chrominance component $S_s$. Similarly, during the recording of field interval $T_n$, frequency-converting signal $S_{82}$ has a frequency equal to $(282+44+\frac{1}{8})$fh, and a phase that is synchronized with the phase of the received chrominance component $S_s$. The frequency of frequency-converting signal $S_{82}$ during the recording of field interval $T_m$ differs from the frequency of frequency-converting signal $S_{82}$ during the recording of field interval $T_n$ by $\frac{1}{4}$fh. As a general expression, this frequency differential may be equal to n/4fh, wherein n is an odd integer.

Frequency converter 34, included in the chrominance channel, is supplied with the frequency-converting signals $S_{82}$ and also with the chrominance component $S_s$. During the recording of field interval $T_m$, wherein the frequency of the frequency-converting signal $S_{82}$ is equal to $(282+44-\frac{1}{8})$fh, the chrominance component is frequency-converted such that, during each red line interval $t_r$, the frequency-converted red color signal has a frequency $f_{mr}$ which may be expressed as:

$$f_{mr}=(282+44-\tfrac{1}{8})f_h-f_r=(44-\tfrac{1}{8})f_h,$$

and during each blue line interval $t_b$, the frequency-converted blue color signal has the frequency $f_{mb}$ which may be expressed as:

$$f_{mb}=(282+44-\tfrac{1}{8})f_h-f_b=(10+44-\tfrac{1}{8})f_h.$$

During the recording of field interval $T_n$, wherein the frequency of the frequency-converting signal $S_{82}$ is equal to $(282+44+\frac{1}{8})f_h$, the frequency-converted red color signal during each red line interval $t_r$ has the frequency $f_{nr}$, which may be expressed as:

$$f_{nr}=(282+44+\tfrac{1}{8})f_h-f_r+(44+\tfrac{1}{8})f_h,$$

and the frequency-converted blue color signal during each blue interval $t_b$ has the frequency $f_{nb}$ which may be expressed as:

$$f_{nb}=(282+44+\tfrac{1}{8})f_h-f_b=(10+44+\tfrac{1}{8})f_h.$$

From the phase relationship between the chrominance component of the SECAM television signal, as shown in FIG. 2A, and the frequency converting signal $S_{82}$, as shown in FIG. 2G, it is appreciated that the phase of the frequency-converted chrominance component $S_c$ derived from frequency converter 34 is of a constant phase 0° at each line interval in each field interval. This is because the frequency-converted chrominance component $S_c$ has a subcarrier frequency which is equal to the difference between the frequency of the frequency-converting signal $S_{82}$ and the subcarrier frequency of the chrominance component $S_s$, as well as a phase which is equal to the difference between the phase of the frequency-converting signal and the phase of the chrominance component. Thus, FIG. 2H represents that the frequency of the frequency-converted subcarrier in successive line intervals alternates between the frequency-converted red subcarrier frequency $f_{mr}$ and the frequency-converted blue subcarrier frequency $f_{mb}$ when field interval $T_m$ is recorded and alternates between the frequency-converted red subcarrier frequency $f_{nr}$ and the frequency-converted blue subcarrier frequency $f_{nb}$ when the field interval $T_n$ is recorded, yet the phase of the frequency-converted subcarriers is constant throughout each field interval.

The frequency-converted chrominance component $S_c$ (FIG. 2H) is combined in combining circuit 19 with FM luminance component $S_f$, and these combined signals, shown in FIG. 1 as the processed SECAM television signal $S_t$, are recorded in successive parallel record tracks on tape 2 by heads 1M and 1N. Thus, head 1M records the frequency-converted chrominance component $S_c$ during field interval $T_m$ in one track while head 1N records the frequency-converted chrominance component $S_c$ during field interval $T_n$ in the next adjacent track.

When the SECAM television signal is recorded with the frequency-converted chrominance component shown in FIG. 2H, the successive parallel tracks may be adjacent to each other and, if desired, the longitudinal edges thereof may even be in partially overlapping relation. FIG. 5 represents the manner in which tracks 3 are recorded on tape 2. Tracks 3M are recorded by head 1M, and thus contain field intervals $T_m$. Tracks 3N are recorded by head 1N and thus contain field intervals $T_n$. Tape 2 preferably is transported at a speed which, when taken in conjunction with the scanning traces of heads 1M and 1N, result in alignment on tracks 3M and 3N of the horizontal synchronizing intervals. That is, tracks 3M and 3N are recorded in the so-called H-alignment wherein the horizontal synchronizing intervals in successive tracks are aligned in a direction transversely of the tracks. This H-alignment reduces the cross-talk interference which may otherwise be caused by the blanking and synchronizing signals which are recorded in adjacent tracks.

In FIG. 5, those sections of each track which are provided with the mark "o" have the red color difference signals recorded therein; and those sections of each track which are provided with the mark "x" have the blue color difference signals recorded therein. Tracks 3M and 3N are shifted from each other in the longitudinal direction of each track by an amount equal to 2.5H, wherein H is the recording length of a horizontal line interval. By shifting adjacent tracks by this amount 2.5H, it is appreciated that the sections which contain the blue color difference signal are in alignment with each other and the sections which contain the red color difference signal also are in alignment with each other. Hence, the frequency of the frequency-modulated subcarrier recorded in one line interval in one track differs from the frequency of the frequency-modulated subcarrier which is recorded in an adjacent line interval in the next adjacent track. With respect to the frequency-modulated red subcarriers, this frequency difference is seen to be:

$$\begin{aligned} f_{mr}-f_{nr} &= (44-\tfrac{1}{8})f_h-(44+\tfrac{1}{8})f_h \\ &= \tfrac{1}{4}f_d \end{aligned} \quad (3)$$

Thus, the frequency-converted chrominance component in the red line intervals in tracks 3M and 3N are in frequency interleaved relationship with each other. Similarly, in each blue line interval, the difference between the frequency-converted blue subcarrier in track 3M differs from the frequency of the frequency-converted blue subcarrier in adjacent track 3N by:

$$\begin{aligned} f_{mb}-f_{nb} &= (10+44-\tfrac{1}{8})f_h-(10+44+\tfrac{1}{8})f \\ &= \tfrac{1}{4}f_h \end{aligned} \quad (4)$$

Thus, the frequency-converted blue subcarriers in adjacent tracks are in frequency-interleaved relationship to each other.

The manner in which the SECAM television signal recorded in the manner shown in FIG. 5 by the apparatus described with respect to FIG. 1 can be reproduced and recovered without undesired cross-talk interference will be described hereinbelow. Before proceeding with that description, reference will be made to FIGS. 7, 9 and 10 which are schematic illustrations of phase modulator 71 and sawtooth waveform generator 75, and of injection-locked oscillator 73, all included in phase control circuit 70.

Phase Modulator and Sawtooth Waveform Generator

Turning now to FIG. 7, phase modulator 71 is comprised of an emitter-coupled multivibrator formed of transistor Q71 and Q72 whose emitter electrodes are interconnected by a capacitor $C_{71}$ and whose emitter electrodes are further connected in series with the collector-emitter circuits of transistors Q73 and Q74. The base electrodes of transistors Q71 and Q72 are connected to ACC circuit 33 to receive the chrominance component $S_s$ included in the SECAM television signal. As shown, the chrominance component $S_s$ is applied differentially, that is, in opposite phase, to the base electrodes of transistors Q71 and Q72. Another input to phase modulator 71 is supplied from sawtooth waveform generator 75 in common to the base electrodes of transistors Q73 and Q74. The output of the phase modulator is derived from the collector electrode of transistor Q72 through an emitter-follower transistor Q75 to gate circuit 72.

Sawtooth waveform generator 75 is comprised of a monostable multivibrator 71 which is coupled to the output of flip-flop circuit 74 and responsive to the control pulse $S_{74}$ (FIG. 3E) to be triggered to its quasi-stable state. The output of this monostable multivibrator is coupled to a transistor Q76 whose collector-emitter circuit is connected to the emitter of a PNP transistor Q77. This latter transistor is provided with a reference bias voltage at its base electrode, and its collector electrode is connected in series with a capacitor $C_{72}$. This capacitor is connected in parallel with a resistor $R_{71}$, both of these circuit elements being connected to a reference potential, such as ground. The collector of transistor Q77 is further connected through an emitter-follower transistor Q78 to the input comprised of the base electrodes Q73 and Q74 of phase modulator 71.

In operation, the control phase $S_{74}$ produced by triggerable flip-flop circuit 74 appears as shown in FIG. 8A. Consistent with the previous description of this control pulse $S_{74}$, it is seen that control pulse $S_{74}$ has its relatively lower level during each blue line interval $t_b$ and has its relatively higher level during each red line interval $t_r$. The negative transition of control pulse $S_{74}$ triggers monostable multivibrator 751 to its quasi-stable state. This triggering of the monostable multivibrator supplies a negative output pulse $S_{751}$ of predetermined duration to transistor $Q_{76}$.

Transistor Q76 is rendered non-conductive in response to the negative-going pulse $S_{751}$. Hence, the collector voltage of transistor Q76 is increased so as to increase the emitter voltage of transistor Q77. This emitter voltage is greater than the base bias voltage supplied thereto, whereupon transistor Q77 is rendered conductive. Consequently, current flows from the voltage source $+V_{cc}$ through the emitter-collector circuit of transistor Q77 to charge capacitor $C_{72}$. This capacitor is charged by a constant current at a constant rate, as indicated in FIG. 8C. As the voltage across capacitor $C_{72}$ linearly increases, a corresponding linear increase in the voltage provided at the emitter output of emitter-follower transistor Q78 is applied to the base electrodes of transistors Q73 and Q74 in phase modulator 71. Thus, the chrominance component $S_s$ which is supplied to transistors Q71 and Q72 is phase-modulated by this linearly increasing voltage, shown as the sawtooth waveform $S_{75}$.

At the completion of the output pulse $S_{751}$ produced by monostable multivibrator 751, transistor Q76 once again is rendered conductive. Thus, the collector voltage thereof is reduced substantially to ground potential, thereby reducing the emitter voltage at transistor Q77 below that which is necessary to maintain this transistor conductive. The charging path to capacitor $C_{72}$ thus is interrupted. As a consequence thereof, the voltage across capacitor $C_{72}$ now discharges through resistor $R_{71}$, as indicated in FIG. 8C. It is this sawtooth waveform shown in FIG. 8C that is applied to the base electrodes of transistors Q73 and Q74 included in phase modulator 71. This sawtooth waveform phase-modulates the chrominance component $S_s$ applied to the base electrodes of transistor Q71 and Q72 in the manner discussed hereinabove, and as depicted in FIGS. 4A and 4B. This sawtooth waveform $S_{75}$ modifies the charging current of capacitor $C_{71}$, and thus the collector-emitter currents of transistors Q73 and Q74. Accordingly, transistor Q72 supplies emitter-follower transistor Q75 with the chrominance component $S_s$ phase-modulated by the sawtooth waveform $S_{75}$. The phase-modulated chrominance component, which appears as a frequency-shifted chrominance component, is supplied to gate circuit 72.

It is seen that, since no sawtooth waveform is applied to transistors Q73 and Q74 during the red line interval $t_r$, no phase-modulation, and thus no frequency-shift in the chrominance component $S_s$ is attained during this line interval.

Figure 9:
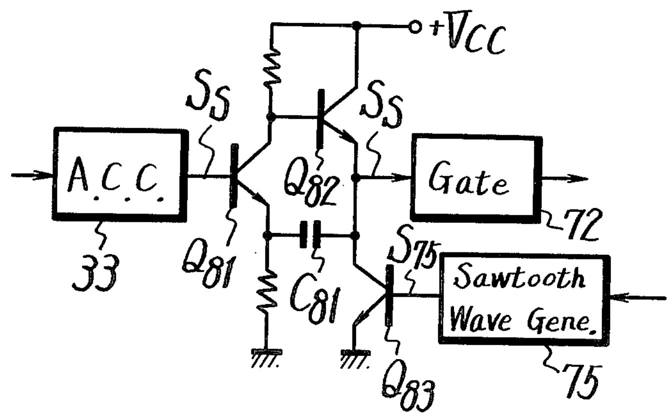
FIG. 9 is a schematic diagram of an alternative embodiment of a portion of the circuitry shown in FIG. 7.

Another embodiment of phase modulator 71 is schematically illustrated in FIG. 9 as comprising a transistor Q81 whose collector electrode is connected to the base electrode of a transistor Q82 and whose emitter electrode is connected via a capacitor $C_{81}$ to the emitter electrode of transistor Q 82. The collector-emitter circuit of a transistor Q83 is connected between the emitter of transistor Q82 and ground; and the sawtooth waveform produced by sawtooth waveform generator 75, described previously with respect to FIG. 7, is supplied to the base electrode of transistor Q83.

In operation, the chrominance component $S_s$ of the SECAM television signal is supplied from ACC circuit 33 to the base electrode of transistor Q81. Transistor Q81 supplies this chrominance component to transistor Q82. The output of the illustrated phase modulator is derived from the emitter of transistor Q82, and the phase of this output is determined by the time constant of capacitor $C_{81}$ and the emitter resistance $r_e$ of transistor Q82. The emitter resistance of transistor Q82 is changed as a function of the emitter current thereof, this emitter current being determined by the conductivity of transistor Q83. It is seen that the sawtooth waveform $S_{75}$ supplied to transistor Q83 by sawtooth waveform generator 75 determines the emitter current, and thus the emitter resistance $r_e$, of transistor Q82. Thus, the emitter resistance $r_e$ of transistor Q82 is varied as a function of the sawtooth waveform $S_{75}$ produced by sawtooth waveform generator 75 so as to correspondingly vary, or modulate, the phase of the chrominance component $S_s$ supplied to gate circuit 72 from the emitter of transistor Q82.

The Injection-Locked Oscillator

Turning now to FIG. 10, there is schematically illustrated one embodiment of injection-locked oscillator 73. This oscillator is comprised of an emitter-follower transistor Q11 whose base electrode is connected to ground through a parallel resonant circuit in the form of a Clapp-type oscillator. This resonant circuit is comprised of capacitors $C_{11}$ and $C_{12}$ connected in series, these series-connected capacitors being provided in parallel with a circuit comprised of a capacitor and inductance $L_{11}$.

Waveform shaping circuit 77 is illustrated as a capacitor Q12 whose base electrode is connected through a differentiating circuit to the output of synchronizing signal separator 67, this differentiating circuit being formed of a capacitor $C_{13}$ connected in series with the base-emitter circuit of transistor Q12, and a resistor $R_{11}$ connected to ground. The emitter electrode of transistor Q12 is connected by a diode $D_{11}$ to inductance $L_{11}$. The collector electrode of transistor Q12 is connected to a source of operating potential $+V_{cc}$, and also to ground through a capacitor.

Gate circuit 72 supplies the discriminating signal $S_i$ of constant frequency and of a phase synchronized with the phase of the incoming chrominance component of the SECAM television signal, to the base electrode of transistor Q11 through a common-emitter transistor Q13. The output of emitter-follower transistor Q11 is supplied through a buffer emitter-follower Q14 to frequency converter 82 via record/playback change-over switch 103.

In operation, when the horizontal synchronizing pulse $P_h$ is received, transistor Q12 becomes conductive so as to supply a relatively high level through diode $D_{11}$ to inductance $L_{11}$. This high level supplied to the inductance terminates the oscillations of the Clapp-type oscillator including transistor Q11. At the termination of the horizontal synchronizing pulse $P_h$, the discriminating signal $S_i$ is supplied from gate circuit 72 through transistor Q13 to transistor Q11. This commences the oscillation of the Clapp-type oscillator and, moreover, locks the phase of such oscillations to the phase of the received discriminating signal $S_i$. It is appreciated that the frequency of the Clapp-type oscillator is determined by inductance $L_{11}$ and capacitors $C_{11}$ and $C_{12}$. This frequency is established to be equal to the red subcarrier frequency $f_r$.

The output of transistor Q11 is supplied as oscillating signal $S_{73}$ to emitter-follower Q14. This oscillating signal has its phase synchronized with the phase of the discriminating signal $S_i$ included in the received SECAM television signal; and its frequency is a substantially constant frequency equal to the red subcarrier frequency $f_r$.

The Reproducing Section

Returning to FIG. 1, the reproducing section of the illustrated apparatus is comprised of a luminance channel and a chrominance channel connected via the playback contact P of record/playback change-over switch 101 to heads 1M and 1N to receive the reproduced SECAM television signal which had been recorded in successive parallel tracks of the type shown in FIG. 5. The luminance and chrominance channels are adapted to separately process the luminance and chrominance components and, more particularly, to demodulate the FM luminance component substantially back to its original frequency range, and to frequency re-convert the chrominance component substantially back to its original frequency range. The luminance channel is comprised of a high pass filter 42, a limiter 43, a frequency demodulator 44 and a de-emphasis circuit 45. An amplifier 41 connects the playback contact P of record/playback change-over switch 101 to high pass filter 42. The high pass filter is adapted to separate the FM luminance component from the reproduced SECAM television signal to the exclusion of the reproduced chrominance component. This FM luminance component $S_f$ separated by high pass filter 42 is supplied through limiter 43 to frequency demodulator 44, also referred to herein as an FM demodulator. Limiter 43 is adapted to eliminate amplitude fluctuations in the FM luminance component which is supplied to FM demodulator 44. The FM demodulator may be a conventional frequency demodulator which is adapted to demodulate the original luminance component $S_Y$ which had been frequency modulated onto the relatively higher carrier for recording. The recovered luminance component $S_Y$ is supplied through de-emphasis circuit 45 to a combining circuit 46. The de-emphasis circuit functions to complement the pre-emphasis operation which had been performed during the recording operation by pre-emphasis circuit 15. Thus, the recovered luminance component is supplied from de-emphasis circuit 45 to combining circuit 46, the latter comprising a summing circuit for adding the recovered chrominance component to the luminance component.

The chrominance channel is comprised of a low pass filter 51, an automatic chrominance control (ACC) circuit 52, a frequency re-converter 53, a comb filter 54, a limiter 55 and a bell filter 56. Low pass filter 51 is coupled to playback contact P of record/playback change-over switch 101 via amplifier 41. The low pass filter is adapted to separate the frequency-converted chrominance component $S_c$ which is reproduced by heads 1M and 1N from the parallel record tracks, to the exclusion of the reproduced luminance component of the SECAM television signal. The output of low pass filter 51 is coupled to ACC circuit 52 which functions in a manner substantially similar to aforedescribed ACC circuit 53.

Frequency re-converter 53 is coupled to ACC circuit 52 and receives the level-corrected chrominance component therefrom. Frequency re-converter 53 is supplied with a re-converting signal and serves to heterodyne this re-converting signal with the reproduced frequency-converted chrominance component so as to restore the chrominance component substantially back to its original frequency band. In this respect, frequency re-converter 53 may be similar to frequency converter 34. The output of the frequency re-converter is supplied through comb filter 54 to limiter circuit 55, the latter being adapted to remove unwanted amplitude fluctuations in the frequency re-converted chrominance component. Since the chrominance component is comprised of color difference signals frequency-modulated onto respective red and blue subcarriers, color information is not lost by passing the re-converted chrominance component through limiter circuit 55. The output of this limiter circuit is coupled to bell filter 56 which functions as a complement of reverse bell filter 32 which had been used in the recording section. Hence, the output of bell filter 56 is substantially equal to the original chrominance component of the received SECAM television signal. This chrominance component is supplied through a switch 57, to be described in greater detail below, to combining circuit 46 whereat the recovered luminance and chrominance components of the SECAM television signal are summed, or combined, so as to re-form the original SECAM composite color television signal. The output of combining circuit 46 is coupled to output terminal 47.

The re-converting signals which are supplied to frequency re-converter 53 are produced by AFC circuit 60 in combination with phase control circuit 70. The AFC circuit has been described in greater detail hereinabove and, therefore, in the interest of brevity, will not be described again. Suffice it to say that, as during the recording operation, the oscillating signal produced by VCO 62 has a frequency equal to 351fh when, for example, tracks 3M (FIG. 5) are scanned by head 1M to reproduce the SECAM television signals which had been present in field interval $T_m$. The oscillating signal produced by VCO 62 when tracks 3N are scanned by head 1N to reproduce the SECAM television signal which had been present during field interval $T_n$ has a frequency equal to 353fh. The frequency of these oscillating signals are further divided by frequency divider 81 so as to provide a frequency-divided oscillating signal $S_{81}$ to frequency converter 82, the frequency of these frequency-divided oscillating signals being equal to $(44-\frac{1}{8})$fh when the field intervals $T_m$ are reproduced from tracks 3M, and being equal to $(44+\frac{1}{8})$fh when field intervals $T_n$ are reproduced from tracks 3N. As in the recording operation, the frequency-divided oscillating signals $S_{81}$ are supplied to frequency converter 82.

During the reproducing operation, record/playback change-over switch 103 is operated so as to connect its playback contact P to another input of frequency converter 82. As shown, a reference oscillator 79 is connected to playback contact P. This reference oscillator may comprise a crystal oscillator adapted to generate an oscillating signal of substantially constant frequency and phase. The frequency of the reference oscillating signal produced by oscillator 79 is equal to the frequency of the oscillating signal produced by injection-locked oscillator 73 during the recording operation, this frequency being equal to the red subcarrier frequency $f_r$. Hence, during the playback operation, frequency converter 82 produces re-converting signals $S_{82}$ whose frequencies are equal to the sum of the reference oscillating frequency $f_r$ (i.e., 282 fh) and the frequency of the frequency-divided oscillating signal $S_{81}$. Hence, when the SECAM television signals of field interval $T_m$ are reproduced from tracks 3M, the frequency of the re-converting signal $S_{82}$ is equal to $f_r+(44-\frac{1}{8})f_h$, or $(282+44-\frac{1}{8})$fh. Similarly, when the SECAM television signals of field interval $T_n$ are reproduced from tracks 3N, the frequency of re-converting signal $S_{82}$ is equal to $f_r+(44+\frac{1}{8})$fh, or $(282+44+\frac{1}{8})$fh. Nevertheless, the phase of this re-converting signal remains constant throughout all line intervals and field intervals.

The horizontal synchronizing pulses $P_h$ which are supplied to AFC circuit 60 are derived from the reproduced SECAM television signal. Thus, synchronizing signal separator 67 is connected via the playback contact P of record/playback change-over switch 102 to the output of de-emphasis circuit 45 of the luminance channel. In addition to being supplied to AFC circuit 60, these recovered horizontal synchronizing pulses $P_h$ are supplied to the reset input R of a set/reset flip-flop circuit 85. The state of this flip-flop circuit is used to control switch 57. The purpose of switch 57 is to prevent the output of the chrominance channel from being supplied to combining circuit 46 during those periods wherein no chrominance component is present. This serves to mute the output of the chrominance channel during those periods of time wherein limiter noises are prevalent. The set input S of flip-flop circuit 85 is coupled to a slicing circuit 84, the latter being coupled to the output of sawtooth waveform generator 65. The slicing circuit is adapted to detect when the level of the sawtooth waveform exceeds the predetermined slicing level, whereupon slicing circuit 84 supplies a set signal to flip-flop circuit 85.

It is recalled that, during a recording operation, a servo control circuit including phase comparator 93 is provided to control the operation of drive motor 4 in accordance with the received vertical synchronizing signals. A similar servo control operation is performed during the reproducing operation, except that phase comparator 93 now receives the control pulses which had been recorded along an edge of tape 2 by control head 98. These pulses are synchronized with the vertical synchronizing signal and, during the reproducing operation, are reproduced by control head 98 and supplied via the playback contact P of record/playback change-over switch 105 through amplifier 99 and through the playback contact P of record/playback change-over switch 104 to phase comparator 93. These reproduced control pulses are compared to the position pulses produced by magnetic pick-up device 94. Hence, proper control over head drive motor 4 is attained during the reproducing operation. This means that heads 1M and 1N scan the same tracks in the reproducing mode as were scanned thereby in the recording mode. That is, head 1M is controlled to scan tracks 3M so as to reproduce the SECAM television signals included in field interval $T_m$; and head 1N is controlled to scan tracks 3N so as to reproduce the SECAM television signals which had been included in field interval $T_n$.

Operation of the Reproducing Section

When the adjacent (or partially overlapping) tracks shown in FIG. 5 are scanned by heads 1M and 1N, cross-talk components may be picked up from adjacent tracks. For example, when head 1M scans a track 3M, in addition to the main luminance component which is reproduced from a track being scanned, a luminance cross-talk component may be picked up from adjacent track 3N. However, it is recalled that the air gaps of heads 1M and 1N are of different azimuth angles. Since head 1N was used to record the luminance component in track 3N, the phenomenon of azimuth loss will substantially attenuate this luminance cross-talk component which is picked up from track 3N by head 1M. That is, the difference between the azimuth angle of the air gap of head 1M and that of the air gap of the head which was used to record the luminance component in track 3N serves to substantially attenuate the luminance cross-talk component which is picked up from track 3N by head 1M. Thus, luminance cross-talk interference is effectively eliminated.

However, since the chrominance component had been frequency-converted down to a relatively lower frequency range, this phenomenon of azimuth loss is not effective to eliminate chrominance cross-talk interference attributed to the chrominance components which are picked up from adjacent tracks. As shown in FIG. 2I, when head 1M scans a track 3M, the frequency-converted chrominance components which had been recorded in track 3M are reproduced, these reproduced chrominance components being represented as $S_c$ with frequency-modulated red and blue sub-carriers $f_{mr}$ and $f_{mb}$, respectively. It is recalled that $f_{mr}=(44-\frac{1}{8})$fh, and that $f_{mb}=(10+44-\frac{1}{8})$fh. In addition to reproducing the frequency-converted chrominance component $S_c$ which is recorded in track 3M, head 1M also reproduces a chrominance crosstalk component $S_k$ attributed to the frequency-modulated red and blue subcarriers recorded in an adjacent track 3N. By reason of the alignment of the red and blue line intervals in adjacent tracks, as shown in FIG. 5, when the main chrominance component representing, for example, the red color signal information is reproduced, a cross-talk component representing red color information in an adjacent track likewise is reproduced. As shown in FIG. 2I, when the main chrominance components having frequency-modulated subcarriers $f_{mr}$ and $f_{mb}$ are reproduced, cross-talk component having frequency-modulated subcarriers $f_{nr}$ and $f_{nb}$, respectively, also are reproduced. Conversely, when head 1N scans a track 3N to reproduce the main chrominance component having frequency-modulated subcarriers $f_{nr}$ and $f_{nb}$, this head also reproduces chrominance cross-talk components comprised of frequency-modulated subcarriers $f_{mr}$ and $f_{mb}$, respectively. It is recalled that $f_{nr}=(44+\frac{1}{8})$fh, and that $f_{nb}=(10+44+\frac{1}{8})$fh.

When the main chrominance component $S_c$ and the chrominance cross-talk component $S_k$ are supplied to frequency re-converter 53, the re-converting signal $S_{82}$, represented in FIG. 2J, is heterodyned therewith. The lower side band is selected at the output of frequency re-converter 53, whereby the frequency of the output signals of this frequency re-converter is equal to the difference between the frequency of re-converting signal $S_{82}$ and the frequency of the reproduced chrominance component and also equal to the difference between the frequency of the re-converting signal and the frequency of the chrominance cross-talk component. Thus, during the scanning of track 3M by head 1M, when the main chrominance component has the frequency-modulated subcarrier $f_{mr}$, this subcarrier is frequency re-converted back to its original red subcarrier $f_r$. Similarly, when the reproduced chrominance component has the frequency-modulated subcarrier $f_{mb}$, this chrominance component is re-converted back to its original subcarrier $f_b$. Thus, the original frequency-modulated red and blue subcarriers are reproduced in line sequential format, as shown in FIG. 2K by the recovered, re-converted chrominance component $S_s$.

However, when the chrominance cross-talk component $S_k$ having the frequency-modulated subcarrier $f_{nr}$ is frequency re-converted, the resultant cross-talk component has the reconverted subcarrier $f_r-\frac{1}{4}fh$. Similarly, when the chrominance cross-talk component having the frequency-modulated subcarrier $f_{nb}$ is frequency re-converted, the resultant reconverted chrominance cross-talk component has the subcarrier $f_b-\frac{1}{4}fh$. Thus, when track 3M is scanned to reproduce the SECAM television signals which are included in field interval $T_m$, the frequency re-converted main chrominance component $S_s$ is in frequency interleaved relation with the chrominance cross-talk component $S_k$.

A similar result is obtained when track 3N is scanned by head 1N to reproduce the SECAM television signal included in field interval $T_n$. Thus, when the main chrominance component having the frequency-modulated subcarriers $f_{nr}$ and $f_{nb}$ are frequency re-converted by re-converting signal $S_{82}$, the resultant reconverted chrominance component $S_s$ has the frequency-modulated subcarriers $f_r$ and $f_b$, respectively, as shown in FIG. 2K. When the reproduced chrominance cross-talk components having the frequency-modulated subcarriers $f_{mr}$ and $f_{mb}$ (FIG. 2I) are frequency re-converted, the resultant, re-converted chrominance cross-talk component $S_k$ has the frequency-modulated subcarriers $f+\frac{1}{4}fh$ and $f_b+\frac{1}{4}fh$, respectively, as shown in FIG. 2K. The frequency re-converted main chrominance component is in frequency interleaved relation with the frequency re-converted chrominance cross-talk component.

As shown in FIG. 2K, when both tracks 3M and 3N are scanned, a red color signal included in the main chrominance component is accompanied by a red color signal included in the chrominance cross-talk component. Similarly, a reproduced blue color signal included in the main chrominance component is accompanied by a reproduced blue signal included in the chrominance cross-talk component.

The chrominance cross-talk component $S_k$, included in the frequency re-converted output of frequency re-converter 53, is separated from the main chrominance component $S_s$ by comb filter 54. One embodiment of this comb filter is illustrated in FIG. 6 as comprising a delay circuit 541, adapted to impart a delay equal to 2H, that is, a delay equal to two times the horizontal line interval, the output of delay circuit 541 being combined in a combining circuit 542 with the undelayed output of the frequency re-converter. Combining circuit 542 is, in the illustrated embodiment, a summing circuit.

It is recognized that the information included in a television signal is highly correlative from one horizontal line to the next. That is, the information included in one line interval is substantially the same as the information included in the next line interval, and is not substantially different from the next following line interval. Thus, the color information included in one red line interval is substantially the same as the color information included in the next following red line interval which is separated therefrom by two horizontal line intervals (2H). Furthermore, since the subcarrier frequency of both red line intervals is equal in the SECAM system, it is appreciated that, with respect to the main chrominance component $S_s$, the output of delay circuit 541 will be substantially equal to the input thereof. Hence, the output of combining circuit 542 is a substantially reinforced chrominance component. That is, during each red line interval, the red signal information which is supplied directly to adding circuit 542 will be substantially similar to the delayed red signal information at the output of delay circuit 541, and thus will be reinforced at the output of combining circuit 542. This is equally true for the blue signal information which is present in each blue line interval. Thus, with respect to the main chrominance component $S_s$, there is only negligible interference or destruction of color signal information at the output of combining circuit 542.

However, with reference to the chrominance cross-talk component $S_k$ whose sub-carrier frequencies are shifted from the main chrominance sub-carrier frequencies by $\frac{1}{4}fh$, although the color signal information is substantially the same during line intervals that are separated from each other by a 2H interval, the phase of the subcarrier whose frequency is equal to an odd multiple of $\frac{1}{4}$th the horizontal line frequency will be shifted by approximately 180°. Hence, the phase of the chrominance cross-talk component which is present during one line interval will be substantially opposite to the phase of the cross-talk chrominance component which is present in the 2H delayed line interval. Therefore, is these components are combined, or summed, their opposite phase relation will cancel. This is achieved by comb filter 54 shown in FIG. 6. Thus, the presence of 2H delay circuit 541 reinforces the main chrominance component but cancels the chrominance cross-talk component in each line interval due to the phase shift of the chrominance cross-talk component at the output of the delay circuit relative to the cross-talk component at the input thereof. Since the color signal information included in the chrominance cross-talk component in line intervals separated by 2 H from each other is highly correlative, the illustrated comb filter is effective to cancel such cross-talk components.

The foregoing explanation of the operation of comb filter 54 with respect to the main and cross-talk chrominance components which are reproduced from field interval $T_m$ is equally applicable to the main and cross-talk chrominance components which are reproduced during field interval $T_n$. That is, since the sub-carrier frequency of the cross-talk component included in each line interval is equal to an odd multiple of one-fourth the horizontal line frequency, the phase of a cross-talk component will be substantially opposite to the phase of a cross-talk component included in a line interval that is delayed by the factor 2H therefrom. Thus, the chrominance cross-talk components $S_k$ which are reproduced during the scanning of tracks 3N are cancelled in comb filter 54.

The foregoing explanation can be summarized by noting that, either in field interval $T_m$ or in field interval $T_n$, the chrominance component $S_s$ in the (i)th line interval is substantially equal to the main chrominance component $S_s$ in the (i+2)th line interval. However, since the sub-carrier frequency of the chrominance cross-talk component in each line interval is equal to an odd multiple of one-fourth the horizontal line frequency, then the chrominance cross-talk component $S_k$ in the (i)th line interval is of substantially opposite phase to the chrominance cross-talk component $S_k$ in the (i+2)th line interval. This opposite phase relationship results in cancellation of the cross-talk component in combining circuit 542. Thus, it is appreciated that the recovered main chrominance component $S_s$ at the output of combining circuit 542 exhibits a constant, fixed phase for all line intervals throughout each field interval $T_m$ and $T_n$, but the frequency of the chrominance sub-carrier alternates between the red and blue subcarrier frequencies $f_r$ and $f_b$, respectively. Hence, the line sequential frequency-modulated chrominance sub-carrier is recovered at the output of comb filter 54.

When the comb filter is constructed in accordance with the embodiment shown in FIG. 6, a portion of the side band of the recovered chrominance component $S_s$ is attenuated. However, the use of limiter 55 at the output of comb filter 54 serves to compensate for the attenuation of such portion of the side band and, therefore, the recovered chrominance component $S_s$ is compensated.

Figure 11:
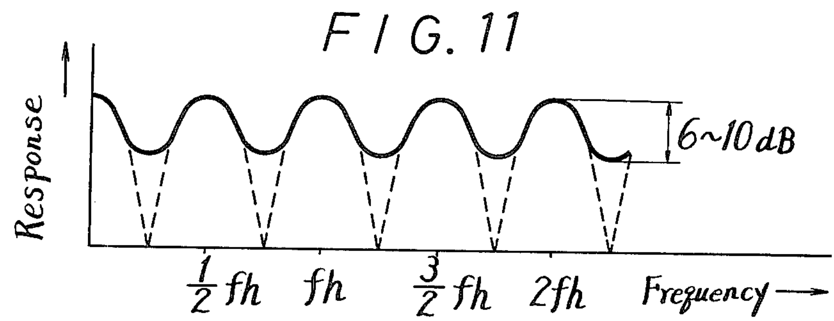
FIG. 11 is a graphical representation of the response of the comb filter which can be used with this invention.

A graphical representation of the frequency response characteristic of the comb filter shown in FIG. 6 is depicted by the broken lines in FIG. 11. It is seen that this comb filter exhibits peak response at frequencies equal to n/2fh. Furthermore, sharp attenuation is attained at frequencies equal to (2n−1)/4fh. Hence, because of this sharp attenuation characteristic at odd multiples of one-fourth the horizontal line frequency, a portion of the side band components of the recovered main chrominance components $S_s$ is significantly attenuated. This attenuation of the side band components appears as overmodulation of the frequency modulated chrominance component, resulting in the appearance of noise interference in the video picture which is displayed from the reproduced chrominance component. Furthermore, when comb filter 54 is constructed in accordance with the embodiment shown in FIG. 6, the output of combining circuit 542 contains a delayed chrominance component, supplied from delay circuit 541, and a non-delayed chrominance component, which is supplied directly thereto from frequency converter 53. These delayed and non-delayed chrominance components are of substantially equal magnitude, and even if they are of high correlation with respect to each other, there still is some reduction in the color resolution attained from these combined components because such components generally do not contain precisely identical color information. That is, although the delayed and non-delayed main chrominance components $S_s$ which are supplied to combining circuit 542 tend to reinforce each other, there may be small differences therebetween which may result in such reduction in color resolution.

Figure 12:
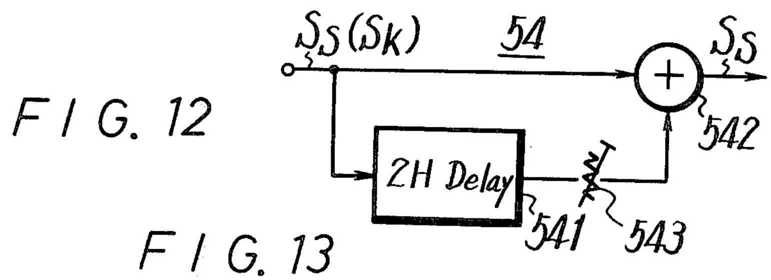
FIGS. 12 and 13 are alternative embodiments of the comb filter which can be used with this invention.

Another embodiment of comb filter 54 is illustrated in FIG. 12 wherein an attenuator 543, such as a potentiometer or other conventional attenuating circuit, is connected between the output of delay circuit 541 and combining circuit 542. With the addition of attenuator 543, the frequency response characteristic of comb filter 54 appears as depicted in the solid curve of FIG. 11. Attenuator 543 attenuates the level of the delayed main and cross-talk chrominance components such that the respective levels of these signals are reduced relative to the levels of the non-delayed main and cross-talk chrominance components. Thus, depending upon the attenuation level which is established by the appropriate setting of attenuator 543, there will be partial cancellation of the undesired chrominance cross-talk components. This partial cancellation results in the solid curve shown in FIG. 11. In one example, attenuator 543 is set such that the level difference between the peak response and attenuation of the comb filter shown in FIG. 12 is about 6 to 10 dB.

When the embodiment shown in FIG. 12 is used, the attenuation of the useful side bands of the main chrominance component is reduced. Such side band attenuation is less than the cross-talk attenuation, whereby limiter 55 provides improved compensation for such side band attenuation. Furthermore, since the delayed main chrominance component is attenuated by attenuator 543, a smaller proportion of the chrominance component $S_s$ at the output of combining circuit 542 is constituted by this delayed chrominance component. Thus, the color resolution of the video picture which ultimately is reproduced from the chrominance component obtained from combining circuit 542 is improved.

Figure 13:
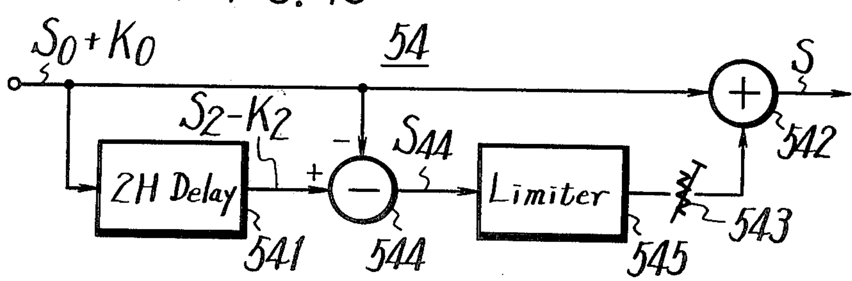

A still further embodiment of comb filter 54 is illustrated in FIG. 13. In this embodiment, a subtracting circuit 544 is connected between the output of delay circuit 541 and the input to the comb filter so as to subtract the undelayed main and chrominance cross-talk components from the delayed main and cross-talk chrominance components. A limiter 545 connects the output of subtracting circuit 544 to attenuator 543 and thence to combining circuit 542. The undelayed main and cross-talk chrominance components which are supplied to the comb filter also are applied directly to combining circuit 542, as in the previously described embodiments. As an example, attenuator 543 may be set so as to reduce the level of the signal applied thereto by one-half.

In the operation of the embodiment of comb filter 54 as shown in FIG. 13, let it be assumed that the main chrominance component supplied to the comb filter by frequency re-converter 53 during the (i)th line interval is represented as $S_0$ and that the chrominance cross-talk component during this line interval is represented as $K_0$. It is appreciated that, at the time that the chrominance component in the (i)th line interval is supplied to the comb filter, the chrominance component which was present in the (i−2)th line interval is provided at the output of delay circuit 541. The delayed main chrominance component is represented as $S_2$, and the delayed chrominance cross-talk component is represented as $K_2$. Since the frequency of the chrominance cross-talk component differs from the frequency of the main chrominance component, and since delay circuit 541 imparts a 2H time delay (two horizontal line intervals), the phase of the chrominance cross-talk component provided at the output of delay circuit 541 will be substantially inverted with respect to the phase of the chrominance cross-talk component supplied to the input of this delay circuit. Hence, the input to delay circuit 541 is represented as $S_0+K_0$, while the output of this delay circuit is represented as $S_2-K_2$. When the undelayed main and chrominance cross-talk components are subtracted from the delayed main and cross-talk chrominance components in subtracting circuit 544, the output $S_{44}$ from this subtracting circuit may be expressed as:

$$S_{44}=(S_2-K_2)-(S_0+K_0) \quad (5)$$

The difference between the main chrominance components may be expressed as ΔS, and the difference between the chrominance cross-talk components may be expressed as ΔK as follows:

$$\Delta S=S_2-S_0$$

$$\Delta K-K_2-K_0$$

Equation (5) thus can be rewritten as:

$$S_{44}=\Delta S-\Delta K-2K_0$$

The difference signal $S_{44}$ produced by subtracting circuit 544 is supplied through limiter 545 to attenuator 543. The limiter merely compensates the difference signal $S_{44}$, if necessary, such that the proper levels of this difference signal are attained. This difference signal then is attenuated to one-half its level by attenuator 543, and this attenuated difference signal is applied to combining circuit 542 as:

$$\tfrac{1}{2}S_{44}=\tfrac{1}{2}(\Delta S-\Delta K)-K_0$$

The combining circuit sums the undelayed main and cross-talk chrominance components $S_0+K_0$ with the attenuated difference signal, resulting in an output chrominance component S which is expressed as:

$$S=S_0+\tfrac{1}{2}(\Delta S-\Delta K) \quad (6)$$

If there is high correlation between the color signals in the (i)th line interval and (i−2)th line interval, then main chrominance component $S_0$ is approximately equal to main chrominance component $S_2$, and chrominance cross-talk component $K_0$ is approximately equal to chrominance cross-talk component $K_2$. Consequently, ΔS is approximately 0 and ΔK is approximately 0. Equation (6) thus can be rewritten as $S=S_0$. This means that where there is a high correlation between the chrominance components in alternate line intervals, that is, in the (i)th and (i−2)th intervals, comb filter 54, as constructed in accordance with the embodiment of FIG. 13, provides essentially only the non-delayed chrominance component which is substantially free of undesired chrominance cross-talk.

If, however, the correlation between the (i)th and (i−2)th line intervals is not very high, then ΔS and ΔK will not be zero. In that event, the output of the comb filter shown in FIG. 13 is in accordance with equation (6). Hence, even with a lower correlation between these alternate line intervals, the output of the comb filter is comprised primarily of the non-delayed chrominance component, while the chrominance cross-talk component is significantly attenuated. Although the factor (ΔS−ΔK) is present, the level of this factor is reduced to one-half its original level. Consequently, the undesired interference due to the factor $\tfrac{1}{2}(\Delta S-\Delta K)$ is extremely small in comparison with the desired chrominance component $S_0$.

Referring to FIG. 1 once again, it is appreciated that the output of bell filter 56 is substantially the original chrominance component $S_s$, the waveform of this chrominance component being depicted in FIG. 3D. The discriminating signal $S_i$ is present in the front porch portion of the horizontal synchronizing interval, followed by the frequency-modulated sub-carrier $S_b$ or $S_r$ which extends until the beginning of the front porch portion of the next horizontal synchronizing interval. Thus, there is no chrominance component during each front porch portion and each horizontal synchronizing pulse duration. During this interval, that is, in the absence of a chrominance component, the output of limiter 55 is provided with limiter noise. Switching circuit 57 is provided so as to eliminate such limiter noise from the SECAM television signal that is applied to output terminal 47. This is achieved by controlling switching circuit 57 to be closed when the chrominance component $S_s$ is present and to be opened in the absence of this chrominance component. By opening switching circuit 57 in this manner, limiter noise is prevented from reaching output terminal 47, whereby such limiter noise is muted.

The control circuit provided for controlling switching circuit 57 is comprised of set/reset flip-flop circuit 85, the set input of this flip-flop circuit being responsive to the output of slicing circuit 84, and the reset input of this input circuit being responsive to the horizontal synchronizing pulses $P_h$ which are separated from the reproduced SECAM television signal by synchronizing signal separator 67. Referring to FIG. 3K, the sawtooth waveform $S_{65}$ produced by sawtooth waveform generator 65 is timed to occur such that the sawtooth waveform traverses a predetermined slicing level $V_d$ in time coincidence with the beginning of each horizontal synchronizing interval. This slicing level is provided in slicing circuit 84 which, for example, may comprise a Schmitt trigger circuit or other threshold detector which generates an output pulse when sawtooth waveform $S_{65}$ applied thereto exceeds slicing level $V_d$, this output pulse terminating when the sawtooth waveform falls below the slicing level. The output $S_{84}$ of slicing circuit 84 is illustrated in FIG. 3L. Each positive transition in output pulse $S_{84}$ sets flip-flop circuit 85. The trailing edge, or negative transition, in each separated horizontal synchronizing pulse $P_h$ (FIG. 3C) resets flip-flop circuit 85. Consequently, the output of this flip-flop circuit appears as periodic pulses $P_{85}$, illustrated in FIG. 3M.

Pulse signal $P_{85}$ is applied as a switching control pulse to switching circuit 57. When control pulse $P_{85}$ admits of its relatively higher level, switching circuit 57 is opened so as to interrupt the connection between limiter 55, bell filter 56 and combining circuit 46. Thus, control pulse $P_{85}$ serves to mute the limiter noise from the beginning of the front porch portion to the end of the horizontal synchronizing pulse during each horizontal synchronizing interval. Of course, when control pulse $P_{85}$ admits of its relatively lower level, switching circuit 57 is closed so as to supply the output of limiter 55 to combining circuit 46. Consequently, switching circuit 57 is operated so as to supply only the recovered chrominance component $S_s$ to combining circuit 46 in the absence of undesired limiter noise. Of course, the output of combining circuit 46 supplies substantially the original SECAM composite color television signal to output terminal 47.

An Alternative Embodiment

Figure 14:
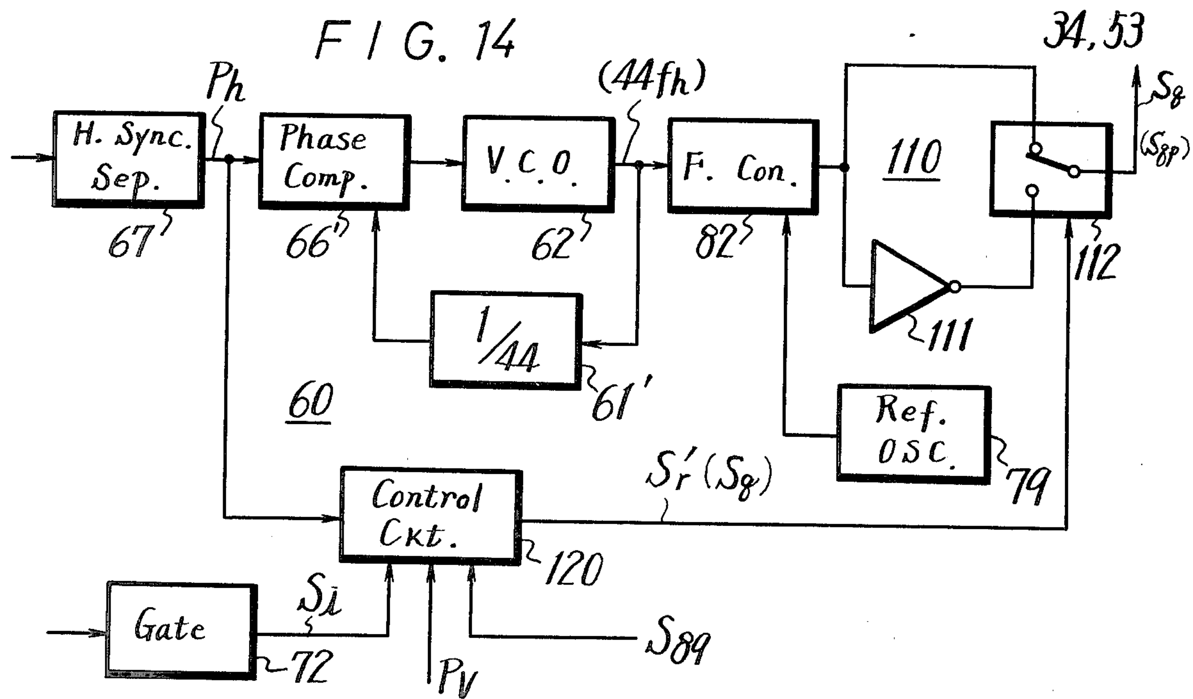
FIG. 14 is a block diagram of an alternative embodiment of a portion of the apparatus which can be used in FIG. 1.

In the apparatus illustrated in FIG. 1, the frequency converting signals $S_{82}$ supplied to frequency converter 34 in the recording section exhibit different frequencies for the recording of the frequency-converted chrominance component in adjacent tracks. As described in detail hereinabove, the frequency of the frequency-converting signal $S_{82}$ which is used during the recording of the chrominance component in track 3M during field interval $T_m$ differs from the frequency of the frequency-converting signal $S_{82}$ which is used during the recording of the chrominance component in the next adjacent track 3N during field interval $T_n$ preferably, by one-fourth the horizontal synchronizing frequency fh. It is this difference in frequency which results in the frequency interleaved relationship of the chrominance components that are recorded in adjacent tracks. Because of this frequency interleaved relationship, chrominance cross-talk components which are picked up from an adjacent track during the scanning of a given track can be eliminated. As a result of such elimination of undesired cross-talk interference, the SECAM television signal can be recorded in tracks which are adjacent and even in partially overlapping relation, thereby resulting in a higher recording density and more efficient usage of the record medium. An interleaved relationship between the frequencies of the modulated chrominance subcarriers in adjacent tracks can be attained by suitably controlling the respective phases of the different frequency-converting signals, thereby permitting the frequencies of these frequency-converting signals to be equal. That is, the frequency of frequency-converting signal $S_{82}$ for the recording of the chrominance component in track 3M can be equal to the frequency of the frequency-converting signal $S_{82}$ for recording the chrominance component in the next adjacent track 3N. An embodiment of AFC circuit 60 and an appropriate phase control circuit is illustrated in FIG. 14.

AFC circuit 60 is comprised of VCO 62, a frequency-divider 61' and a phase comparator 66'. These elements are connected in phase-locked loop configuration whereby the frequency of the oscillating signal produced by VCO 62 is synchronized with the frequency of the horizontal synchronizing pulses $P_h$ separated by synchronizing signal separator 67. Hence, the oscillating signal produced by the VCO exhibits a substantially constant frequency 44fh for each line interval in each field interval of the SECAM television signal. This oscillating signal is supplied to frequency converter 82 whereat it is heterodyned with a reference oscillating signal produced by reference oscillator 79, described previously. It is recalled that the frequency of the reference oscillating signal produced by reference oscillator 79 is equal to the red subcarrier frequency $f_r$=282fth. The output of frequency converter 82 is formed by obtaining the sum of these heterodyned signals, whereby the frequency of the output of this frequency converter is equal to (282+44)fh.

The phase control circuit which is used to control the phase of the output of frequency converter 82 during the recording of respective field intervals in tracks 3M and 3N is comprised of a phase-switching circuit 110 controlled by a phase control circuit 120. Phase-switching circuit 110 is comprised of a change-over switch 112 having one input connected directly to the output of frequency converter 82 and another input connected through a phase inverter 111 to the output of the frequency converter 82. Control circuit 120 is coupled to a control input of change-over switch 112 and operates, in a manner to be described, to control the change-over switch so as to selectively couple either the inverted version of the frequency converting signal produced by frequency converter 82 or the non-inverted version of this frequency converting signal to the output thereof. During a recording operation, these phase-controlled frequency converting signals are supplied to frequency converter 34. During a reproducing operation, these phase-controlled frequency converting signals are supplied to frequency re-converter 53.

Control circuit 120 is described in greater detail hereinbelow with respect to the logic diagram of FIG. 16. This control circuit is supplied with discriminating signal $S_i$ which is included during the front porch portion of each horizontal synchronizing interval. Gate circuit 72 may be coupled to the output of ACC circuit 33 and may be responsive to gating pulses $P_{76}$ (FIG. 3H) to gate this discriminating signal to the control circuit. In addition, control circuit 120 is provided with the separated vertical synchronizing pulses $P_v$, derived from vertical synchronizing separator 91, and also is supplied with sensing pulses $S_{89}$, produced by flip-flop circuit 89 and representing which of heads 1M and 1N then is scanning tape 2. Control circuit 120 utilizes these signals, together with the separated horizontal synchronizing pulses $P_h$ supplied thereto by synchronizing signal separator 67, to produce a switch control signal $S'_r$ for controlling change-over switch 112 during a recording operation, and also to produce a switch control signal $S_p$ to control change-over switch 112 during a playback operation.

Figures 15A, 15B, 15C, 15D, 15E, 15F, 15G, 15H, 15I:
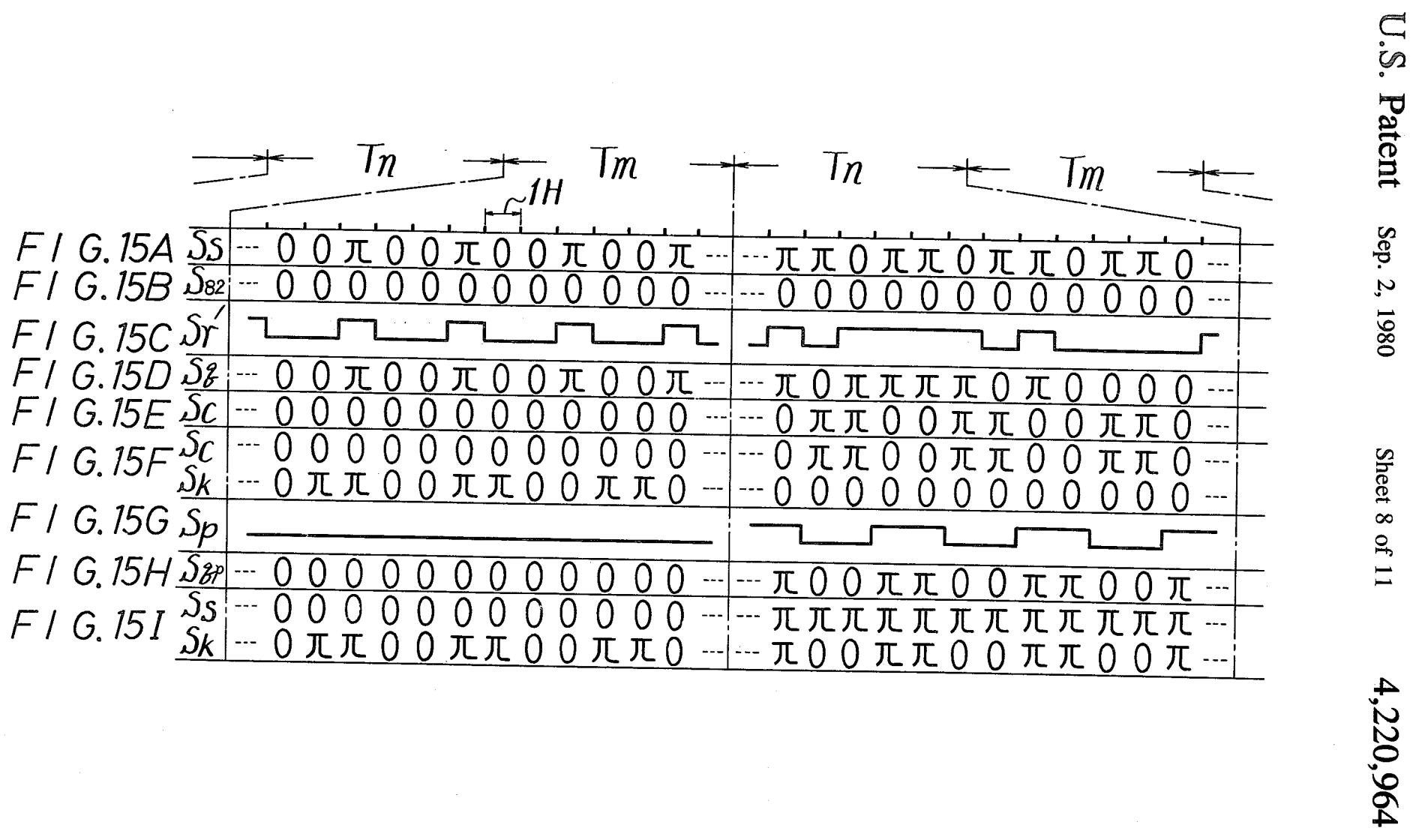

Before describing the construction and operation of control circuit 120 in detail, the operation of the overall frequency-converting signal generator shown in FIG. 14 will be explained in conjunction with the timing diagrams of FIGS. 15A–15I. FIG. 15A represents the chrominance component $S_s$ of the incoming SECAM television signal having the phase of each third line interval reversed, or inverted, with respect to the phase of its next adjacent intervals. Of course, the red and blue color difference signals are transmitted during sequential line intervals. Field interval $T_m$ is depicted as having the phase of the frequency-modulated chrominance sub-carrier in each third line interval equal to $\pi$, while the phases of the remaining line intervals (3m+1) and (3m+2) are equal to zero. This phase relation is interchanged in field interval $T_n$ wherein the phase of the modulated chrominance sub-carrier in each third line interval is equal to zero while the phase of the modulated chrominance sub-carrier in each of the remaining (3n+1) and (3n+2) line intervals is equal to $\pi$. FIG. 15B represents the output signal $S_{82}$ of frequency converter 82. The frequency of signal $S_{82}$ is constant throughout field intervals $T_m$ and $T_n$, and is equal to (282+44)fh. Of course, inverter 111 inverts the phase of signal $S_{82}$, such that the two inputs of change-over switch 112 are supplied with signal $S_{82}$ and the phase-inverted version of this signal.

During a recording operation, control circuit 120 produces the switch control signal $S'_r$ having the waveforms shown in FIG. 15C during field intervals $T_m$ and $T_n$, respectively. That is, during field interval $T_m$, the time during which the SECAM television signal is recorded on track 3M, switch control signal $S'_r$ produces a pulse at a relatively higher level during each third line interval so as to coincide with the $\pi$ phase of the modulated chrominance subcarrier. Whenever switch control signal $S'_r$ is at its relatively higher level, that is, whenever the switch control signal is a binary "1", change-over switch 112 couples inverter 111 to the output thereof. Hence, and as shown in FIG. 15D, when switch control signal $S'_r$ is a binary "0", the non-inverted version of signal $S_{82}$, that is, the zero phase frequency-converting signal, is supplied to frequency converter 34. However, when switch control signal $S'_r$ is a binary "1", change-over switch 112 supplies the inverted version of signal $S_{82}$, that is, the phase frequency-converting signal, to frequency converter 34. Thus, frequency-converting signal $S_q$, shown in FIG. 15D and supplied to frequency converter 34, is in phase coincidence, that is, it is phase-locked, with the phase of the modulated chrominance subcarrier included in the chrominance component $S_s$.

During field interval $T_n$, that is, when the SECAM television signal is recorded in track 3N, switch control signal $S'_r$ has the waveform shown in the right-hand portion of FIG. 15C. That is, the switch control signal is at its binary "1" level from the beginning of a line interval in which the phase of the modulated chrominance subcarrier changes from $\pi$ to zero, and this switch control signal $S'_r$ remains at its binary "1" level for four successive line intervals, that is, until the next line interval at which the phase of the modulated chrominance subcarrier changes from zero to $\pi$. Then, during the immediately following two horizontal line intervals, switch control signal $S'_r$ changes from its binary "0" level to its binary "1" level, as shown. Then, at the beginning of the next following line interval wherein the phase of the modulated chrominance subcarrier changes from $\pi$ to zero, switch control signal $S'_r$ changes from its binary "1" level to its binary "0" level, and the switch control signal remains at this binary "0" level for the next four successive horizontal line intervals. At the occurrence of the next horizontal line interval wherein the phase of the modulated chrominance subcarrier changes from zero to $\pi$, switch control signal $S'_r$ changes from its binary "0" level to its binary "1" level. Then, the switch control signal remains at its binary "1" level for one line interval, changes over to its binary "0" level for the next line interval and returns to its binary "1" level when the phase of the modulated chrominance subcarrier next changes over from $\pi$ to zero. Thus, as shown in FIG. 15C, switch control signal $S'_r$ is maintained at a binary "1" level or a binary "0" level so as to encompass four successive line intervals during which the phase of the modulated chrominance subcarrier is $0\pi\pi0$, respectively. Then, during the next two horizontal line intervals, the level of the switch control signal alternates between its binary "1" and binary "0" levels.

When switch control signal $S'_r$ exhibits the waveform shown in FIG. 15C, change-over switch 112 is controlled so as to provide the frequency-converting signal $S_q$ whose phase is selectively varied between $\pi$ and zero, as illustrated in FIG. 15D.

During field interval $T_m$ when frequency-converting signal $S_q$ (FIG. 15D) is used to frequency convert the chrominance component, the resultant phase of the frequency-converted chrominance component $S_c$ appears as shown in FIG. 15E. It is recalled that frequency converter 34 heterodynes the frequency-converting signal with the chrominance component and derives the lower side band of these heterodyned signals. Thus, the subcarrier frequency of the frequency-converted chrominance component is equal to the difference between the frequency of frequency-converting signal $S_q$ and the frequency of the chrominance component; and the phase of the frequency-converted subcarrier is equal to the difference between the phase of frequency-converting signal $S_q$ and the phase of the chrominance component. From FIGS. 15A and 15D, it is seen that frequency-converting signal $S_q$ is phase-locked to the chrominance component $S_s$ during field interval $T_m$. Hence, the phase of the frequency-converted chrominance component $S_c$ is constant and equal to zero throughout field interval $T_m$, as shown in FIG. 15E.

The phase of frequency-converting signal $S_q$ during field interval $T_n$, as shown in FIG. 15D, is such that when this frequency-converting signal is heterodyned with chrominance component $S_s$, the resultant frequency-converted chrominance component $S_c$ has the phase relation shown in FIG. 15E. That is, the phase of the frequency-modulated subcarrier of the frequency-converted chrominance component $S_c$ is inverted after every two horizontal line intervals. Hence, the phase of the modulated subcarrier of the frequency-converted chrominance component $S_c$ is equal to $00\pi\pi00$ for successive line intervals during field interval $T_n$ on track 3N.

In a reproducing operation, head 1M scans track 3M to reproduce the frequency-converted chrominance component that had been recorded thereon and, in addition, head 1M picks up a chrominance cross-talk component $S_k$ from an adjacent track 3N. Thus, the signal supplied to frequency re-converter 53 during field interval $T_m$ appears as shown in FIG. 15F. It is appreciated that the phase of the modulated subcarrier of the main frequency-converted chrominance component $S_c$ is constant throughout the field interval. However, the phase of the modulated sub-carrier of the cross-talk chrominance component $S_k$ is inverted at every second line interval.

When head 1N scans track 3N to reproduce the frequency-converted chrominance component that was recorded during field interval $T_n$, the resultant signals which are supplied to frequency re-converter 53 are as shown in the right-hand portion of FIG. 15F. These signals are, of course, the main chrominance component which is reproduced from track 3N, and the cross-talk chrominance component which is picked up from adjacent track 3M. Thus, the phase of the modulated subcarrier of the main chrominance component $S_c$ is inverted after every second line interval. The phase of the modulated sub-carrier of the cross-talk chrominance component $S_k$ is constant for all line intervals in field interval $T_n$.

With reference to FIG. 14, control circuit 102 produces switch control signal $S_p$ during a reproducing operation. This switch control signal $S_p$ remains at its relatively low binary "0" level throughout all of field interval $T_m$. Hence, during field interval $T_m$, that is, during the reproduction of the SECAM television signal from track 3M, the non-inverted output of frequency-inverter 82 is supplied by change-over switch 112 as the frequency re-converting signal $S_{qp}$ to frequency re-converter 53. FIG. 15G represents the waveform of the switch control signal $S_p$ during field interval $T_m$ in the reproducing mode, while FIG. 15H is a timing diagram representing the phase of the frequency re-converting signal which is supplied from change-over switch 112 to the frequency re-converter. As described above, the frequency re-converting signal and the reproduced main and cross-talk chrominance components $S_c$ and $S_k$ are heterodyned in frequency re-converter 53. The lower side band of the heterodyned signals is obtained at the output of the frequency re-converter, and the phase of the re-converted main and cross-talk chrominance components in each line interval is equal to the difference between the phase of the re-coverting signal and the reproduced chrominance components. As shown in FIG. 15I, the phase of the modulated sub-carrier of the main re-converted chrominance component $S_s$ at each line interval is equal to the difference between the phase of re-converting signal $S_{qp}$ and the main frequency-converted chrominance component $S_c$. Hence, the phase of the re-converted main chrominance component is constant throughout field interval $T_m$, and is equal to zero. The phase of the re-converted chrominance cross-talk component $S_k$ at each line interval is equal to the difference between the phase of re-converting signal $S_{qp}$ and the frequency-converted chrominance cross-talk component $S_k$. Thus, the phase of the modulated sub-carrier of the re-converted chrominance cross-talk component $S_k$ is inverted at every second line interval.

When field interval $T_n$ of the SECAM television signal is reproduced, control circuit 120 supplies the switch control signal $S_p$, shown in the right-hand portion of FIG. 15G, to change-over switch 112. This switch control signal alternates between its binary "1" and binary "0" levels at a frequency equal to one-fourth the horizontal line frequency. Thus, switch control signal $S_p$ is at its binary "0" level for two successive line intervals and then changes over to its binary "1" level for two successive line intervals and then returns to its binary "0" level and so on. Thus, change-over switch 112 is controlled so as to supply re-converting signal $S_{qp}$ whose phase is inverted at every second line interval, as shown in the right-hand portion of FIG. 15H. It is seen that, during the reproduction of the SECAM television signals in field interval $T_n$, the phase of re-converting signal $S_{qp}$ is opposite to the phase of the modulated sub-carrier of the reproduced main frequency-converted chrominance component $S_c$ shown in FIG. 15F.

Thus, frequency re-converter 53 heterodynes the re-converting signal $S_{qp}$ with the main and cross-talk frequency-converted chrominance components $S_c$ and $S_k$, resulting in re-converted main and cross-talk chrominance components whose phases are equal to the difference between the phase of re-converting signal $S_{qp}$ and the respective phases of the frequency-converted main and cross-talk chrominance components. As shown in the right-hand portion of FIG. 15I, since the phase of the frequency-converted main chrominance component is opposite to the phase of re-converting signal $S_{qp}$, the phase of the frequency re-converted main chrominance component $S_s$ is constant throughout field interval $T_n$ and is equal to $\pi$. Since the phase of the frequency-converted chrominance cross-talk component $S_k$ during field interval $T_n$ is constant and equal to zero, the phase of the frequency re-converted chrominance cross-talk component $S_k$ is inverted at every second line interval.

Thus, during the reproduction of the SECAM television signals from each track, the reproduced main chrominance component is provided with a constant phase throughout each field interval, but the phase of the chrominance cross-talk component is inverted at every second line interval. It is noted that the phase of the main chrominance component $S_s$ during field interval $T_n$ is inverted with respect to the phase of the reproduced main chrominance component during field interval $T_m$. However, this phase inversion does not affect the line-sequential arrangement of red and blue color difference signals. As may be recognized, if desired, the phase of the modulated sub-carrier of the main chrominance component may be inverted at every third line interval so as to restore the original phase relation to the SECAM television signal. Also, the phase of the modulated sub-carrier of the main chrominance component $S_s$ during field interval $T_n$ is equal to $\pi$ because the phase of the re-converting signal $S_{qp}$ is opposite to the phase of the frequency-converted main chrominance component $S_c$. If the phase of the re-converting signal $S_{qp}$ is made equal to the phase of the frequency-converted chrominance component $S_c$, as by inverting the waveform of switch control signal $S_p$, then, during field interval $T_n$, the phase of the re-converted chrominance component $S_s$ will be zero.

The output of frequency re-converter 53, as shown in FIG. 15I, is supplied to comb filter 54. It is appreciated that the frequency of the modulated sub-carrier of the main chrominance component $S_s$ in each line interval is equal to the frequency of the modulated sub-carrier of the chrominance cross-talk component $S_k$ in corresponding line intervals. Nevertheless, the phase of the main chrominance component at the (i)th line interval is equal to the phase of the main chrominance component at the (i−2)th line interval; whereas the phase of the chrominance cross-talk component $S_k$ at the (i)th line interval is opposite to the phase of the chrominance cross-talk component at the (i−2)th line interval. Consequently, if comb filter 54 is of the type shown in any of FIGS. 6, 12 or 13, the phase of the 2H delayed main chrominance component will be equal to the phase of the undelayed main chrominance component, but the phase of the 2H delayed chrominance cross-talk component $S_k$ will be opposite to the phase of the undelayed chrominance cross-talk component. Thus, the delayed and undelayed cross-talk components will cancel each other in combining circuit 542. Thus, the undesired cross-talk components will be substantially eliminated from the reproduced main chrominance component by reason of the particular phase relation of the frequency-converting signals $S_q$ and the phase relation of the frequency re-converting signals $S_{qp}$.

Control Circuit 120

Figure 16:
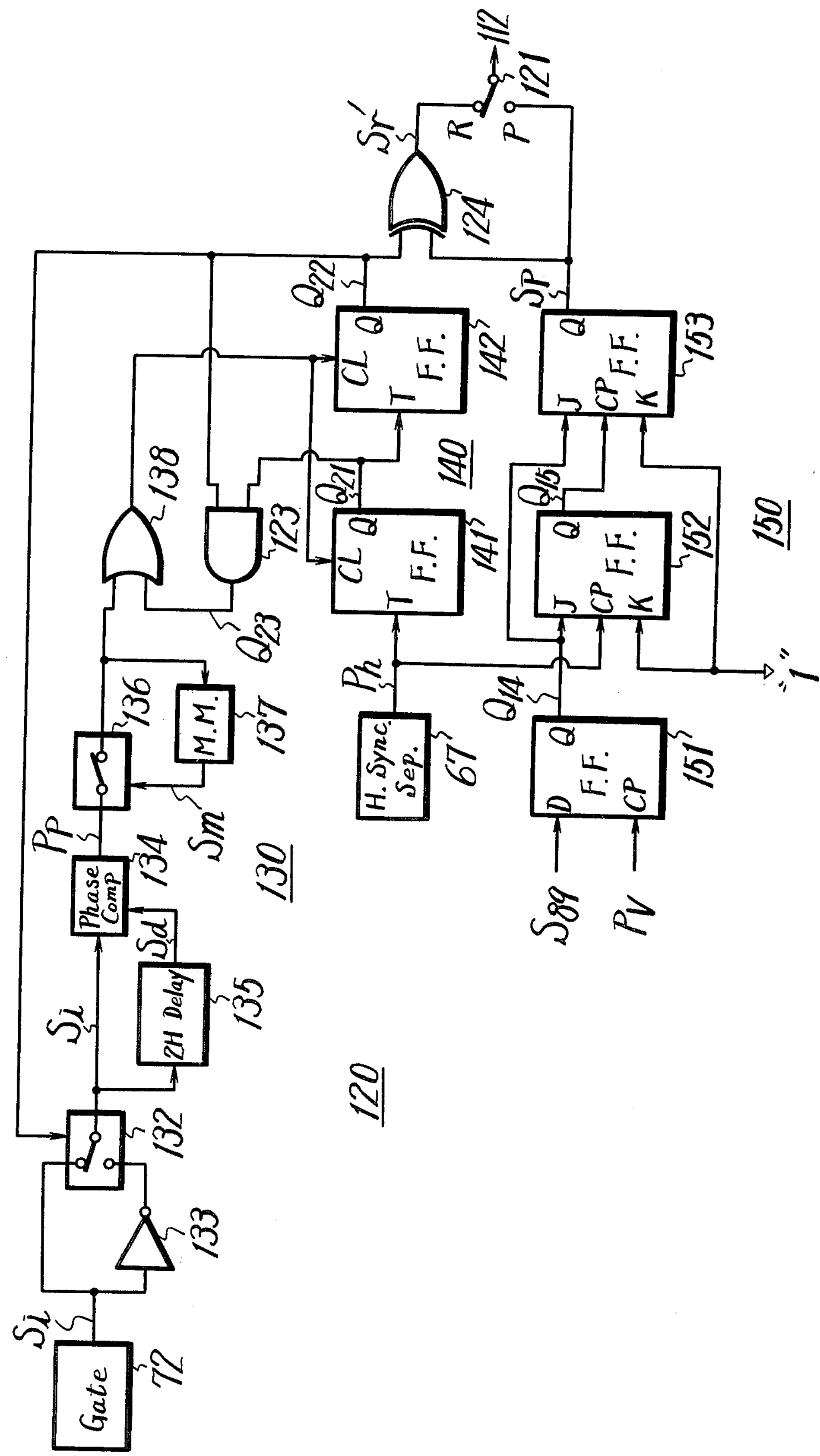
FIG. 16 is a logic diagram of a portion of the circuitry shown in FIG. 14.

A logic diagram of control circuit 120 is illustrated in FIG. 16. This circuit is comprised of a playback control circuit 150 for producing switch control signal $S_p$, recording control circuit 140 for producing switch control signal $S'_r$, and an adjusting circuit 130 which is used to insure that recording control circuit 140 functions properly. Playback control circuit 150 includes a D-type flip-flop circuit 151 and J-K flip-flop circuits 152 and 153 connected as a frequency-divider, or counter. D-type flip-flip circuit 151 is of the type that includes a data input D, connected herein to receive sensing signal $S_{89}$ produced by flip-flop circuit 89, and a clock pulse input CP, connected herein to receive the vertical synchronizing pulse $P_v$ included in the incoming SECAM television signal during the recording operation or the reproduced control pulse which is played back from tape 2 by control head 98. The state of flip-flop circuit 151 is changed in correspondence with the binary "1" or binary "0" level of signal $S_{89}$ at the time that the vertical synchronizing pulse (or reproduced control signal) $P_v$ is applied to the clock pulse input. The state of this flip-flop circuit is represented by the binary level at the Q output thereof. This Q output is connected in common to the J inputs of J-K flip-flop circuits 152 and 153. The K inputs of these flip-flop circuits are connected in common to a positive DC level, referred to herein as a binary "1" level. The clock pulse input CP of flip-flop circuit 152 is connected to synchronizing signal separator 67 to receive the separated horizontal synchronizing pulse $P_h$ therefrom. The clock pulse input CP of flip-flop circuit 153 is connected to the Q output of flip-flop circuit 152. As is conventional, if a binary "1" is applied to both the J and K inputs of a J-K flip-flop circuit, the state of this flip-flop circuit is changed. However, if a binary "0" is applied to the J input thereof, the state of the flip-flop circuit remains unchanged. The output of playback control circuit 150 is derived from the Q output of flip-flop circuit 153 and is supplied to the P contact of a record/playback change-over switch 121. The output of this switch is connected to the control input of change-over switch 112 (FIG. 14). In addition, the Q output of flip-flop circuit 153 is connected to an exclusive-OR gate 124 included in recording control circuit 140.

Before describing the construction of recording control circuit 140 and adjusting circuit 130, the operation of playback control circuit 150 will be described with reference to the waveforms shown in FIGS. 17A–17F. In order to simplify the following discussion, it is assumed that signal $P_v$ which is supplied to clock pulse input CP of flip-flop circuit 151 either is the vertical synchronizing pulse included in the incoming SECAM television signal during the recording operation or is the reproduced control pulse derived from control head 98 during the reproducing operation. This pulse signal is shown in FIG. 17A at the beginning of field intervals $T_m$ and $T_n$. FIG. 17B represents the waveform of sensing signal $S_{89}$. When head 1M scans tape 2 to record or reproduce the SECAM television signals in field interval $T_m$, signal $S_{89}$ is at its relatively low binary "0" level. When head 1N scans tape 2 to record or reproduce the SECAM television signals in field interval $T_n$, signal $S_{89}$ is at its relatively higher binary "1" level. Accordingly, flip-flop circuit 151 is triggered by pulse $P_v$ so as to change the state thereof as a function of the level of sensing signal $S_{89}$. The output $Q_{14}$ of flip-flop circuit 151 is illustrated in FIG. 17C, and is seen to be a binary "0" during field interval $T_m$ and a binary "1" during field interval $T_n$.

The horizontal synchronizing pulses $P_h$ derived from synchronizing signal separator 67 are illustrated in FIG. 17D. During field interval $T_m$ when output $Q_{14}$ of flip-flop circuit 151 is a binary "0", J-K flip-flop circuits 152 and 153 remain at their respective binary "0" levels, as shown in FIGS. 17E and 17F, respectively. However, during field interval $T_n$, output $Q_{14}$ of flip-flop circuit 151 is a binary "1". Hence, flip-flop circuit 152 responds to each horizontal synchronizing pulse $P_h$ to change the state thereof. FIG. 17E represents that the output $Q_{15}$ of flip-flop circuit 152 is a rectangular waveform whose frequency is equal to one-half the horizontal line frequency. Each negative transition in output $Q_{15}$ of flip-flop circuit 152 triggers flip-flop circuit 153 to change the state of the latter during field interval $T_n$ wherein output $Q_{14}$ of flip-flop circuit 151 is a binary "1". Hence, FIG. 17F illustrates switch control signal $S_p$ to have a rectangular waveform whose frequency is one-half the frequency of output $Q_{15}$, and thus one-fourth the horizontal line frequency. It is appreciated that switch control signal $S_p$, as shown in FIG. 17F, is the same as switch control signal $S_p$ discussed previously with respect to FIG. 15G. Consequently, during the reproducing operation, switch control signal $S_p$ is supplied via record/playback change-over switch 121 to change-over switch 112 to control the operation of the latter in the manner discussed hereinabove.

At the beginning of the next field interval $T_m$, output $Q_{14}$ of flip-flop circuit 151 is triggered by pulse $P_v$ to its binary "0" level, in response to sensing signal $S_{89}$. Hence, during this next field interval $T_m$, neither flip-flop circuit 152 nor flip-flop circuit 153 changes its state. This is shown in FIGS. 17E and 17F, respectively. Therefore, during this next field interval $T_m$, switch control signal $S_p$ once again remains at its binary "0" level.

Returning now to FIG. 16, to recording control circuit 140 is shown to be comprised of triggerable flip-flop circuits 141 and 142, AND gate 123 and exclusive-OR gate 124. Each of the triggerable flip-flop circuits is adapted to change the state thereof in response to a negative transition supplied to its trigger input terminal. In addition, each triggerable flip-flop circuit includes a CLEAR input CL which is adapted to reset the flip-flop circuit to its binary "0" state in response to a binary "1" supplied thereto. The trigger input of triggerable flip-flop circuit 141 is connected to synchronizing signal separator 67 to receive each horizontal synchronizing pulse therefrom. The Q output of flip-flop circuit 141 is connected to the trigger input of flip-flop circuit 142. AND gate 123 includes first and second inputs connected to the Q outputs of flip-flop circuits 141 and 142, respectively. The output of AND gate 123 is coupled via an OR gate 138 to the CLEAR inputs CL of both flip-flop circuits 141 and 142. The Q output of flip-flop circuit 142 is connected to an input of exclusive-OR gate 124, the other input of which being coupled to the Q output of flip-flop circuit 153, as mentioned above.

In operation, the combination of flip-flop circuits 141 and 142, together with AND gate 123, functions as a divide-by-three circuit, wherein the frequency of the horizontal synchronizing pulses is divided by a factor of three. For this purpose, the waveform shown in FIG. 18A represents the horizontal synchronizing pulses $P_h$ referred to as the first, second and third pulses, 1,2,3, these pulses repeating in the sequence 1-2-3-1-2-3 . . . , as shown. In response to the first horizontal synchronizing pulse $P_h$, flip-flop circuit 141 is triggered to its set state, as indicated in FIG. 18B. In response to the second horizontal synchronizing pulse, flip-flop circuit 141 is reset. Hence, its Q output, shown as output $Q_{21}$, changes from its binary "1" level to its binary "0" level.

In response to the negative transition of output $Q_{21}$, flip-flop circuit 142 is triggered to its binary "1" level, as shown in FIG. 18C. Then, in response to the third horizontal synchronizing pulse, flip-flop circuit 141 is triggered to its set state, whereupon outputs $Q_{21}$ and $Q_{22}$ of flip-flop circuits 141 and 142 both are at their binary "1" levels. Consequently, AND gate 123 is provided with a binary "1" at each input thereof so as to supply a binary "1" through OR gate 138 to the CLEAR inputs CL of flip-flop circuits 141 and 142, as shown in FIG. 18D. This output $Q_{23}$ of AND gate 123 serves to clear, or reset, both flip-flop circuits, thereby restoring outputs $Q_{21}$ and $Q_{22}$ thereof, to their binary "0" levels. Thus, and as shown in FIGS. 18A–18C, at the third horizontal synchronizing pulse, both flip-flop circuits are reset, whereupon output $Q_{22}$ of flip-flop circuit 142 returns from its binary "1" level to its binary "0" level. The flip-flop circuits then are in condition to repeat the aforedescribed operation. Accordingly, in the next sequence of three horizontal synchronizing pulses, the first pulse sets flip-flop circuit 141, the second pulse sets flip-flop circuit 142 and the third pulse results in the resetting of both flip-flop circuits. As can be seen from FIG. 18C, output $Q_{22}$ of flip-flop circuit 142 is a rectangular waveform having a frequency equal to one-third the horizontal line frequency, each positive pulse in this waveform having a duration equal to one horizontal line interval.

The manner in which output $Q_{22}$ and switch control signal $S_p$ is used to produce switch control circuit $S'_r$, and the relation of switch control circuit $S'_r$ to the phases of the modulated sub-carrier of the chrominance component of the SECAM television signal are illustrated in the waveform diagrams of FIGS. 19A–19E. FIG. 19A depicts the phase relation of the chrominance sub-carrier during field intervals $T_m$ and $T_n$, respectively. FIG. 19B represents the horizontal synchronizing pulses $P_h$; and FIG. 19C represents switch control signal $S_p$, described previously with respect to FIGS. 17A–17F. It may be appreciated that, during field interval $T_n$, switch control signal $S_p$ shown in FIG. 19C is inverted with respect to switch control $S_p$ shown in FIG. 17F. Such inversion, of course, can be brought about merely by providing an inverter at the Q output of flip-flop circuit 153 or, alternatively, by deriving switch control signal $S_p$ from the $\overline{Q}$ output of this flip-flop circuit.

Output $Q_{22}$ of flip-flop circuit 142, shown in FIG. 18C, is re-drawn in FIG. 19D. Switch control signal $S_p$ and output $Q_{22}$ are applied to exclusive-OR gate 124. This exclusive-OR gate functions to produce a binary "1" at its output when the signals supplied to its inputs differ from each other. However, if the same signal is supplied to each input of exclusive-OR gate 124, this gate produces a binary "0". The output of exclusive-OR gate 124 is shown in FIG. 19E as switch control signal $S'_r$. It is seen that, during field interval $T_m$ wherein switch control signal $S_p$ is a binary "0", the output of exclusive-OR gate 124, that is, switch control signal $S'_r$, is equal to output $Q_{22}$. However, during field interval $T_n$, the output of exclusive-OR gate 24 is a binary "1" when switch control signal $S_p$ is a binary "1" but output $Q_{22}$ is a binary "0". At the next line interval, switch control $S_p$ and output $Q_{22}$ each are a binary "0". Hence, the output of exclusive-OR gate 124 likewise is a binary "0". Then, during the next four line intervals, the levels of switch control signal $S_p$ and output $Q_{22}$ differ from each other. Therefore, as shown in FIG. 19E, the output of exclusive-OR gate 124 is a binary "1" for each of these four line intervals. Then, during the next line interval, switch control signal $S_p$ and output $Q_{22}$ each are a binary "0". Hence, the output of exclusive-OR gate 124 likewise is a binary "0". At the next line interval, switch control signal $S_p$ is a binary "1" while output $Q_{22}$ is a binary "0". Therefore, the output of exclusive-OR gate 124 is a binary "1". During the next following four line intervals, the levels of switch control signal $S_p$ and output $Q_{22}$ are equal to each other. Accordingly, the output of exclusive-OR gate 124 during these four line intervals is a binary "0".

Thus, the output of exclusive-OR gate 124, which constitutes switch control signal $S'_r$ during the recording operation, appears as shown in FIG. 15C. This switch control signal is a binary "1" during each third line interval in field interval $T_m$, that is, when the phase of the modulated sub-carrier of the chrominance component $S_s$ is equal to $\pi$. During field interval $T_n$, switch control signal $S'_r$ is a binary "1" for the line intervals wherein the phase of the modulated subcarrier of chrominance component $S_s$ undergoes the sequency $0\pi\pi0$. Then, during the next two line intervals, switch control signal $S'_r$ undergoes two successive transitions. At the next sequence of four line intervals wherein the phase of the modulated sub-carrier of chrominance component $S_s$ undergoes the sequence $0\pi\pi0$, switch control signal $S'_r$ is a binary "0". Then, the switch control signal undergoes two transitions during the next two successive line intervals to complete the periodic level-change thereof.

In order for switch control signal $S'_r$ to have the waveform illustrated in FIG. 19E (and also in FIG. 15C), it is necessary that output $Q_{22}$ be at its binary "1" level when the phase of chrominance component $S_s$ is equal to $\pi$ during field interval $T_m$, and when this phase is equal to zero during field interval $T_n$. That is, output $Q_{22}$ should be a binary "1" during that line interval wherein the phase of the chrominance component $S_s$ differs from the phase thereof at its adjacent line interval. Adjusting circuit 130 is provided for the purpose of controlling recording control circuit 140 to maintain this relation. The adjusting circuit is comprised of a change-over switch 132 having one input connected directly to receive discriminating signal $S_i$ (as mentioned with reference to FIG. 14), and another input connected to an inverter 133 to receive a phase-inverted version of this discriminating signal. Switching circuit 132 is controlled by output $Q_{22}$ such that the non-inverted discriminating signal is transmitted to the output of this change-over switch when output $Q_{22}$ is a binary "0", and the phase-inverted version of the discriminating signal is transmitted to the output of change-over switch 132 when output $Q_{22}$ is a binary "1".

The output of change-over switch 132 is connected directly to one input of a phase comparator 134, and through a 2H delay circuit 135 to another input of this phase comparator. It is appreciated that 2H delay circuit 135 functions to delay the output of change-over switch 132 by a time duration equal to two horizontal line intervals. Phase comparator 134 functions to compare the phases of the delayed and undelayed discriminating signals supplied thereto and to produce an output pulse, or binary "1", if these phases differ from each other. The output of phase comparator 134 is coupled through a gate 136 to OR gate 138, and thence to the CLEAR inputs CL of flip-flop circuits 141 and 142. The output of gate circuit 136 is connected to a monostable multivibrator 137, the latter having an output which serves to close the gate circuit (or open the illustrated switch equivalent thereof) when the monostable multivibrator is triggered to its quasi-stable state. The time constant of monostable multivibrator 137 is equal to three horizontal line intervals. That is, if the monostable multivibrator is triggered by the output of gate circuit 136, the gate circuit remains closed for a duration equal to three line intervals.

The manner in which adjusting circuit 130 functions to control the operation of recording control circuit 140 now will be described with reference to the waveform diagrams shown in FIGS. 20A–20G. FIG. 20A represents the horizontal synchronizing pulses $P_h$ which are separated by synchronizing signal separator 67. These horizontal synchronizing pulses are used to trigger flip-flop circuit 141 which, in turn, triggers flip-flop circuit 142 so as to produce output $Q_{22}$, as shown in FIG. 20C. The detailed description as to the manner in which output $Q_{22}$ is produced has been described previously with respect to FIGS. 18A–18D. The relationship between output $Q_{22}$ and the phase of chrominance component $S_s$, and also the phase of discriminating signal $S_i$ (which, it is recalled, is equal to the phase of the chrominance component) is shown in FIGS. 20B and 20C.

It is seen that, during the line intervals that the phase of discriminating signal $S_i$ is zero, output $Q_{22}$ is a binary "0". Hence, discriminating signal $S'_i$ provided at the output of change-over switch 132 is equal to the non-inverted discriminating signal $S_i$ of zero phase. When the phase of discriminating signal $S_i$ is $\pi$, output $Q_{22}$ is a binary "1". Hence, change-over switch 132 is operated to transmit the inverted version of the discriminating signal. Thus, the output of switch 132 when output $Q_{22}$ is a binary "1" also has a phase equal to zero. This discriminating signal $S'_i$ is illustrated in FIG. 20D. The delayed version $S_d$ of this discriminating signal likewise has a phase of zero, as shown in FIG. 20E, during each line interval. Accordingly, since the phases of delayed discriminating signal $S_d$ and undelayed discriminating signal $S'_i$ are equal to each other, phase comparator 134 produces an output $P_p$ which is equal to a binary "0" level. This binary "0" output does not trigger monostable multivibrator 137.

Let it be assumed that, because of some error, output $Q_{22}$ becomes a binary "1" at time $t_1$ during the line interval that the phase of discriminating signal $S_i$ is zero. This, of course, is an improper operation of recording control circuit 140. The binary "1" of output $Q_{22}$ changes over switch 132 so as to transmit the inverted version of discriminating signal $S_i$ to its output. This is shown in FIG. 20D wherein discriminating signal $S'_i$ has a phase equal to $\pi$.

Prior to time $t_1$, it is assumed that recording control circuit 140 had been operating properly. It is appreciated that, in accordance with the proper operation of this recording control circuit, the delayed discriminating signal $S_d$ always will have a phase equal to zero. Hence, at time $t_1$, discriminating signal $S'_i$ and delayed discriminating signal $S_d$ will have different phases. Phase comparator 134 detects this difference in phase to produce output $P_p$ which is a binary "1". This output is supplied through gate circuit 136 and OR gate 138 to the CLEAR inputs CL of flip-flop circuits 141 and 142. From the aforedescribed operation of flip-flop circuits 141 and 142, and particularly with reference to FIGS. 18A–18D, this output pulse $P_p$ produced by phase comparator 134 functions as a simulated third horizontal synchronizing pulse. Accordingly, flip-flop circuits 141 and 142 are reset, resulting in output $Q_{22}$ returning from its binary "1" level to its binary "0" level. At the same time, output pulse $P_p$ triggers monostable multivibrator 137, whereupon the monostable multivibrator produces a disabling signal $S_m$, shown in FIG. 20G, to close gate circuit 136.

It is recalled that, after the third horizontal synchronizing pulse, flip-flop circuit 142 will not be triggered to its set state until the second horizontal synchronizing pulse in the next triad of horizontal synchronizing pulses. Therefore, after the resetting of flip-flop circuits 141 and 142 by output pulse $P_p$, the next horizontal synchronizing pulse $P_h$ is interpreted as being the first such pulse in the next triad. Therefore, output $Q_{22}$ remains at its binary "0" level, even though the phase of the discriminating signal $S_i$ is equal to $\pi$. Since output $Q_{22}$ is a binary "0", change-over switch 132 transmits the non-inverted discriminating signal to phase comparator 134. Thus, discriminating signal $S'_i$ has a phase equal to $\pi$. Concurrently, the delayed version $S_d$ of the discriminating signal has a phase equal to zero, as shown in FIG. 20E. This phase differential is detected by phase comparator 134 which produces another output pulse $P_p$. However, since monostable multivibrator 137 had been triggered, and since this monostable multivibrator remains in its quasi-stable state for a duration equal to three horizontal line intervals, gate circuit 136 remains closed. This means that output pulse $P_p$ cannot be transmitted therethrough.

The next horizontal synchronizing pulse $P_h$ (FIG. 20A) is interpreted as being the second horizontal synchronizing pulse and, therefore, flip-flop circuit 142 is set to produce output $Q_{22}$ as a binary "1", as shown in FIG. 20C. At this time, the phase of discriminating signal $S_i$ is equal to zero. However, since output $Q_{22}$ now is a binary "1", change-over switch 132 is operated to transmit the inverted version of this discriminating signal. Consequently, discriminating signal $S'_i$ supplied to phase comparator 134 by switch 132 has a phase equal to $\pi$, as shown in FIG. 20D. Concurrently, the delayed discriminating signal $S_d$ also has a phase equal to $\pi$. This is because the phase of discriminating signal $S'_i$ at two prior line intervals was equal to $\pi$. Since the delayed and undelayed discriminating signals supplied to phase comparator 134 have the same phases, the phase comparator does not produce output pulse $P_p$. Therefore, even though flip-flop circuit 142 had been set incorrectly to produce output $Q_{22}$ as a binary "1", this flip-flop circuit is not reset.

The next horizontal synchronizing pulse is interpreted as the third pulse in the triad. Consequently, output $Q_{22}$ is reset to a binary "0". At this time, the phase of the discriminating signal $S_i$ is equal to zero, and change-over switch 132 transmits this zero phase to its output. Accordingly, phase comparator 134 receives the discriminating signal $S'_i$ as a zero phase. Concurrently, the delayed discriminating signal $S_d$ has a phase equal to $\pi$. Therefore, phase comparator 134 detects this phase differential to produce output pulse $P_p$. Nevertheless, gate circuit 136 still is closed so as to prevent this output pulse $P_p$ from being transmitted to flip-flop circuits 141 and 142.

The next horizontal synchronizing pulse $P_h$ is interpreted as being the first such pulse in the next triad. Thus, output $Q_{22}$ remains at its binary "0" level even though the phase of discriminating signal $S_i$ is equal to $\pi$. Change-over switch 132 transmits this discriminating signal to its output. Hence, phase comparator 134 is supplied with discriminating signal $S'_i$ whose phase is equal to $\pi$. Concurrently, the delayed discriminating signal $S_d$ has a phase which also is equal to $\pi$, resulting in no output pulse $P_p$ from phase comparator 134.

The next horizontal synchronizing pulse $P_h$ is interpreted as being the second such pulse in the triad. This, flip-flip circuit 142 is set to produce output $Q_{22}$ as a binary "1". This means that change-over switch 132 is operated to transmit the phase-inverted version of the discriminating signal to its output. At this time, the phase of the discriminating signal is zero, resulting in a discriminating signal $S'_i$ whose phase is equal to $\pi$, as shown in FIG. 20D. Concurrently, the phase of delayed discriminating signal $S_d$ is equal to zero. Thus, phase comparator 134 detects this phase difference to produce output pulse $P_p$ at time $t_4$. It is appreciated that, prior to this setting of flip-flop circuit 142, monostable multivibrator 137 had returned to its stable state. This is represented in FIG. 20G wherein inhibit signal $S_m$ had returned from its binary "1" level to its binary "0" level. Now, however, since output pulse $P_p$ is produced, monostable multivibrator 137 is triggered once again to its quasi-stable state at time $t_4$, as shown in FIG. 20G.

In addition to triggering the monostable multivibrator, output pulse $P_p$ is supplied through OR gate 138 to the CLEAR inputs CL of flip-flop circuits 141 and 142. This output pulse $P_p$ is interpreted as being the third horizontal synchronizing pulse in a triad. Thus, output $Q_{22}$ is reset from its binary "1" level to its binary "0" level, as shown in FIG. 20C.

The next horizontal synchronizing pulse $P_h$ is interpreted as being the first such pulse in the next triad. It is appreciated that flip-flop circuits 141 and 142 are in the proper state for responding to this first horizontal synchronizing pulse so as to operate in the manner discussed previously with respect to FIGS. 18A–18D. Therefore, commencing with time $t_4$, recording control circuit 140 will operate in the desired manner. During the interval from time $t_1$ to time $t_4$, adjusting circuit 130 has operated to modify the operation of recording circuit 140 so as to return this circuit to its proper operating condition. Therefore, output $Q_{22}$ once again is a binary "1" at each third line interval wherein the phase of the discriminating signal, and thus the phase of the chrominance component, differs from the phase of the discriminating signal in those line intervals which are adjacent thereto.

While the foregoing operation has described the manner in which recording circuit 140 is adjusted during field interval $T_m$ such that output $Q_{22}$ is a binary "1" whenever the phase of the chrominance component $S_s$ is equal to $\pi$, a similar operation occurs during field interval $T_n$. That is, during field interval $T_n$, adjusting circuit 130 operates to control recording control circuit 140 such that output $Q_{22}$ is a binary "1" whenever the phase of the chrominance component $S_s$ is equal to zero.

Thus, it is seen that, in accordance with the present invention, and particularly, pursuant to the embodiment shown in FIG. 1 or the embodiment shown in FIGS. 14 and 16, the chrominance component of the SECAM composite color television signal is recorded in adjacent tracks in frequency interleaved relation. This frequency interleaved relation is attained by using different frequency-converting signals for the recording of the chrominance component in adjacent tracks. In the embodiment of FIG. 1, the phase of each frequency-converting signal is synchronized, or locked, to the phase of the chrominance sub-carrier of the incoming SECAM television signal, and the frequencies of these frequency-converting signals differ from each other by n/4fh and, preferably, by 1/4fh. In the embodiment of FIGS. 14 and 16, the frequency of the frequency-converting signal is constant for the recording of the chrominance component in all tracks. However, the phase of this frequency-converting signal differs from one track to the next. For the recording of the chrominance component in one track, the phase of the frequency-converting signal is synchronized, or locked, to the phase of the chrominance sub-carrier of the incoming SECAM television signal. For the recording of the SECAM television signal in the next adjacent track, the phase of the frequency-converting signal is inverted periodically such that, when the chrominance sub-carrier is frequency-converted with this frequency-converting signal, the phase of the converted sub-carrier changes, i.e., is inverted, at every other line interval.

When the chrominance component of the SECAM television signal is recorded with different frequencies in adjacent tracks, the phase of the chrominance component in the (i)th line interval is substantially opposite to the phase of the chrominance component in the (i−2)th interval. Thus, if the converted chrominance component is re-converted back to its original range with a frequency re-converting signal of substantially constant frequency, the re-converted chrominance cross-talk components in the (i)th and (i−2)th line intervals will exhibit an out-of-phase relation with each other. Hence, if the re-converted chrominance component in the (i)th and (i−2)th line intervals are summed, such cross-talk components will cancel. Similarly, if the phase relation of the recorded frequency-converted chrominance components in adjacent tracks is such that the chrominance component is of a substantially constant phase in one track and is phase-inverted at every alternate line interval in the next adjacent track, the frequency re-converting signal can be of a substantially constant frequency for all tracks and have a phase which is synchronized with the phase of the recorded chrominance component. The resultant frequency re-converted chrominance cross-talk components will be out of phase with respect to each other in the (i)th and (i−2)th line intervals, respectively. Thus, these cross-talk components can be cancelled by summing the chrominance components in the (i)th and (i−2)th line intervals. Stated otherwise, in both embodiments of the present invention, a comb filter can be used to remove the chrominance crosstalk components which are reproduced from an adjacent track during the scanning of a given track. This characteristic is made possible because of the frequency-interleaved relation of the chrominance components which are recorded in adjacent tracks.

While the present invention has been particularly shown and described with respect to certain preferred embodiments, it will be readily apparent to those of ordinary skill in the art that various changes and modifications in form and details can be made without departing from the spirit and scope of the invention. It is, therefore, intended that the appended claims be interpreted as including all such changes and modifications.

What is claimed is:

1. In apparatus for recording a SECAM composite color television signal in parallel tracks on a record medium by separating the luminance and chrominance components from said SECAM television signal, modulating said luminance component to a higher frequency range, converting said chrominance component to a lower frequency range, and recording the modulated luminance component and frequency-converted chrominance component, the improvement comprising means for generating first and second frequency-converting carrier signals; phase control means for imparting phase changes into said frequency-converting carrier signals which are related to phase changes in the chrominance subcarrier of the chrominance component in said SECAM television signal; and frequency-converting means supplied with said chrominance component of said SECAM television signal and the phase controlled frequency-converting carrier signals to produce frequency-converted chrominance components for recording in adjacent tracks having subcarrier phase changes eliminated therefrom in at least one track and having frequency-converted subcarriers in one track which differ from the frequency-converted subcarriers in an adjacent track.

2. The improvement of claim 1 wherein the frequency-converted subcarrier frequencies in adjacent tracks are in frequency interleaved relation with respect to each other.

3. The improvement of claim 2 wherein said phase control means comprises an injection-locked oscillator for producing an oscillating signal of substantially constant frequency; means for locking the phase of said oscillating signal produced by said injection-locked oscillator to the phase of the chrominance sub-carrier in each horizontal line interval of said SECAM television signal; and combining means for combining the phase-locked oscillating signal and the generated frequency-converting carrier signal to produce said phase controlled frequency-converting carrier signal.

4. The improvement of claim 3 wherein said means for generating a frequency-converting carrier signal comprises controllable oscillator means operable during the period that the SECAM composite color television signal is recorded in one track to produce a frequency-converting carrier signal of one frequency and operable during the period that the SECAM composite color television is recorded in the next adjacent track to produce a frequency-converting carrier signal of a different frequency, said different frequency differing from said one frequency by a factor n/4fh, wherein n is an integer and fh is the horizontal line frequency of said SECAM television signal; and wherein said combining means comprises a frequency converter supplied with said frequency-converting carrier signal produced by said controllable oscillator means and said phase-locked oscillating signal.

5. The improvement of claim 4 wherein said controllable oscillator means comprises a voltage-controlled oscillator; first and second frequency-dividers coupled to the output of said voltage-controlled oscillator for dividing the frequency of the output of said voltage-controlled oscillator by factors $m_1$ and $m_2$, respectively; synchronizing signal separator means for separating the horizontal synchronizing signal from said SECAM television signal; phase comparator means coupled to said synchronizing signal separator means and to said first and second frequency-dividers for comparing the phase of said horizontal synchronizing signal to the phase of the frequency-divided output of said voltage-controlled oscillator to produce a control signal; means for selectively supplying to said phase comparator means said output of said voltage controlled oscillator, frequency-divided by the factor $m_1$ during the period that the SECAM composite color television signal is recorded in one track, and frequency-divided by the factor $m_2$ during the period that the SECAM composite color television signal is recorded in the next adjacent track; and means for supplying said control signal produced by said phase comparator means to said voltage-controlled oscillator.

6. The improvement of claim 5 further comprising another frequency-divider coupled to the output of said voltage-controlled oscillator for dividing the frequency of the output of said voltage-controlled oscillator by another factor $m_3$ and supplying same to said frequency-converter, wherein $(m_1-m_2)/m_3=n/4$.

7. The improvement of claim 5 wherein said phase comparator means comprises a sawtooth waveform generator for generating a sawtooth waveform whose frequency is equal to the frequency of the output of said voltage-controlled oscillator divided by the factor $m_1$ or $m_2$; and sampling means responsive to said horizontal synchronizing signal for sampling said sawtooth waveform.

8. The improvement of claim 7 wherein said means for selectively supplying to said phase comparator means the frequency-divided output of said voltage-controlled oscillator comprises a switch having one input coupled to the output of said first frequency-divider, another input coupled to the output of said second frequency-divider, and an output connected to said sawtooth waveform generator and coupled to said one input during the period that the SECAM composite color television signal is recorded in one track, and to said other input during the period that the SECAM composite color television signal is recorded in the next adjacent track.

9. The improvement of claim 3 wherein said means for locking the phase of said oscillating signal produced by said injection locked oscillator comprises gating means operative during each horizontal line interval to pass the discriminating signal included in the SECAM composite color television signal to said injection locked oscillator.

10. The improvement of claim 9 wherein the frequency of the oscillating signal produced by said injection locked oscillator is equal to a predetermined frequency of the discriminating signal during certain ones of said horizontal line intervals; and said means for locking the phase of said oscillating signal produced by said injection locked oscillator further comprises means for shifting the frequency of the discriminating signal during other of said horizontal line intervals to said predetermined frequency prior to the passing thereof to said injection locked oscillator.

11. The improvement of claim 10 wherein said means for shifting the frequency of the discriminating signal during other of said horizontal line intervals comprises a sawtooth waveform generator for generating a sawtooth waveform only in each of said other horizontal line intervals during at least the period thereof that said discriminating signal is received; and phase modulating means for receiving at least the discriminating signal included in each of said horizontal line intervals for modulating the phase thereof with the output of said sawtooth waveform generator, whereby the phase modulation of the discriminating signal during said other horizontal line intervals results in a change in frequency thereof to said predetermined frequency.

12. The improvement of claim 11 further comprising pulse generating means for generating a pulse in substantial time coincidence with the back porch portion of each horizontal synchronizing interval of the SECAM composite color television signal, said pulse operating said gating means to pass either the discriminating signal or the frequency-shifted discriminating signal to said injection locked oscillator.

13. The improvement of claim 12 further comprising means for inhibiting the operation of said injection locked oscillator during the time of occurrence of the horizontal synchronizing pulse in the SECAM composite color television signal.

14. The improvement of claim 2 wherein said means for generating first and second frequency-converting carrier signals comprises reference generating means for generating a reference oscillating signal of substantially constant frequency; and phase inverting means for inverting the phase of said reference oscillating signal during selected horizontal line intervals, such that the phase of the subcarrier of the chrominance component of the recorded SECAM television signal is constant for all horizontal line intervals in one track and is inverted at successive groups of horizontal line intervals in the next adjacent track.

15. The improvement of claim 14 wherein said phase control means comprises switch means for selectively passing said reference oscillating signal and the phase-inverted reference oscillating signal to said frequency-converting means; and switch control means operative during the period that the SECAM composite color television signal is recorded in one track to control said switch means to supply said phase-inverted reference oscillating signal to said frequency-converting means during horizontal line intervals that the subcarrier of said chrominance component of the SECAM color television signal is phase-shifted relative to said subcarrier in adjacent horizontal line intervals and to supply said reference oscillating signal to said frequency-converting means during remaining horizontal line intervals, and operative during the period that the SECAM composite color television signal is recorded in the next adjacent track to periodically control said switch means to supply said phase-inverted reference oscillating signal to said frequency-converting means for a predetermined number of horizontal line intervals, and then to supply said reference oscillating signal followed by said phase-inverted reference oscillating signal to said frequency-converting means during the next successive horizontal line intervals, and then to supply said reference oscillating signal to said frequency-converting means of said predetermined number of horizontal line intervals, and then to supply said phase-inverted reference oscillating signal followed by said reference oscillating signal to said frequency-converting means during the next successive horizontal line intervals.

16. The improvement of claim 15 wherein said switch control means comprises synchronizing signal separator means for separating the horizontal synchronizing signal from said SECAM television signal; first counter means for counting said horizontal synchronizing signals to produce an output pulse for the duration of each horizontal line interval that said sub-carrier of said chrominance component is phase-shifted; second counter means for counting said horizontal synchronizing signals to produce a periodic signal whose frequency is an even sub-multiple of the horizontal line frequency during said period that the SECAM composite television signal is recorded in the next adjacent track, said second counter means being inhibited during said period that the SECAM composite color television signal is recorded in said one track; and means for combining said output pulse and said periodic signal to produce a switch control signal for controlling said switch means.

17. The improvement of claim 16 wherein said means for combining said output pulse and said periodic signal comprises an exclusive-OR circuit.

18. The improvement of claim 17 wherein the subcarrier of said chrominance component of the SECAM color television signal is phase-shifted during each third horizontal line interval; wherein said output pulse produced by said first counter means has a frequency that is one-third the horizontal line frequency; and wherein said periodic signal produced by said second counter means has a frequency that is one-fourth the horizontal line frequency.

19. The improvement of claim 16 further comprising counter control means responsive to said subcarrier of said chrominance component of the SECAM television signal to control said first counter means to produce said output pulse when said subcarrier is phase-shifted.

20. The improvement of claim 19 wherein said counter control means comprises phase inverting means for inverting the phase of said subcarrier of said chrominance component; switch means responsive to said ouput pulse to transmit either said subcarrier or the phase-inverted subcarrier; phase comparator means for comparing the phase of the present output of said switch means to the phase of a previous output of said switch means; and means responsive to said phase comparator means for terminating said output pulse in the event that said output pulse causes said switch means to transmit an incorrect phase-inverted subcarrier to said phase comparator means.

21. The improvement of claim 20 wherein said phase comparator means comprises a phase comparator having one input coupled to the output of said switch means and another input; and delay means coupled between the output of said switch means and said other input for supplying the output of said switch means, produced during a previous horizontal line interval, to said phase comparator.

22. The improvement of claim 21 further comprising inhibit means responsive to said means for terminating said output pulse for inhibiting subsequent operation of said means for terminating said output pulse for a predetermined time.

23. The improvement of claim 22 further comprising gate means for supplying only the discriminating signal included in each line interval of the SECAM television signal to said counter control means.

24. The improvement of claim 23 wherein said delay means imparts a delay equal to two horizontal line intervals such that the frequency of the delayed subcarrier signals is equal to the frequency of the undelayed subcarrier signal.

25. The improvement of claim 3 further including means for reproducing the SECAM composite color television signal recorded in each track together with a cross-talk component reproduced from an adjacent track; means for demodulating the reproduced luminance component substantially back to its original frequency range; frequency re-converting means responsive to re-converting signals for frequency re-converting the reproduced chrominance component substantially back to its original frequency range and for re-converting the reproduced cross-talk components; means for generating first and second re-converting signals of substantially equal and fixed phase, said first re-converting signal being supplied to said frequency re-converting means when the SECAM composite color television signal recorded in one track is reproduced and said second re-converting signal being supplied to said frequency re-converting means when the SECAM composite color television signal recorded in the next adjacent track is reproduced; comb filter means coupled to the output of said frequency re-converting means for substantially attenuating the reproduced cross-talk components; and means for re-combining the frequency re-converted chrominance component and the demodulated luminance component.

26. The improvement of claim 25 wherein said means for generating first and second re-converting signals comprises controllable oscillator means operable during the period that the SECAM composite color television signal recorded in one track is reproduced to produce a re-converting carrier signal of one frequency and operable during the period that the SECAM composite color television signal is recorded in the next adjacent track is reproduced to produce a re-converting carrier signal of a different frequency, said different frequency differing from said one frequency by a factor n/4fh, wherein n is an integer and fh is the horizontal line frequency of said SECAM television signal.

27. The improvement of claim 26 wherein said controllable oscillator means comprises a voltage-controlled oscillator; first and second frequency dividers coupled to the output of said voltage-controlled oscillator for dividing the frequency of the output of said voltage-controlled oscillator by factors $m_1$ and $m_2$, respectively; synchronizing signal separator means for separating the horizontal synchronizing signal from the reproduced SECAM television signal; phase comparator means coupled to said synchronizing signal separator means and to said first and second frequency-dividers for comparing the phase of said horizontal synchronizing signal to the phase of the frequency-divided output of said voltage-controlled oscillator to produce a control signal; means for selectively supplying to said phase comparator means said output of said voltage controlled oscillator, frequency-divided by the factor $m_1$ during the period that the SECAM composite color television signal in one track is reproduced, and frequency-divided by the factor $m_2$ during the period that the SECAM composite color television signal recorded in the next adjacent track is reproduced; and means for supplying said control signal produced by said phase comparator means to said voltage-controlled oscillator.

28. The improvement of claim 27 further comprising another frequency-divider coupled to the output of said voltage-controlled oscillator for dividing the frequency of the output of said voltage-controlled oscillator by another factor $m_3$; and means for supplying the output of said voltage-controlled oscillator, frequency-divided by said factor $m_3$, to said frequency re-converter means; and wherein $(m_1-m_2)/m_3=n/4$.

29. The improvement of claim 27 wherein said phase comparator means comprises a sawtooth waveform generator for generating a sawtooth waveform whose frequency is equal to the frequency of the output of said voltage-controlled oscillator divided by the factor $m_1$ or $m_2$; and sampling means responsive to said horizontal synchronizing signal for sampling said sawtooth waveform.

30. The improvement of claim 29 wherein said means for selectively supplying to said phase comparator means the frequency-divided output of said voltage-controlled oscillator comprises a switch having one input coupled to the output of said first frequency-divider, another input coupled to the output of said second frequency-divider, and an output connected to said sawtooth waveform generator and coupled to said one input during the period that the SECAM composite color television signal recorded in one track is reproduced, and to said other input during the period that the SECAM composite color television signal recorded in the next adjacent track is reproduced.

31. The improvement of claim 26 wherein said means for generating first and second re-converting signals further comprises a reference oscillator for generating a reference oscillating signal whose frequency is substantially equal to the frequency of the oscillating signal produced by said injection-locked oscillator; and a frequency converter for combining said reference oscillating signal with the output of said controllable oscillator means, the combined signals being supplied to said frequency re-converting means.

32. The improvement of claim 15 further including means for reproducing the SECAM composite color television signal recorded in each track together with a cross-talk component reproduced from an adjacent track; means for demodulating the reproduced luminance component substantially back to its original frequency range; frequency re-converting means responsive to re-converting signals for frequency re-converting the reproduced chrominance component substantially back to its original frequency range and for re-converting the reproduced cross-talk components; means for generating a first re-converting signal of substantially constant frequency and phase and a second re-converting signal of said substantially constant frequency and whose phase is inverted at successive groups of horizontal line intervals of the reproduced SECAM television signal, said first re-converting signal being supplied to said frequency re-converting means when the SECAM television signal whose sub-carrier of the chrominance component is of constant phase for all horizontal line intervals is reproduced and said second re-converting signal being supplied to said frequency re-converting means when the SECAM television signal whose subcarrier of the chrominance component is of inverted phase at successive groups of horizontal line intervals is reproduced; comb filter means coupled to the output of said frequency re-converting means for substantially attenuating the reproduced cross-talk components; and means for re-combining the frequency re-converted chrominance component and the demodulated luminance component.

33. The improvement of claim 32 wherein the SECAM television signal recorded in said next adjacent track has the phase of the subcarrier of its chrominance component inverted at alternate horizontal line intervals; and wherein the phase of said second re-converting signal is opposite the phase of said subcarrier of the SECAM television signal recorded in said next adjacent track; whereby the phase of the frequency re-converted chrominance component is constant throughout each track.

34. The improvement of claim 33 wherein said means for generating first and second re-converting signals comprises reference oscillating means for generating a re-converting reference oscillating signal; phase inverting means for producing a phase-inverted re-converting reference oscillating signal; and controllable switch means for supplying to said frequency re-converting means said re-converting reference oscillating signal when said SECAM television signal having the subcarrier of constant phase for all horizontal line intervals is reproduced from said one track, and for selectively supplying to said frequency re-converting means when said SECAM television signal is reproduced from said next adjacent track said re-converting oscillating signal when the phase of the subcarrier of the reproduced chrominance component is inverted and said phase-inverted re-converting oscillating signal when the phase of the subcarrier of the reproduced chrominance component is not inverted.

35. The improvement of claim 34 wherein said controllable switch means comprises a switching circuit having inputs coupled to said reference oscillating means and to said phase inverting means, respectively, and an output coupled to said frequency re-converting means; and a switch control circuit comprising synchronizing signal separator means for separating the horizontal synchronizing signal from the reproduced SECAM television signal, a counter for counting said horizontal synchronizing signals to produce an output periodic signal whose frequency is one-fourth the frequency of said horizontal synchronizing signal, and means for inhibiting said counter when said SECAM television signal recorded in said next adjacent track is reproduced.

36. The improvement of claim 26 or 33 wherein said comb filter means comprises a delay circuit for delaying the frequency re-converted chrominance component a predetermined number of horizontal line intervals; and combining means for combining the delayed and undelayed chrominance components.

37. The improvement of claim 36 wherein said combining means comprises an adding circuit.

38. The improvement of claim 37 further comprising an attenuator for attenuating the chrominance component applied to said adding circuit from said delay circuit.

39. The improvement of claim 38 wherein said delay circuit delays the frequency re-converted chrominance component by two horizontal line intervals.

40. The improvement of claim 39 further comprising a subtractor for subtracting the undelayed chrominance component from the delayed chrominance component, the output from said subtractor being supplied to said attenuator.

41. The improvement of claim 1 wherein said SECAM composite color television signals are recorded in successive tracks with their horizontal synchronizing intervals in alignment.

42. The improvement of claim 1 wherein the adjacent tracks in which said SECAM composite color television signal is recorded are arranged without guard bands therebetween.

43. The improvement of claim 1 or 25 wherein said record medium is magnetic; first and second transducers are provided with different azimuth angles to scan successive tracks on said magnetic medium for recording and/or reproducing said SECAM composite color television signal in said one and adjacent tracks, respectively; and sensing means is provided to produce first and second indicating signals when said first and second transducers scan said one and adjacent tracks, respectively.

44. Apparatus for reproducing a SECAM composite color television signal which is recorded in successive parallel tracks on a record medium, the recorded SECAM television signal including a luminance component modulated to a relatively higher frequency range and a chrominance component frequency converted to a relatively lower frequency range, the chrominance component containing, in each horizontal line interval of said SECAM television signal, an unmodulated chrominance subcarrier discriminating signal and a modulated chrominance subcarrier color signal, the phase of the chrominance subcarrier in each horizontal line interval in a track being substantially constant and the frequency of the chrominance subcarrier in one horizontal line interval in one track differing from the frequency of the chrominance subcarrier in an adjacent horizontal line interval in the next adjacent track by n/4fh, where n is an odd integer and fh is the horizontal synchronizing frequency of said SECAM television signal, said apparatus comprising transducer means for scanning said successive tracks to reproduce the SECAM television signal recorded in the scanned track together with a cross-talk component of the SECAM television signal recorded in the track adjacent the scanned track; a luminance channel for demodulating the reproduced luminance component back to its original frequency range; a chrominance channel for re-converting the reproduced chrominance component back to its original frequency range; and combining means for combining the demodulated luminance component and the re-converted chrominance component; and wherein said chrominance channel comprises frequency re-converting means for receiving the reproduced chrominance component and chrominance cross-talk component, and responsive to re-converting signals for frequency re-converting said reproduced chrominance and chrominance cross-talk components; means for generating first and second re-converting signals of substantially constant and equal phase, the frequencies of said first and second re-converting signals differing from each other by n/4fh, the first re-converting signal being supplied to said frequency re-converting means when one track is scanned and the second re-converting signal being supplied to said frequency re-converting means when the next adjacent track is scanned; and comb filter means coupled to the output of said frequency re-converting means for substantially attenuating the frequency re-converted chrominance cross-talk component reproduced from each track.

45. The apparatus of claim 44 wherein said comb filter means comprises a delay circuit for delaying the frequency re-converted chrominance and chrominance cross-talk components a predetermined number of horizontal line intervals; and means for combining the delayed and undelayed frequency re-converted chrominance and chrominance cross-talk components.

46. The apparatus of claim 45 wherein said means for combining the delayed and undelayed frequency re-converted chrominance and chrominance cross-talk components comprises an adding circuit.

47. The apparatus of claim 46 further comprising an attenuator for attenuating the output of said delay circuit supplied to said adding circuit.

48. The apparatus of claim 47 wherein said delay circuit delays the frequency re-converted chrominance and chrominance cross-talk components by two horizontal line intervals.

49. The apparatus of claim 44 wherein said comb filter means comprises a delay circuit for delaying the frequency re-converted chrominance and chrominance cross-talk components by two horizontal line intervals; subtracting means for subtracting the undelayed frequency re-converted chrominance and chrominance cross-talk components from the delayed frequency re-converted chrominance and chrominance cross-talk components; attenuating means for attenuating the output derived from said subtracting means by a predetermined amount; and an adding circuit for adding the output from said attenuating means and said undelayed frequency re-converted chrominance and chrominance cross-talk components.

50. The apparatus of claim 49 wherein said attenuating means attenuates the output derived from said subtracting means by a factor of one-half.

51. The apparatus of claim 44 wherein said means for generating first and second re-converting signals comprises sensing means for sensing when said transducer means scans said one track to produce a first sense signal and for sensing when said transducer means scans said adjacent track to produce a second sense signal; and automatic frequency control means responsive to said first sense signal for deriving said first re-converting signal and responsive to said second sense signal for deriving said second re-converting signal.

52. The apparatus of claim 51 wherein said automatic frequency control means comprises synchronizing signal separator means for separating the horizontal synchronizing signal from the demodulated luminance component of said reproduced SECAM television signal; controllable oscillator means for producing an oscillating signal whose frequency is greater than the frequency of said separated horizontal synchronizing signal; first and second frequency dividers for dividing the frequency of said oscillating signal by factors $m_1$ and $m_2$, respectively, where $m_1-m_2=2n$; phase comparator means for comparing the phase of said separated horizontal synchronizing signal to the frequency-divided oscillating signal; and switch means responsive to said first sense signal for supplying the output of said first frequency divider to said phase comparator means and responsive to said second sense signal for supplying the output of said second frequency divider to said phase comparator means.

53. The apparatus of claim 52 wherein $n=1$, and further comprising a reference oscillator for supplying a reference oscillating signal whose frequency is equal to one of the chrominance subcarrier frequencies of said SECAM television signal; an additional frequency-divider for dividing the frequency of the oscillating signal produced by said controllable oscillator means by one-eighth; and a frequency converter supplied with said reference oscillating signal and said oscillating signal whose frequency is divided by one-eighth to produce said re-converting signals.

54. The apparatus of claim 52 further comprising means for interrupting the supply of the output from said comb filter means to said combining means from the beginning of the horizontal synchronizing interval of said reproduced SECAM television signal to the beginning of the back porch interval included in said horizontal synchronizing interval.

55. The apparatus of claim 44 wherein said successive parallel tracks are arranged on said record medium without guard bands therebetween; said record medium is magnetic; and said transducer means comprise first and second reproducing heads having different azimuth angles.

56. Apparatus for reproducing a SECAM composite color television signal which is recorded in successive parallel tracks on a record medium, the recorded SECAM television signal including a luminance component modulated to a relatively higher frequency range and a chrominance component frequency converted to a relatively lower frequency range, the chrominance component containing, in each horizontal line interval of said SECAM television signal, an unmodulated chrominance subcarrier discriminating signal and a modulated chrominance subcarrier color signal, the phase of the chrominance subcarrier in each horizontal line interval in one track being substantially constant and the phase of the chrominance subcarrier being inverted after each successive predetermined number of horizontal line intervals in the next adjacent track, and the frequency of the chrominance subcarrier alternating between two frequency values in successive horizontal line intervals in each track, said apparatus comprising transducer means for scanning said successive tracks to reproduce the SECAM television signal recorded in the scanned track together with a cross-talk component of the SECAM television signal recorded in the track adjacent the scanned track; a luminance channel for demodulating the reproduced luminance component back to its original frequency range; a chrominance channel for re-converting the reproduced chrominance component back to its original frequency range; and combining means for combining the demodulated luminance component and the re-converted chrominance component; and wherein said chrominance channel comprises frequency re-converting means for receiving the reproduced chrominance component and chrominance cross-talk component, and responsive to re-converting signals for frequency re-converting said reproduced chrominance and chrominance cross-talk components; means for generating first and second re-converting signals of substantially constant and equal frequency, the phase of said first re-converting signal being constant and the phase of said second re-converting signal being inverted after each successive predetermined number of horizontal line intervals, the first re-converting signal being supplied to said frequency re-converting means when said one track is scanned and the second re-converting signal being supplied to said frequency re-converting means when said next adjacent track is scanned; and comb filter means coupled to the output of said frequency re-converting means for substantially attenuating the frequency re-converted chrominance cross-talk component reproduced from each track.

57. The apparatus of claim 56 wherein the phase of said second re-converting signal is opposite to the phase of the chrominance subcarrier recorded in said next adjacent track.

58. The apparatus of claim 56 wherein said comb filter means comprises a delay circuit for delaying the frequency reconverted chrominance and chrominance cross-talk components a predetermined number of horizontal line intervals; and means for combining the delayed and undelayed frequency re-converted chrominance and chrominance cross-talk components.

59. The apparatus of claim 58 wherein said means for combining the delayed and undelayed frequency re-converted chrominance and chrominance cross-talk components comprises an adding circuit.

60. The apparatus of claim 59 further comprising an attenuator for attenuating the output of said delay circuit supplied to said adding circuit.

61. The apparatus of claim 60 wherein the phase of the chrominance subcarrier recorded in said next adjacent track is inverted after every two horizontal line intervals; and wherein said delay circuit delays the frequency re-converted chrominance and chrominance cross-talk components by two horizontal line intervals.

62. The apparatus of claim 56 wherein the phase of the chrominance subcarrier recorded in said next adjacent track is inverted after every two horizontal line intervals; and wherein said comb filter means comprises a delay circuit for delaying the frequency re-converted chrominance and chrominance cross-talk components by two horizontal line intervals; subtracting means for subtracting the undelayed frequency re-converted chrominance and chrominance cross-talk components from the delayed frequency re-converted chrominance and chrominance cross-talk components; attenuating means for attenuating the output derived from said subtracting means by a predetermined amount; and an adding circuit for adding the output from said attenuating means and said undelayed frequency re-converted chrominance and chrominance cross-talk components.

63. The apparatus of claim 62 wherein said attenuating means attenuates the output derived from said subtracting means by a factor of one-half.

64. The apparatus of claim 56 wherein said means for generating first and second re-converting signals comprises sensing means for sensing when said transducer means scans said one track to produce a first sense signal and for sensing when said transducer means scans said adjacent track to produce a second sense signal; means for supplying an oscillating signal of said substantially constant frequency; phase inverting means for inverting the phase of said oscillating signal; controllable switch means for selectively supplying to said frequency re-converting means either said oscillating signal or the phase-inverted oscillating signal; and switch control means responsive to said first sense signal to control said switch means to supply said oscillating signal to said frequency re-converting means, and responsive to said second sense signal to control said switch means to supply said oscillating signal and then said phase-inverted oscillating signal to said frequency re-converting means each for two horizontal line intervals.

65. The apparatus of claim 64 wherein said switch control means comprises synchronizing separator means for separating the horizontal synchronizing signal from the demodulated luminance component of the reproduced SECAM television signal; and frequency divider means for dividing the frequency of said separated horizontal synchronizing signal by one-fourth to produce a periodic switch control signal.

* * * * *